(12) United States Patent
Pesok et al.

(10) Patent No.: US 12,443,640 B1
(45) Date of Patent: Oct. 14, 2025

(54) DATABASE DOCUMENT VISUALIZATION AND MANIPULATION ENGINE APPARATUSES, METHODS, SYSTEMS AND MEDIA

(71) Applicant: Sequoia Port, Inc, Irvine, CA (US)

(72) Inventors: Ido Pesok, Irvine, CA (US); Sarah Walker, Palo Alto, CA (US); Justin Ito, Lynden, WA (US)

(73) Assignee: Sequoia Port Inc, Irvine, CA (US)

( * ) Notice: Subject to any disclaimer, the term of this patent is extended or adjusted under 35 U.S.C. 154(b) by 0 days.

(21) Appl. No.: 18/449,247

(22) Filed: Aug. 14, 2023

Related U.S. Application Data

(60) Provisional application No. 63/400,739, filed on Aug. 24, 2022.

(51) Int. Cl.

| | |
|---|---|
| *G06F 7/00* | (2006.01) |
| *G06F 3/04815* | (2022.01) |
| *G06F 3/04845* | (2022.01) |
| *G06F 3/0486* | (2013.01) |
| *G06F 16/31* | (2019.01) |
| *G06F 16/34* | (2019.01) |

(52) U.S. Cl.
CPC .......... *G06F 16/34* (2019.01); *G06F 3/04815* (2013.01); *G06F 3/04845* (2013.01); *G06F 3/0486* (2013.01); *G06F 16/316* (2019.01)

(58) Field of Classification Search
CPC .... G06F 16/34; G06F 16/316; G06F 3/04815; G06F 3/04845; G06F 3/0486
See application file for complete search history.

(56) References Cited

U.S. PATENT DOCUMENTS

| | | | | |
|---|---|---|---|---|
| 6,154,194 | A * | 11/2000 | Singh | G06F 3/0488 |
| | | | | 715/788 |
| 6,243,724 | B1* | 6/2001 | Mander | G06F 16/34 |
| | | | | 715/810 |
| 6,601,114 | B1* | 7/2003 | Bracha | G06F 9/44521 |
| | | | | 719/332 |
| 6,877,137 | B1* | 4/2005 | Rivette | G06F 16/955 |
| | | | | 707/E17.112 |
| 7,769,794 | B2* | 8/2010 | Moore | G06F 16/168 |
| | | | | 707/831 |

(Continued)

*Primary Examiner* — Mohammed R Uddin
(74) *Attorney, Agent, or Firm* — Aleksandr Gilshteyn; Lansing Lights LLC

(57) ABSTRACT

A user interaction command is obtained via an interface interaction mechanism associated with a viewer interface element structured to display page data associated with a set of page nodes that satisfy filter parameters of a view. A virtual scroll space position associated with the interface interaction mechanism resulting from the user interaction command is determined. A virtual pixel space data structure is queried to determine a virtual pixel space position corresponding to the virtual scroll space position. A determination is made that a buffer update threshold has been exceeded. The virtual pixel space data structure is queried to determine a buffered subset of page nodes based on: the virtual pixel space position, pixel ranges associated with the set of page nodes, and a height bound associated with the viewer interface element. Page data corresponding to the buffered subset of page nodes is loaded into the viewer interface element.

20 Claims, 44 Drawing Sheets

(56) References Cited

U.S. PATENT DOCUMENTS

| | | | |
|---|---|---|---|
| 8,887,085 B1* | 11/2014 | Cox | G06F 3/04855 715/786 |
| 9,037,975 B1* | 5/2015 | Taylor | G06F 16/9577 715/733 |
| 9,911,232 B2* | 3/2018 | Shapira | G06F 3/017 |
| 9,961,155 B1* | 5/2018 | Chan | H04L 61/50 |
| 10,733,358 B2* | 8/2020 | Guinane | G06F 40/154 |
| 11,164,362 B1* | 11/2021 | Tedesco | G06F 3/017 |
| 11,182,959 B1* | 11/2021 | Hwang | G06F 16/9577 |
| 11,726,578 B1* | 8/2023 | Fashimpaur | G06T 19/006 715/863 |
| 2002/0091738 A1* | 7/2002 | Rohrbaugh | G06F 16/986 715/205 |
| 2002/0113823 A1* | 8/2002 | Card | G06F 3/048 715/776 |
| 2007/0061487 A1* | 3/2007 | Moore | G06F 16/27 707/E17.032 |
| 2009/0228777 A1* | 9/2009 | Henry | G06F 16/40 707/999.005 |
| 2010/0169823 A1* | 7/2010 | Audet | G06Q 10/10 715/810 |
| 2011/0099500 A1* | 4/2011 | Smith | H04L 41/22 715/771 |
| 2011/0225486 A1* | 9/2011 | Stellanova | G06F 3/04817 715/234 |
| 2012/0042279 A1* | 2/2012 | Naderi | G06F 16/248 715/786 |
| 2016/0139743 A1* | 5/2016 | Pan | G06F 16/958 715/739 |
| 2016/0314100 A1* | 10/2016 | Seo | G06F 40/169 |
| 2016/0335740 A1* | 11/2016 | Graf | G06F 3/0481 |
| 2017/0371891 A1* | 12/2017 | Yazganarikan | G06F 16/185 |
| 2018/0088758 A1* | 3/2018 | Zearing | G06F 3/0481 |
| 2018/0157629 A1* | 6/2018 | Tuli | H04L 67/5651 |
| 2018/0226143 A1* | 8/2018 | Khashman | G06F 16/254 |
| 2019/0138405 A1* | 5/2019 | Li | G06F 11/1469 |
| 2021/0216349 A1* | 7/2021 | Munro | G06F 3/011 |
| 2021/0357367 A1* | 11/2021 | Yazganarikan | G06F 16/168 |
| 2022/0229673 A1* | 7/2022 | Abadzhimarinov | G06F 3/0481 |
| 2022/0318491 A1* | 10/2022 | Keslin | G06F 16/34 |
| 2024/0193207 A1* | 6/2024 | Seyed Fathi | G06F 16/783 |

* cited by examiner

EXEMPLARY DDVME DATABASE DOCUMENT VISUALIZATION AND MANIPULATION (DDVM) COMPONENT

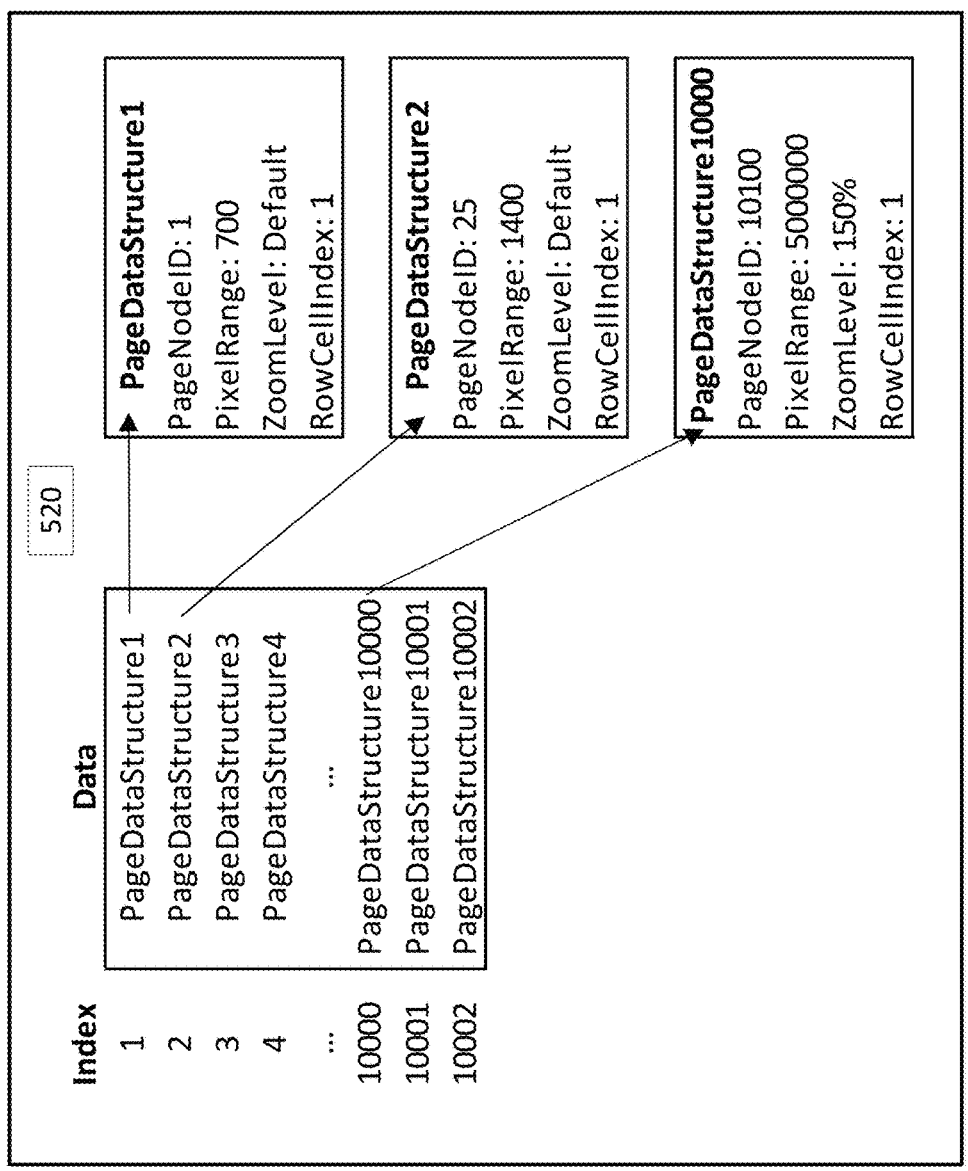
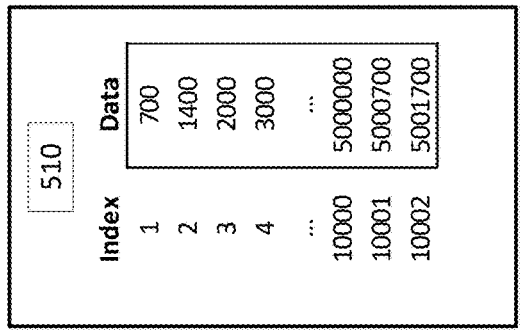
FIGURE 5

FIGURE 12

FIGURE 13 — EXEMPLARY DDVME SCREENSHOT

FIGURE 14

EXEMPLARY DDVME SCREENSHOT

FIGURE 17 — EXEMPLARY DDVME SCREENSHOT

EXEMPLARY DDVME SCREENSHOT

FIGURE 22

FIGURE 23 — EXEMPLARY DDVME SCREENSHOT

FIGURE 25 — EXEMPLARY DDVME SCREENSHOT

EXEMPLARY DDVME SCREENSHOT

FIGURE 28 — EXEMPLARY DDVME SCREENSHOT

FIGURE 32 — EXEMPLARY DDVME SCREENSHOT

EXEMPLARY DDVME SCREENSHOT

EXEMPLARY DDVME SCREENSHOT

EXEMPLARY DDVME SCREENSHOT

EXEMPLARY DDVME SCREENSHOT

EXEMPLARY DDVME SCREENSHOT

FIGURE 42 — EXEMPLARY DDVME SCREENSHOT

EXEMPLARY DDVME COORDINATOR

DATABASE DOCUMENT VISUALIZATION AND MANIPULATION ENGINE APPARATUSES, METHODS, SYSTEMS AND MEDIA

CROSS-REFERENCE TO RELATED APPLICATIONS

Applicant hereby claims priority under 35 U.S.C. § 119 to U.S. provisional patent application no. 63/400,739, filed Aug. 24, 2022, entitled "DATABASE DOCUMENT VISUALIZATION AND MANIPULATION ENGINE APPARATUSES, METHODS, SYSTEMS AND MEDIA".

The entire contents of the aforementioned application are herein expressly incorporated by reference in their entirety.

This disclosure describes DATABASE DOCUMENT VISUALIZATION AND MANIPULATION ENGINE APPARATUSES, METHODS, SYSTEMS AND MEDIA (hereinafter "DDVME"). A portion of the disclosure of this patent document contains material which is subject to copyright and/or mask work protection. The copyright and/or mask work owners have no objection to the facsimile reproduction by anyone of the patent document or the patent disclosure, as it appears in the Patent and Trademark Office patent file or records, but otherwise reserve all copyright and mask work rights whatsoever.

FIELD

The present disclosure is directed generally to database engines.

BACKGROUND

A variety of databases are available for storing data. For example, relational databases use tables of rows and columns, where each row corresponds to a record and each column corresponds to a data field.

BRIEF DESCRIPTION OF THE FIGURES

The accompanying figures and/or appendices illustrate various exemplary embodiments in accordance with the present disclosure.

FIG. 5 shows data structures in one embodiment of the DDVME;

FIG. 12 shows screenshot diagram(s) in one embodiment of the DDVME;

FIG. 14 shows screenshot diagram(s) in one embodiment of the DDVME;

FIG. 22 shows screenshot diagram(s) in one embodiment of the DDVME;

DETAILED DESCRIPTION

Introduction

Figure 1:
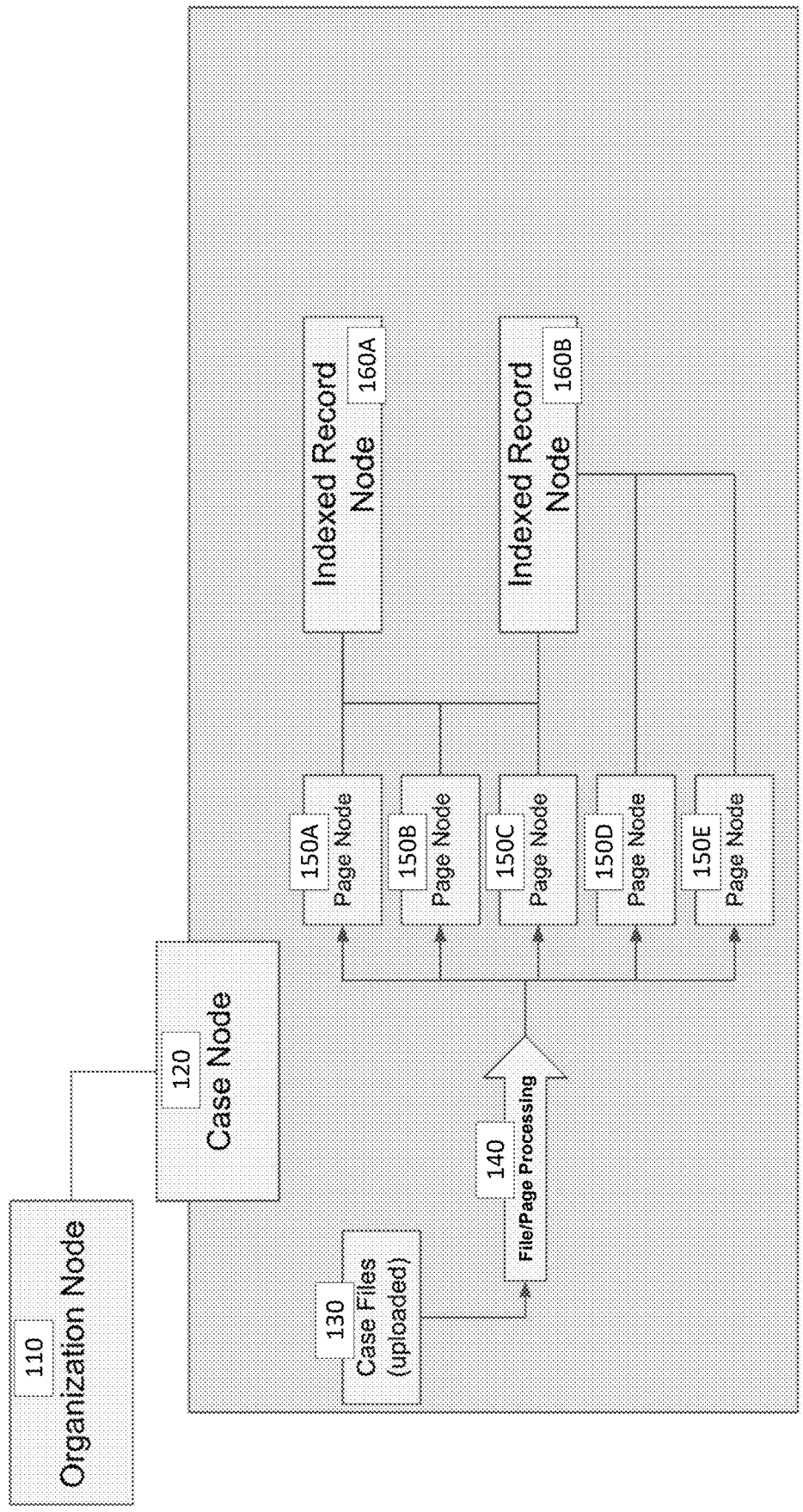
FIG. 1 shows an exemplary architecture in one embodiment of the DDVME.

Files (e.g., medical case files) are often put into the virtual world unorganized, cluttered, and disordered. Not only do users (e.g., doctors, reviewers) have to spend time understanding the case, but even more time goes into organizing the files into an understandable format. How are the files disorganized? For example, they can be scanned in and uploaded in the wrong order, there may be duplicate pages, there may be extraneous pages that have no relevance to the case or the work that needs to be done. This creates an issue surrounding an immense amount of time wasted into trying to organize, or "index" these files. The DDVME facilitates highly efficient indexing, navigation, and analysis of uploaded files without the burden of "file borders". Working between one or thousands of files is seamless and transparent to the user. The DDVME transforms what was once a stack of disorganized pages into an interactive and intuitive power workstation via a database. Ultimately what once was a mess, becomes an organized and interactive virtual ecosystem that facilitates analysis (e.g., medical reviews) to be conducted in the shortest amount of time while maintaining the highest quality review. This may be done, not only at an individual level, but also on a collaborative scale providing the ability for users to work together and interact with these files via the database.

In one implementation, users start off on the cases page where they can view the cases stored in their organization. The page is formatted as a table, and they can click on a row to interact with the case. If an indexed record has been already created in the case, the DDVME may initially show the record with the earliest visit date attached to it (e.g., the start of the user's timeline of medical history). If no indexed record was created yet, the DDVME may initially show all pages from files (e.g., in the order they were uploaded). Once looking at a view, whether it be all pages or a record, a user can use the UI to quickly switch between views such as other indexed records or go back to all pages. Additional views may include blank/illegible pages, duplicate pages, similar pages, and/or the like. From any view, a user may go back and the DDVME may scroll them to the view they were previously on as well as keep their last scroll position. When looking at a set of pages, whether it be an indexed record or all pages, the viewer creates a pixel range vector that lays out the map for the scroller. It does so by calculating the position in the virtual scroll space of each page using the page heights. When a user scrolls, the scroll or drag distance is used to determine where the viewer should land them in the virtual pixel space. The virtual pixel space may not be actually shown, if it is large enough. A virtual pixel space may be used to make it feel like the user is scrolling through an endless number of pages, but really a pixel space (e.g., of a viewer interface element (e.g., an HTML DIV element)) set to a size a browser (e.g., a web browser) can handle to achieve desired performance and speed is utilized. Then, based on where the user is in the virtual scroll space, the DDVME decides when to start loading in the images the user should see. If the user is far away from a space, then the DDVME may not load the image there, yet alone give it any actual real estate in the pixel space in the browser. Overall, with the scroll, the user may feel like they are traveling a million miles, but really, they are utilizing a bounded efficient pixel space through the use of a virtual pixel space data structure.

Once the user has found the pages they want, the user may start interacting with the viewer at the page level. For example, the user may add highlights to the page, zoom on the page, copy text from optical character recognition (OCR) data, searching for words in the files, and/or the like. In some implementations, the DDVME may show metadata on each page such as its indexed status or if it has any duplicate pages. The copy/zoom/highlights may be done by calculating a bounding box on the page layer determined by the user's dragging and using this bounding box to either create highlights or find words that have bounding boxes in a matching area to copy. With this, the user gets to feel like the pages come to life at the page layer, instead of just being a plain old stack of pages. Moving pages around is also seamless, as the user may copy/paste/transfer/send them around the system. The UI provides a seamless interaction with the backend, one that makes it possible to organize a huge number of pages quickly. For example, the user or a machine learning tool may indicate (e.g., via a bounding box) where on each page to look for a page number and the DDVME may use this bounding box to automatically reorder hundreds of pages in the correct order (e.g., something that previously would have to be done manually and would take an unreasonable amount of time). In some implementations, the DDVME may highlight on each page specified information such as dates, authors, locations, names, and/or the like ultimately dramatically reducing the amount of time people spend looking for what they need on the pages. From the viewer, users may seamlessly drag data from the pages and insert them into the indexed record data in the database.

In one embodiment, the DDVME may provide two main views: editor (e.g., left) and viewer (e.g., right), which may facilitate the following features:

Editor
1. Record Editor
   a) Inputs to enter record date, author, category, encounter type, location, summary, quick notes, and tags
   b) Record list peeker to view all records while editing identifiers
   c) Page manipulation: ability to query uploaded files and select appropriate pages to be in a record. (e.g., input done on frontend, database manipulation done on backend, communicate via API)
   d) Reject or unindex a record
2. Record List
   a) Table of records displaying their relevant data
   b) Ability to filter record by variety of fields (e.g., attributes)
   c) Ability to sort record list by variety of fields (e.g., attributes)
   d) Search records by querying for text on pages in record (e.g., done on the backend using OCR)
3. View
   a) User can view non indexed pages or rejected pages
4. Export
   a) User can export record as PDF
   b) User can export all records as PDF Viewer
1. Custom Scroll Bar
   a) Mimics native browser scroll bar. Scroll thumb is larger for case files and/or indexed record nodes with a large number of pages (e.g., with total height exceeding a maximum allowable pixel space height bound) as there is less content being displayed in terms of height since the pixel space is smaller than the virtual pixel space. Scroll thumb represents location in the virtual pixel space (e.g., the vector of pages). Scroll thumb is draggable and may move the user through the virtual pixel space (e.g., the vector of pages) faster than scrolling (e.g., via a mouse wheel). Virtual pixel space position is determined using a calculation technique and virtual scroll space position (e.g., the location of the scroll thumb relative to the scroll track height).

b) Scroll thumb is accompanied by a thumbnail viewer that may show the user what page they will scroll to if they let go of their drag. Thumbnail image to be displayed is calculated using a calculation technique and virtual scroll space position (e.g., the location of the scroll thumb relative to the scroll track height).

2. Minimap
   a) Minimap shows users more pages but in a smaller size compared to the page viewer so users can get a sense of what is ahead/behind them (e.g., a thinner viewer).
   b) Users may use the minimap to navigate the viewer.
   c) Minimap may be toggled on/off
3. Setup
   a) Ability to show/hide the minimap
   b) Ability to show/hide the editor view
   c) Ability to show/hide the page viewer
   d) Ability to increase/decrease viewer pages per row
   e) Ability to increase/decrease zoom multiplier
   f) Ability to set copy mode when copying text from the viewer: lowercase, UPPERCASE, Title Case, As on page
   g) Ability to set highlight color
   h) Ability to show/hide highlights on pages
   i) Ability to save setups and store the user's preferred configurations, which may be set as default
4. Actions
   a) Highlight mode may turn on a highlighter and the user can drag across a page to emphasize a section of it (e.g., highlight in their preferred color, font, and/or the like). The user may view all their highlights in one place and search text contained in the highlight. Highlights may also be associated with notes if desired. In one implementation, highlights store the page and the corresponding bounding box of the highlight.
   b) Zoom may overlay the viewer with a zoomed box of where the cursor stands. In the zoom box will be a cropped image of the page under the cursor. The user can increase the zoom multiplier in setup.
   c) Search may search loaded pages for text using OCR. Users may navigate search results and relevant words found on the pages may be highlighted in yellow.
   d) Dual monitor may open a new tab of the viewer and may sync actions between viewer and editor across the two tabs using Vuex store. For example, the user may use this if the user wants to view the pages on a bigger screen.
5. Scrolling
   a) In one implementation, Viewer may load a specified number (e.g., approximately 10,000 pixels) of pixels at one time (e.g., significantly lower than the browser limit (e.g., 3 million pixels)). Viewer uses a virtual pixel space data structure (e.g., a pixel range vector of the pages in a record) and calculates the current position of the user using a scroll offset (e.g., a scroll top) and finding where it lies in the pixel range vector. Viewer calculates appropriate pages to show for that position, loading some pages above and below the current page. As the user scrolls (e.g., via a mouse wheel), the contents are translated in the Y direction. Once a user scrolls past a specified number (e.g., 75,000 pixels) of pixels, the scroll offset gets pushed back a specified number (e.g., 50,000 pixels) of pixels. Now they are at 25,000 pixels but the DDVME stores this offset to know their true location of 75,000. Each time the user approaches 75,000 they keep getting "kicked back" and this allows scrolling to be performed in a pixel space (e.g., an HTML DIV element) with a specified bounded height (e.g., 100,000 pixels) that is significantly lower than the browser limit (e.g., 3 million pixels). A similar recycle mechanism is utilized when the user scrolls up. Although the view height is at maximum the specified bounded height (e.g., 100,000 pixels), the custom scroll bar allows the DDVME to show it as however many pixels it truly is using a calculation technique. During scroll the DDVME may be lazy loading images as well as saving the URLs in an image cache, which recycles up to a specified number (e.g., 150 image URLs) of image URLs. In one implementation, an uncached page (e.g., with an uncached image URL) may be represented in the pixel space as a blank space placeholder with dimensions that correspond to the dimensions of the uncached page. Accordingly, with a cached subset (e.g., up to 20,000 pixels) of buffered pages (e.g., pages corresponding to the pixels that fit within the up to the 100,000 pixels height bound of the pixel space) cached with lazy loading, the DDVME may provide a resource-efficient smooth scrolling mechanism to the user such that the user may scroll (e.g., with a mouse wheel) through the pixel space continuously without being slowed down by either having to wait until buffered pages in the pixel space are updated (e.g., via the scroll offset recycle mechanism) or by having to wait until pages are loaded (e.g., via the blank space placeholders and/or caching).
6. Resizing
   a) Directive is placed on the viewer container and detects when it has been resized. On resize, the DDVME calculates the new heights and widths, maintaining aspect ratios, as well as updates the virtual pixel space data structure (e.g., the pixel range vector). The DDVME updates the state and the viewer to reflect this data.
7. Image Manipulation
   a) Users can use the viewer to select certain areas on pages such as the Page #and have the DDVME learn where to look for that data. Ultimately this allows auto reordering of pages in the viewer by the DDVME being able to read the page #from the image.

In various embodiments, the DDVME facilitates the following features:

1. Overcomes limitations set forth by the browser in loading an infinite number of pages at one time. The browser allows the max height of a DIV element to be around 3 million pixels. The DDVME has no such limitation and can load any number of pages with any heights and widths.
2. Allows thumbnail preview of the collection of pages with the scroll bar. This allows the user to look ahead and/or behind a specified number of pages without moving and ultimately delivers much faster speed.
3. To increase record processing speed, users can choose to view multiple pages (e.g., 6 pages) per row using the setup modal 4. Allows manipulation of files in the database visually using a drag and drop mechanism into records
5. Dual monitor mode allows synchronization between viewer tab and editor tab for users with multiple (e.g., 2 monitors) monitors
6. Ability to manipulate the record data from the file viewer (e.g., removing pages from records and transferring pages between records)
7. Ability to copy text using a drag mechanism
8. Users can save their "setup" and come back to their custom viewer each time they utilize the DDVME without making any changes. They can save as many of these "setups" as they want.
9. Allows resizing of the viewer/editor to fit user needs
10. Allows highly efficient management, navigation, and analysis of any files uploaded without the burden of what we call "file borders". Working between one or thousands of files is seamless and transparent to the user. For example, the user can seamlessly navigate through 10,000 pages extracted from 50 different PDF, Word and scanned physical files associated with an indexed record node that corresponds to information regarding blood cultures performed during the course of the case using a single virtual pixel space.

DETAILED DESCRIPTION OF THE DDVME

FIG. 1 shows an exemplary architecture in one embodiment of the DDVME. In FIG. 1, an embodiment of a database design schematic showing a node architecture is illustrated. In one implementation, the node architecture may include organization nodes 110, case nodes 120, page nodes 150A-E, indexed record nodes 160A-B, and/or the like nodes that may be utilized to transform case file data 130 (e.g., PDF, Word, scanned physical files) into a set of (e.g., multidimensional) nodes via file/page processing 140 (e.g., as discussed with regard to FIG. 2). In one implementation, an organization node may be utilized to store data regarding an organization (e.g., organization name), associated users (e.g., who are allowed access to the organization's cases), associated case nodes (e.g., that store data regarding the organization's cases), and/or the like. In one implementation, a case node may be utilized to store data regarding a case (e.g., patient's name, case start and/or end dates), associated page nodes (e.g., that store data regarding document pages associated with the case), associated indexed record nodes (e.g., that store data regarding indexed records associated with the case), and/or the like. In one implementation, a page node may be utilized to store data regarding a page (e.g., source document name, page number of the page within source document), associated layer nodes (e.g., that store layer data associated with the page (e.g., as discussed with regard to FIG. 2)), and/or the like. In one implementation, an indexed record node may be utilized to store data regarding a set of linked pages (e.g., the set of linked pages may be linked based on having the same set of attributes (e.g., as discussed with regard to FIG. 20) and/or based on being placed in the same bucket of pages by a user) such as indexed record data (e.g., attributes associated with the indexed record node), associated page nodes, and/or the like. It is to be understood that a page node may be associated with none, one, or multiple indexed record nodes. For example, indexed record node 160A is associated with page nodes 150A-C, indexed record node 160B is associated with page nodes 150C-E, and, as such, page node 150C is associated with both indexed record node 160A and indexed record node 160B.

Figure 2:
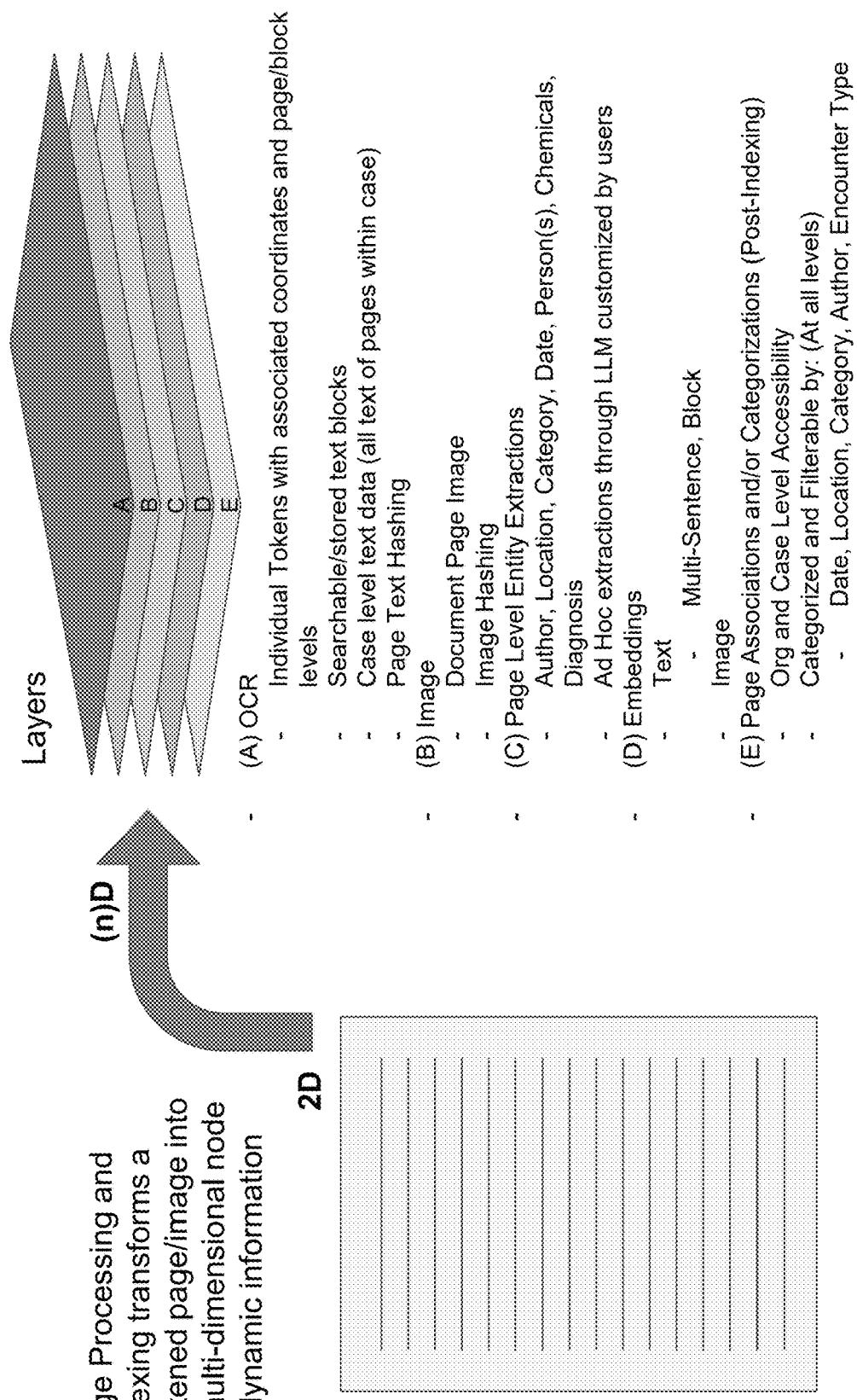
FIG. 2 shows an exemplary architecture in one embodiment of the DDVME.

FIG. 2 shows an exemplary architecture in one embodiment of the DDVME. In FIG. 2, an embodiment of a database design schematic showing a page node architecture after processing case file data is illustrated. In one implementation, page processing (e.g., for each page of a file) and/or indexing transforms case file data (e.g., flattened text and/or images) into a multi-dimensional page node of dynamic information comprising a set of layer nodes of different layer types (e.g., OCR, text, image, audio, video, page level entity extractions, embeddings, page associations and/or categorizations layer nodes). In one implementation, a layer node may be utilized to store layer data pertinent to the layer type of the layer node. For example, a layer node of image layer type may store a document page image, an image hash of the document page image, and/or the like.

Figure 3:
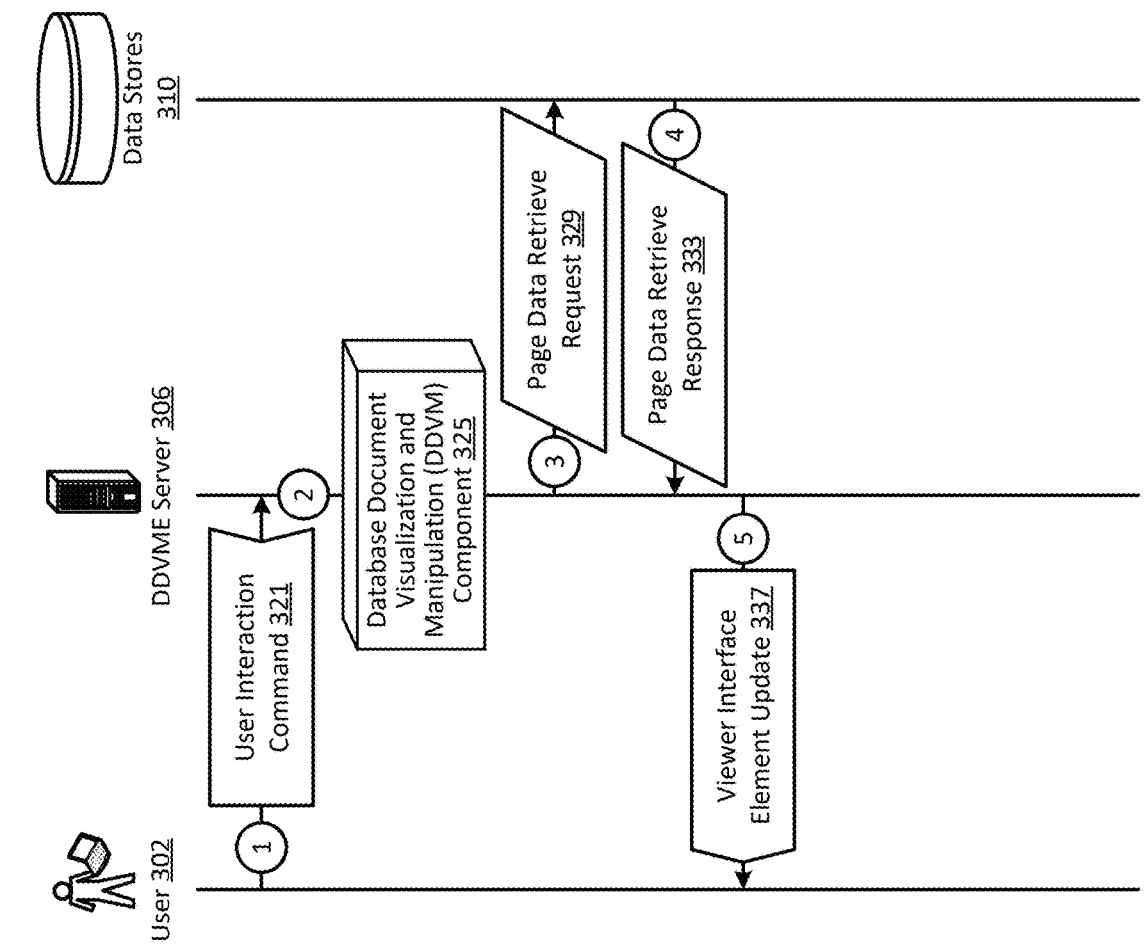
FIG. 3 shows a data flow diagram in one embodiment of the DDVME.

FIG. 3 shows a data flow diagram in one embodiment of the DDVME. FIG. 3 provides an example of how data may flow to, through, and/or from the DDVME. In FIG. 3, a user 302 may send a user interaction command 321 to a DDVME server 306 to facilitate navigating (e.g., scrolling, resizing) through pages of dynamic information (e.g., through a set of multi-dimensional page nodes that satisfy filter parameters of a view) via a virtual pixel space. In one embodiment, the user may use a client (e.g., a desktop, a laptop, a tablet, a smartphone, a smartwatch) to access a DDVME website, application (e.g., a desktop application, a mobile app), and/or the like to facilitate generating the user interaction command. In one implementation, the user interaction command may include data such as a request identifier, an interface interaction mechanism identifier, event details, and/or the like. For example, the user interaction command may be sent via a network in XML format substantially in the following form:

<?XML version="1.0" encoding="UTF-8" ?>
<user_interaction_command>
  <request_identifier>ID_request_1</request_identifier>
  <interface_interaction_mechanism_identifier>
    ID_CUSTOM_SCROLL_BAR_1
  </interface_interaction_mechanism_identifier>
  <event_details>
    <event_type>TYPE_SCROLL</event_type>
    <scroll_position>1.47%</scroll_position>
  </event_details>
</user_interaction_command>

A database document visualization and manipulation (DDVM) component 325 may utilize data provided via the user interaction command to facilitate (e.g., lazy) loading of page data for a determined buffered subset of the set of page nodes (e.g., for display to the user). See FIG. 4 for additional details regarding the DDVM component.

The DDVME server 306 may send a page data retrieve request 329 to data stores (e.g., a database) 310 to retrieve the page data for the determined buffered subset of the set of page nodes. In one implementation, the page data retrieve request may include data such as a request identifier, requested page data specification, and/or the like. For example, the page data retrieve request may be sent via a network in XML format substantially in the following form:

<?XML version="1.0" encoding="UTF-8" ?>
<page_data_retrieve_request>
  <request_identifier>ID_request_2</request_identifier>
  <page_data_specification>
    <page_node_identifier>ID_PageNode_138</page_node_identifier>
    <layer_type>TYPE_IMAGE</layer_type>
    <layer_data>DATA_DOCUMENT_PAGE_IMAGE</layer_data>

```xml
    </page_data_specification>
    <page_data_specification>
        <page_node_identifier>ID_PageNode_139</page_node_identifier>
        <layer_type>TYPE_IMAGE</layer_type>
        <layer_data>DATA_DOCUMENT_PAGE_IMAGE</layer_data>
    </page_data_specification>
    ...
    <page_data_specification>
        <page_node_identifier>ID_PageNode_157</page_node_identifier>
        <layer_type>TYPE_IMAGE</layer_type>
        <layer_data>DATA_DOCUMENT_PAGE_IMAGE</layer_data>
    </page_data_specification>
</page_data_retrieve_request>
```

The data stores 310 may send a page data retrieve response 333 to the DDVME server 306 with the requested page data. In one implementation, the page data retrieve response may include data such as a response identifier, the requested page data, and/or the like. For example, the page data retrieve response may be sent via a network in XML format substantially in the following form:

```xml
<?XML version="1.0" encoding="UTF-8" ?>
<page_data_retrieve_response>
    <response_identifier>ID_response_2</response_identifier>
    <page_data>
        <page_node_identifier>ID_PageNode_138</page_node_identifier>
        <document_page_image>page_image_138.png</document_page_image>
    </page_data>
    <page_data>
        <page_node_identifier>ID_PageNode_139</page_node_identifier>
        <document_page_image>page_image_139.png</document_page_image>
    </page_data>
    ...
    <page_data>
        <page_node_identifier>ID_PageNode_157</page_node_identifier>
        <document_page_image>page_image_157.png</document_page_image>
    </page_data>
</page_data_retrieve_response>
```

The DDVME server 306 may send a viewer interface element update 337 to the user 302 to provide the user's client with an updated set of page data (e.g., to cache) for a viewer interface element (e.g., an HTML DIV element) of the DDVME website, application, and/or the like (e.g., for display to the user). In one implementation, the viewer interface element update may include data such as a response identifier, the updated set of page data, and/or the like. For example, the viewer interface element update may be sent via a network in XML format substantially in the following form:

```xml
<?XML version="1.0" encoding="UTF-8" ?>
<viewer_interface_element_update>
    <response_identifier>ID_response_1</response_identifier>
    <page_data>
        <page_node_identifier>ID_PageNode_138</page_node_identifier>
        <document_page_image>page_image_138.png</document_page_image>
    </page_data>
    <page_data>
        <page_node_identifier>ID_PageNode_139</page_node_identifier>
        <document_page_image>page_image_139.png</document_page_image>
    </page_data>
    ...
    <page_data>
        <page_node_identifier>ID_PageNode_157</page_node_identifier>
        <document_page_image>page_image_157.png</document_page_image>
    </page_data>
</viewer_interface_element_update>
```

Figure 4:
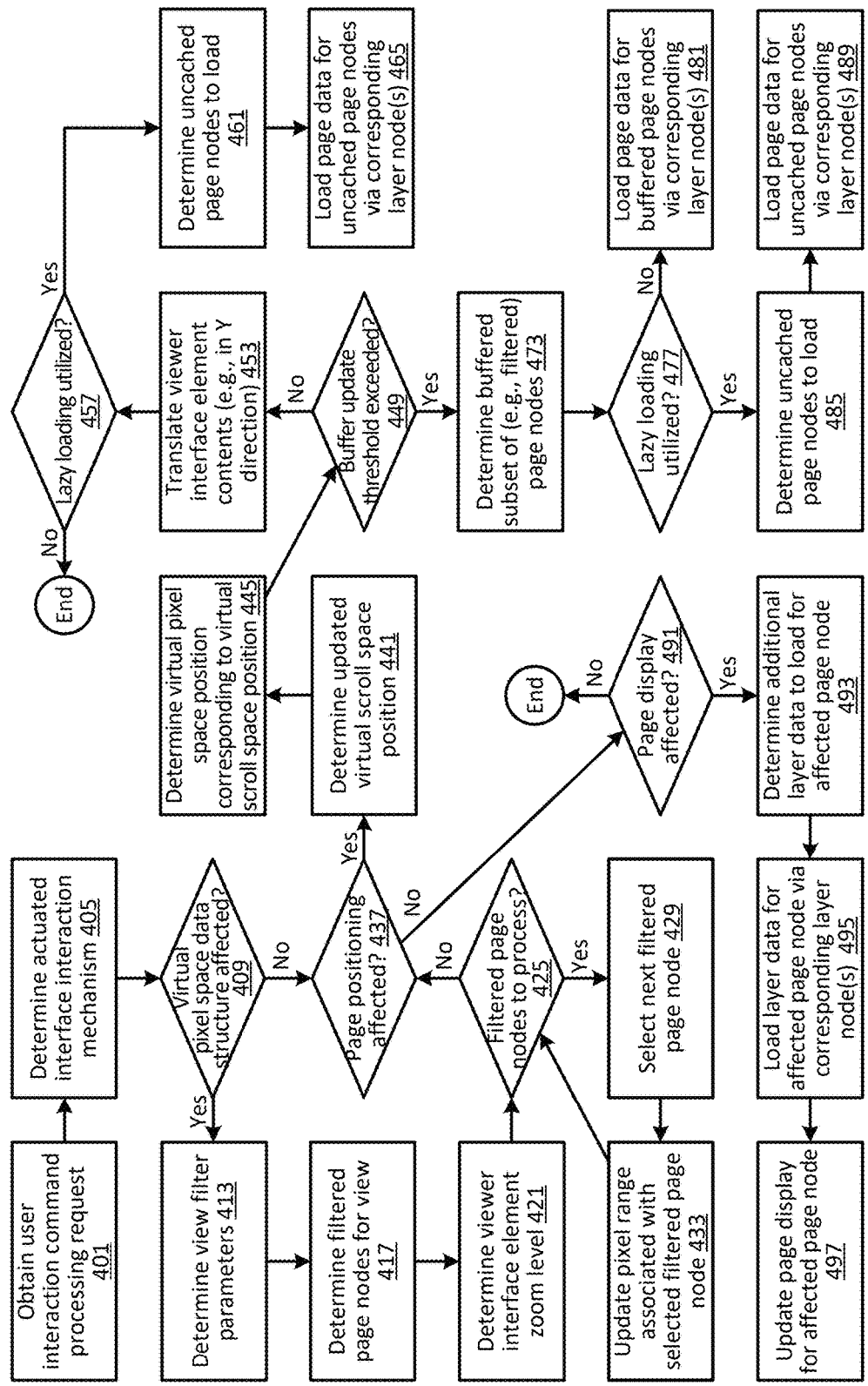
FIG. 4 shows a logic flow diagram illustrating a database document visualization and manipulation (DDVM) component in one embodiment of the DDVME.

FIG. 4 shows a logic flow diagram illustrating a database document visualization and manipulation (DDVM) component in one embodiment of the DDVME. In FIG. 4, a user interaction command processing request may be obtained at 401. For example, the user interaction command processing request may be obtained as a result of a user interaction command from a user to navigate through pages of dynamic information (e.g., through a set of multi-dimensional page nodes that satisfy filter parameters of a view) via a virtual pixel space.

An interface interaction mechanism actuated by the user may be determined at 405. For example, the interface interaction mechanism may be a custom scroll bar, a resize widget, a view widget, a filter widget, a zoom widget, a setup widget, a search widget, an area selector tool, a highlight tool, a show page annotations widget, and/or the like. In one implementation, the user interaction command processing request may be parsed (e.g., using PHP commands) to determine the actuated interface interaction mechanism (e.g., based on the value of the interface_interaction_mechanism_identifier field of the user interaction command). In some implementations, the user interaction command processing request may be parsed (e.g., using PHP commands) to determine event details associated with the user interaction command (e.g., based on the value of the event_details field of the user interaction command).

A determination may be made at 409 whether a virtual pixel space data structure defining the virtual pixel space was affected by the user interaction command. See FIG. 5 for exemplary structures of virtual pixel space data structures that may be utilized. For example, if the user utilized the view widget and/or the filter widget to select different view filter parameters (e.g., to change which page nodes are viewable), the virtual pixel space data structure may be affected (e.g., the virtual pixel space data structure may be updated to comprise pixel range data for the page nodes satisfying the newly selected view filter parameters). In another example, if the user utilized the resize widget or the zoom widget (e.g., to change the size of displayed pages) and/or the setup widget (e.g., to change the number of pages displayed per row), the virtual pixel space data structure may be affected (e.g., the virtual pixel space data structure may be updated to comprise updated pixel range data (e.g., based on updated heights) for the page nodes associated with current view filter parameters).

If the virtual pixel space data structure was affected by the user interaction command, view filter parameters (e.g., a selected view, selected filter parameters) may be determined at 413. For example, a view may be all page nodes, indexed record nodes, blank and/or illegible page nodes, duplicate page nodes, similar page nodes, and/or the like. In another example, a view may be further filtered based on a set of attributes (e.g., as discussed with regard to FIG. 20). In one implementation, the determined event details associated with the user interaction command may be analyzed to determine which view and/or filter attributes were selected by the user. In another implementation, a widget (e.g., the view widget, the filter widget) may be queried (e.g., via a callback function) to determine whether the view filter parameters were changed and/or which view filter parameters were selected.

Filtered page nodes corresponding to the selected view filter parameters may be determined at 417. For example, page node identifiers of the filtered page nodes may be determined. In one implementation, the selected view may specify a set of associated page node identifiers, and properties of the selected view may be analyzed (e.g., using PHP commands) to determine the set of associated page node identifiers (e.g., which may be further filtered based on the selected filter parameters). In another implementation, the selected view may specify a set of associated conditions, and a nodes data store (e.g., a database) may be queried to determine a set of associated page node identifiers that satisfy the set of associated conditions (e.g., which may be further filtered based on the selected filter parameters). For example, the filtered page nodes corresponding to the selected view may be determined via one or more SQL statements substantially in the following form:

SELECT NodeID
FROM Nodes
WHERE NodeType=TYPE_PAGE_NODE AND
PageData=the set of associated conditions and/or filter parameters;

A zoom level associated with a viewer interface element may be determined at 421. In one embodiment, the zoom level may specify how much to zoom into or out of a document page image associated with a page node (e.g., affecting the height of document page images in the viewer interface element). In another embodiment, the zoom level may specify how many document page images to display per row (e.g., affecting the height of document page images in the viewer interface element). In one implementation, the determined event details associated with the user interaction command may be analyzed to determine the zoom level selected by the user. In another implementation, a widget (e.g., the zoom widget and/or the setup widget) may be queried (e.g., via a callback function) to determine whether the zoom level was changed and/or which zoom level was selected. In one embodiment, the viewer interface element may comprise a pixel space structured to display page data for a determined buffered subset of the filtered page nodes. In one implementation, the viewer interface element may be an HTML DIV element set to a size (e.g., a height bound) a browser (e.g., a web browser) can handle to achieve desired performance and speed. It is to be understood that the size of the viewer interface element may depend on the browser and/or on system resources of the user's client.

A determination may be made at 425 whether there remain filtered page nodes to process. In one implementation, each of the filtered page nodes corresponding to the selected view filter parameters may be processed. If there remain filtered page nodes to process, the next filtered page node may be selected for processing at 429.

A pixel range associated with selected filtered page node may be updated at 433. For example, a pixel range may specify a first pixel position and/or a last pixel position of a document page image corresponding to the selected filtered page node in the virtual pixel space. In one embodiment, an element (e.g., an array element, a page data structure) of the virtual pixel space data structure corresponding to the selected filtered page node may be updated to store a determined pixel range for the selected filtered page node. In one implementation, the pixel range for the selected filtered page node may be determined based on the dimensions of the document page image and/or the zoom level (e.g., via a calculation such as last pixel position of the element=height*zoom level+last pixel position of the preceding element). For example, if the dimensions of the document page image are 540 by 700 pixels and the zoom level is 100%, the pixel range for the selected filtered page node may be updated to store 700 as the last pixel position (e.g., assuming it is the first page in the virtual pixel space) or to store 1,400 as the last pixel position (e.g., assuming it is the second page in the virtual pixel space and the first page has the same dimensions). In another example, if the dimensions of the document page image are 540 by 700 pixels and the zoom level is 125% (e.g., maintaining aspect ratios), the pixel range for the selected filtered page node may be updated to store 875 as the last pixel position (e.g., assuming it is the first page in the virtual pixel space) or to store 1,750 as the last pixel position (e.g., assuming it is the second page in the virtual pixel space and the first page has the same dimensions). In one embodiment, the filtered page nodes may be different from those before the user interaction command (e.g., if the user modified the selected view filter parameters), and updating the element of the virtual pixel space data structure corresponding to the selected filtered page node may comprise adding a new element to a newly generated (e.g., cleared of previously existing elements) virtual pixel space data structure. In another embodiment, the filtered page nodes may be unchanged from those before the user interaction command (e.g., if the user modified the zoom level), and updating the element of the virtual pixel space data structure corresponding to the selected filtered page node may comprise modifying pixel range data stored by a previously existing element.

If the virtual pixel space data structure was not affected by the user interaction command or if the virtual pixel space data structure was updated, a determination may be made at 437 whether page positioning was affected by the user interaction command. For example, if the user actuated a mouse scroll wheel on, actuated a touchpad scroll on, dragged, swiped, and/or the like the viewer interface element (e.g., to scroll in the viewer interface element), the page positioning may be affected (e.g., a new page may be shown via the viewer interface element and/or the pixel space utilized by the viewer interface element may be updated). In another example, if the user actuated the custom scroll bar (e.g., clicked on the scroll bar track, dragged the scroll thumb), the page positioning may be affected (e.g., a new page may be shown via the viewer interface element and/or the pixel space utilized by the viewer interface element may be updated).

If the page positioning was affected by the user interaction command, an updated virtual scroll space position may be determined at 441. For example, a virtual scroll space position may be determined based on the position of the scroll thumb of the custom scroll bar on the scroll bar track (e.g., as a percentage from 0% to 100%). In one embodiment, the position of the scroll thumb may be modified by the user (e.g., when the user actuates the custom scroll bar). In another embodiment, the position of the scroll thumb may be modified programmatically to match the user's scroll actions in the viewer interface element (e.g., when the user scrolls in the viewer interface element). In one implementation, the determined event details associated with the user interaction command may be analyzed to determine the virtual scroll space position (e.g., 1.47%). In another implementation, the custom scroll bar may be queried to determine the virtual scroll space position.

A virtual pixel space position corresponding to the virtual scroll space position may be determined at 445. In one embodiment, the virtual pixel space position may specify a pixel position in the virtual pixel space that corresponds to the virtual scroll space position. In one implementation, the virtual pixel space position may be determined by mapping the virtual scroll space position onto the virtual pixel space (e.g., via a calculation such as virtual pixel space position=the last pixel position of the last element of the virtual pixel space data structure*the percentage specified by the virtual scroll space position). For example, if the last element (e.g., the page node at index 10,002) of the virtual pixel space data structure (e.g., see FIG. 5) has the last pixel position of 5,001,700 and the virtual scroll space position is approximately 1.47% (e.g., stored as 0.0146952), the virtual pixel space position may be calculated as 73,501. In another example, if the last element (e.g., the page node at index 10,002) of the virtual pixel space data structure (e.g., see FIG. 5) has the last pixel position of 5,001,700 and the virtual scroll space position is approximately 1.79% (e.g., stored as 0.0178941), the virtual pixel space position may be calculated as 89,501. In one embodiment, the virtual pixel space position may be used to determine a page and/or a position on the page that should be shown at a specified location (e.g., the top pixel visible to the user) of the viewer interface element.

A determination may be made at 449 whether a buffer update threshold for the viewer interface element was exceeded. In one implementation, the viewer interface element may utilize an upper buffer update threshold (e.g., an upper pixel position corresponding to 25% of the height bound associated with the viewer interface element) and/or a lower buffer update threshold (e.g., a lower pixel position corresponding to 75% of the height bound associated with the viewer interface element). For example, if the user scrolls up in the viewer interface element past the upper buffer update threshold, the buffer update threshold may be exceeded. In another example, if the user scrolls down in the viewer interface element past the lower buffer update threshold, the buffer update threshold may be exceeded. In another example, if the user scrolls in the viewer interface element between the upper buffer update threshold and the lower buffer update threshold (e.g., between 25,000 pixels and 75,000 pixels of the viewer interface element with a 100,000 pixels height bound), the buffer update threshold may not be exceeded. In another example, if the user actuates the custom scroll bar, a scroll offset associated with the viewer interface element may be utilized to determine whether the virtual pixel space position exceeds the buffer update threshold (e.g., via a calculation such as IF ((virtual pixel space position<scroll offset+the upper buffer update threshold) OR (virtual pixel space position>scroll offset+the lower buffer update threshold) THEN the buffer update threshold was exceeded).

If the buffer update threshold for the viewer interface element was not exceeded, contents of the viewer interface element may be translated at 453. For example, the contents of the viewer interface element may be translated in the Y direction when the viewer interface element is structured to scroll the pixel space vertically. In one implementation, the browser may be utilized to translate the contents of the viewer interface element. For example, if the user actuated a mouse scroll wheel on, actuated a touchpad scroll on, dragged, swiped, and/or the like the viewer interface element (e.g., to scroll in the viewer interface element), the web browser may be utilized to translate the contents of the HTML DIV element in the Y direction. In another example, if the user actuated the custom scroll bar, the web browser may be instructed (e.g., using JavaScript commands) to translate the contents of the HTML DIV element in the Y direction to a location corresponding to the virtual scroll space position (e.g., if a click on the scroll bar track above the scroll thumb is set to correspond to scrolling up 100 pixels, the contents of the HTML DIV element may be translated 100 pixels up in response to the click).

A determination may be made at 457 whether lazy loading is utilized to load page data for a currently buffered subset of page nodes from the virtual pixel space. In one embodiment, lazy loading may not be utilized and the page data for the currently buffered subset of page nodes may already be loaded (e.g., as discussed with regard to 481). In another embodiment, lazy loading may be utilized and page data for a cached subset of the currently buffered subset of page nodes may be lazy loaded.

If lazy loading is utilized to load page data for the currently buffered subset of page nodes, uncached page nodes to load may be determined at 461. In one embodiment, a cached subset of the currently buffered subset of page nodes may be cached with lazy loading. In one implementation, the cached subset may comprise a specified number of page nodes (e.g., 40 page nodes (e.g., which may be specified in a variety of ways such as based on a number of pixels (e.g., up to 20,000 pixels) or based on the number of document page images to cache)) for which page data (e.g., document page images) may be cached (e.g., in the image cache). In one embodiment, the virtual pixel space position may be used to determine a currently cached subset of the cached subset of page nodes. In one implementation, the currently cached subset may comprise a specified number of page nodes (e.g., 20 page nodes (e.g., which may be specified in a variety of ways such as based on a number of pixels (e.g., up to 10,000 pixels) or based on the number of document page images to cache)) with a current page node corresponding to the virtual pixel space position (e.g., 73,501) approximately in the middle (e.g., such that some page nodes above and below the current page node are in the currently cached subset). It is to be understood that the current page node may not be approximately in the middle for edge cases (e.g., near the top or bottom of the virtual pixel space). For example, if the virtual pixel space position is 73,501, the page node at index 148 may be the current page node and the 20 page nodes at indexes 139 through 158 may be in the currently cached subset (e.g., see FIG. 9 at 918). See FIG. 5 for additional details regarding how to determine a page node corresponding to a virtual pixel space position. In another embodiment, the cached subset may also comprise a previously cached subset of the cached subset of page nodes (e.g., from other locations in the virtual pixel space). In one implementation, the previously cached subset may comprise any remaining space in the cached subset that is not taken up by the currently cached subset (e.g., the other 20 out of the 40 page nodes) with previously cached retained page nodes determined using a specified cache replacement policy (e.g., least recently used (LRU) policy used to determine page data to expunge). For example, the 20 page nodes at indexes 11 through 30 may be in the previously cached subset (e.g., see FIG. 9 at 916). In one embodiment, page nodes in the currently cached subset that have not been cached yet may be determined as the uncached page nodes to load. In one implementation, the currently cached subset may be determined based on the virtual pixel space position as discussed above, and page nodes in the currently cached subset for which page data is not yet in a cache (e.g., in the image cache) may be determined as the uncached page nodes to load.

Page data for the uncached page nodes may be loaded via corresponding layer node(s) at 465. For example, a document page image for an uncached page node (e.g., the page node at index 148) may be obtained via a layer node of image layer type associated with the uncached page node via one or more SQL statements substantially in the following form:

SELECT LayerData
FROM Nodes
WHERE    NodeID=ID_PageNode_148    AND LayerType=TYPE_IMAGE;

In one implementation, the page data for the uncached page nodes may be loaded into the viewer interface element (e.g., into the HTML DIV element) and/or cached (e.g., in the image cache).

If the buffer update threshold for the viewer interface element was exceeded, a buffered subset of page nodes from the virtual pixel space may be determined at 473. For example, a buffered subset of the filtered page nodes corresponding to the selected view filter parameters may be determined. In one embodiment, the buffered subset of page nodes from the virtual pixel space may comprise page nodes that fit within the height bound (e.g., 100,000 pixels) associated with the viewer interface element with a current page node corresponding to the virtual pixel space position (e.g., 89,501) approximately in the middle (e.g., such that some page nodes above and below the current page node are in the buffered subset of page nodes from the virtual pixel space). It is to be understood that the current page node may not be approximately in the middle for edge cases (e.g., near the top or bottom of the virtual pixel space). In one implementation, a first buffered page node and/or a last buffered page node of the buffered subset of page nodes from the virtual pixel space may be determined using the virtual pixel space data structure based on the virtual pixel space position and the height bound. For example, the first buffered page node and the last buffered page node may be determined as follows:

The First Buffered Page Node
   Half of the height bound=100,000/2=50,000
     Calculated first pixel position=Virtual pixel space position−Half of the height bound=89,501−50,000=39,501
     The first buffered page node=closest page node in the virtual pixel space data structure with a first pixel position that is more than or equal to the calculated first pixel position=page node 80 (e.g., with a first pixel position=39,501, for page heights of 500 pixels)

The Last Buffered Page Node
   Half of the height bound=100,000/2=50,000
     Calculated last pixel position=Virtual pixel space position+Half of the height bound=89,501+50,000=139,501
     The last buffered page node=closest page node in the virtual pixel space data structure with a last pixel position that is less than or equal to the calculated last pixel position=page node 279 (e.g., with a last pixel position=139,500, for page heights of 500 pixels)

It is to be understood that, in some embodiments, the determination of the buffered subset of page nodes from the virtual pixel space may be affected by other layout considerations (e.g., heights of white space between pages, heights of borders around pages, heights of page headers and/or footers).

A determination may be made at 477 whether lazy loading is utilized to load page data for the determined buffered subset of page nodes from the virtual pixel space. In one embodiment, lazy loading may not be utilized and the page data for the determined buffered subset of page nodes may be loaded. In another embodiment, lazy loading may be utilized and page data for a cached subset of the determined buffered subset of page nodes may be lazy loaded.

If lazy loading is not utilized, page data for the determined buffered subset of page nodes may be loaded via corresponding layer node(s) at 481. For example, a document page image for a buffered page node may be obtained via a layer node of image layer type associated with the buffered page node via one or more SQL statements (e.g., as discussed with regard to 465). In one implementation, the page data for the determined buffered subset of page nodes may be loaded into the viewer interface element (e.g., into the HTML DIV element) and/or cached (e.g., in the image cache).

If lazy loading is utilized to load page data for the determined buffered subset of page nodes, uncached page nodes to load may be determined at 485. In one embodiment, a cached subset of the determined buffered subset of page nodes may be cached with lazy loading. In one implementation, the cached subset may comprise a specified number of page nodes (e.g., 40 page nodes (e.g., which may be specified in a variety of ways such as based on a number of pixels (e.g., up to 20,000 pixels) or based on the number of document page images to cache)) for which page data (e.g., document page images) may be cached (e.g., in the image cache). In one embodiment, the virtual pixel space position may be used to determine a currently cached subset of the cached subset of page nodes. In one implementation, the currently cached subset may comprise a specified number of page nodes (e.g., 20 page nodes (e.g., which may be specified in a variety of ways such as based on a number of pixels (e.g., up to 10,000 pixels) or based on the number of document page images to cache)) with a current page node corresponding to the virtual pixel space position (e.g., 89,501) approximately in the middle (e.g., such that some page nodes above and below the current page node are in the currently cached subset). It is to be understood that the current page node may not be approximately in the middle for edge cases (e.g., near the top or bottom of the virtual pixel space). For example, if the virtual pixel space position is 89,501, the page node at index 180 may be the current page node and the 20 page nodes at indexes 171 through 190 may be in the currently cached subset (e.g., see FIG. 10 at 1020). See FIG. 5 for additional details regarding how to determine a page node corresponding to a virtual pixel space position. In another embodiment, the cached subset may also comprise a previously cached subset of the cached subset of page nodes (e.g., from other locations in the virtual pixel space). In one implementation, the previously cached subset may comprise any remaining space in the cached subset that is not taken up by the currently cached subset (e.g., the other 20 out of the 40 page nodes) with previously cached retained page nodes determined using a specified cache replacement policy (e.g., least recently used (LRU) policy used to determine page data to expunge). For example, the 20 page nodes at indexes 139 through 158 may be in the previously cached subset (e.g., see FIG. 10 at 1018). In one embodiment, page nodes in the currently cached subset that have not been cached yet may be determined as the uncached page nodes to load. In one implementation, the currently cached subset may be determined based on the virtual pixel space position as discussed above, and page nodes in the currently cached subset for which page data is not yet in a cache (e.g., in the image cache) may be determined as the uncached page nodes to load.

Page data for the uncached page nodes may be loaded via corresponding layer node(s) at 489. For example, a document page image for an uncached page node (e.g., the page node at index 180) may be obtained via a layer node of an image layer type associated with the uncached page node (e.g., via one or more SQL statements). In one implementation, the page data for the uncached page nodes may be loaded into the viewer interface element (e.g., into the HTML DIV element) and/or cached (e.g., in the image cache).

If the page positioning was not affected by the user interaction command, a determination may be made at 491 whether page display was affected by the user interaction command. For example, if the user interaction command is a user page interaction command such as an area selection command, a search command, a highlight command, a show page annotations command, and/or the like, the page display may be affected (e.g., additional page data may be loaded via corresponding layer node(s) and/or portion(s) of affected page(s) may be highlighted).

If the page display was affected by the user interaction command, additional layer data to load for affected page node(s) may be determined at 493. For example, for an area selection command on a target page, an embedded image (e.g., from embeddings data) associated with the selected area (e.g., determined based on pixel coordinates of the selected area) may be retrieved and/or the selected area (e.g., the embedded image that the user may copy to the clipboard) may be shown as selected (e.g., via highlighting). In another example, for a search command, text (e.g., from OCR data for the filtered page nodes corresponding to the selected view filter parameters) may be searched for a search term and/or page area(s) that contain the search term may be highlighted. In another example, for a highlight command on a target page, text (e.g., from OCR data) associated with the selected area (e.g., determined based on pixel coordinates of the selected area) may be retrieved and/or the selected area (e.g., text that the user may copy to the clipboard) may be highlighted (e.g., using a color specified by the user). In another example, for a show page annotations command, entity extractions (e.g., from page level entity extractions data for the filtered page nodes corresponding to the selected view filter parameters) may be determined and/or page area(s) that contain the entity extractions may be highlighted. In one implementation, the determined event details associated with the user interaction command may be analyzed to determine which additional layer data to load (e.g., based on specified parameters (e.g., a search term, pixel coordinates) in the determined event details and/or based on configuration settings associated with each interface interaction mechanism).

The additional layer data for the affected page node(s) may be loaded via corresponding layer node(s) at 495. For example, an embedded image for an affected page node may be obtained via a layer node of embeddings layer type associated with the affected page node (e.g., via one or more SQL statements). In another example, OCR text for an affected page node may be obtained via a layer node of OCR layer type associated with the affected page node (e.g., via one or more SQL statements). In another example, entity extractions for an affected page node may be obtained via a layer node of page level entity extractions type associated with the affected page node (e.g., via one or more SQL statements). In one implementation, the additional layer data may be analyzed to determine how the page display is changed (e.g., which area(s) to highlight and/or which color(s) to utilize for highlighting).

The page display for the affected page node(s) may be updated at 497. In one implementation, the viewer interface element (e.g., the HTML DIV element) may be updated to reflect (e.g., to show) the changes on the pages corresponding to the affected page node(s). For example, an area of a page may be highlighted. In another example, OCR text may be added as an element (e.g., visible, hidden) of the viewer interface element (e.g., to facilitate copying of the OCR text to the clipboard).

FIG. 5 shows data structures in one embodiment of the DDVME. In FIG. 5, exemplary virtual pixel space data structures that may be utilized by the DDVME to define a virtual pixel space (e.g., corresponding to specified view filter parameters) are illustrated.

In one implementation, a virtual pixel space data structure 510 may be utilized. This virtual pixel space data structure may comprise a pixel range vector of pages in the virtual pixel space (e.g., a vector of heights). For example, an index may be associated with a page node and a data element corresponding to the index may specify (e.g., in an additive manner) a last pixel position of a document page image (e.g., a page) corresponding to the page node. It is to be understood that, in some alternative implementations, the pixel range vector of pages may instead specify (e.g., in an additive or in a non-additive manner) a first pixel position (e.g., 1, 701, 1401, etc.), a first pixel position and a last pixel position (e.g., 1 and 700, 701 and 1400, 1401 and 2000, etc.), and/or the like to define the virtual pixel space.

In another implementation, a virtual pixel space data structure 520 may be utilized. This virtual pixel space data structure may comprise a vector of page data structures corresponding to pages in the virtual pixel space. For example, a page data structure may specify a page node identifier, a pixel range (e.g., a last pixel position of a document page image), a zoom level (e.g., to provide different zoom levels for different pages), a row cell index (e.g., to display multiple pages per row), and/or the like for a page in the virtual pixel space. It is to be understood that, in some alternative implementations, the pixel range may instead specify a first pixel position, a first pixel position and a last pixel position, and/or the like to define the virtual pixel space.

In one implementation, an index (e.g., which may be used to determine an associated page node) corresponding to a virtual pixel space position may be determined by searching through the virtual pixel space data structure (e.g., through the pixel range vector, through the vector of page data structures) to find the index with the smallest last pixel position that is more than or equal to the virtual pixel space position. For example, a virtual pixel space position of 1,000 may correspond to index 2 in the virtual pixel space data structures 510 and 520. In one embodiment, in which pages in the virtual pixel space have equal heights, the index may be determined via division (e.g., via a calculation such as index=ceiling(virtual pixel space position/height)). In another embodiment, in which pages in the virtual pixel space have different heights, the index may be determined via a search (e.g., via a binary search).

Figure 6:
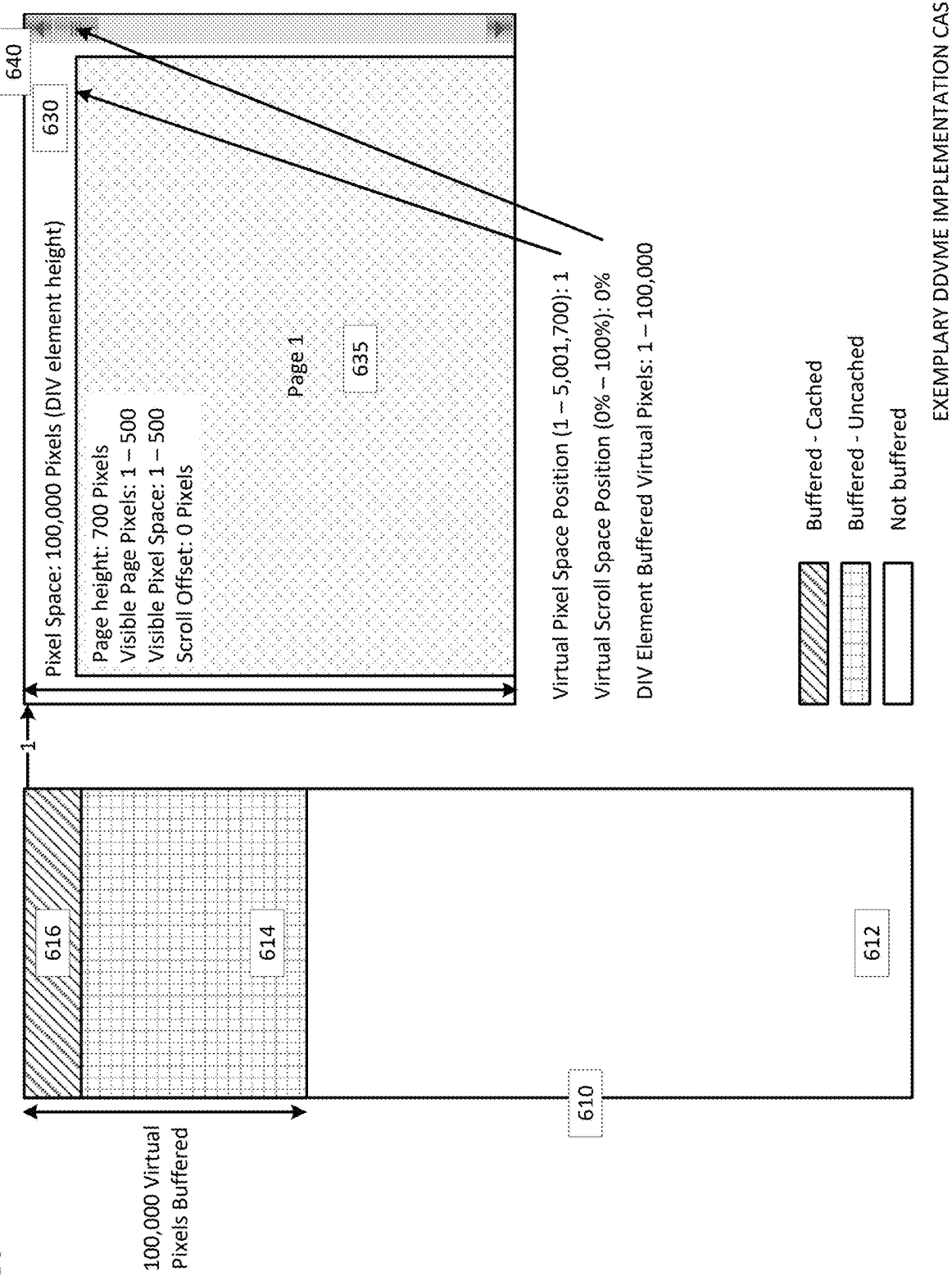
FIG. 6 shows implementation case(s) in one embodiment of the DDVME.

FIGS. 6-11 show implementation case(s) illustrating navigation by a user through a virtual pixel space (e.g., see FIG. 5) in one embodiment of the DDVME. In FIG. 6, an initial state (e.g., upon loading a case) is illustrated. The virtual pixel space (e.g., corresponding to specified view filter parameters) defined by a virtual pixel space data structure is shown at 610. The virtual pixel space comprises a not buffered subset (e.g., pages 201 through 10,002) shown at 612, a buffered subset (e.g., pages 1 through 200) shown at 614, and a cached subset of the buffered subset (e.g., pages 1 through 20) shown at 616. The buffered subset is approximately 100,000 pixels (e.g., virtual pixel space pixels 1 through 100,000) and corresponds to the pixel space (e.g., scroll offset of 0 pixels) of a viewer interface element (e.g., an HTML DIV element) shown at 630. Page 1, corresponding to index 1 of the virtual pixel space data structure, is shown in the viewer interface element at 635. A custom scroll bar that may be utilized to scroll through the virtual pixel space is shown at 640. Pixel 1 of the pixel space, corresponding to virtual pixel space position 1 and virtual scroll space position of 0%, is shown as a top pixel of the viewer interface element visible to the user. The viewer interface element is sized to show 500 pixels (e.g., pixels 1 through 500 of the pixel space, corresponding to pixels 1 through 500 of page 1, are visible).

Figure 7:
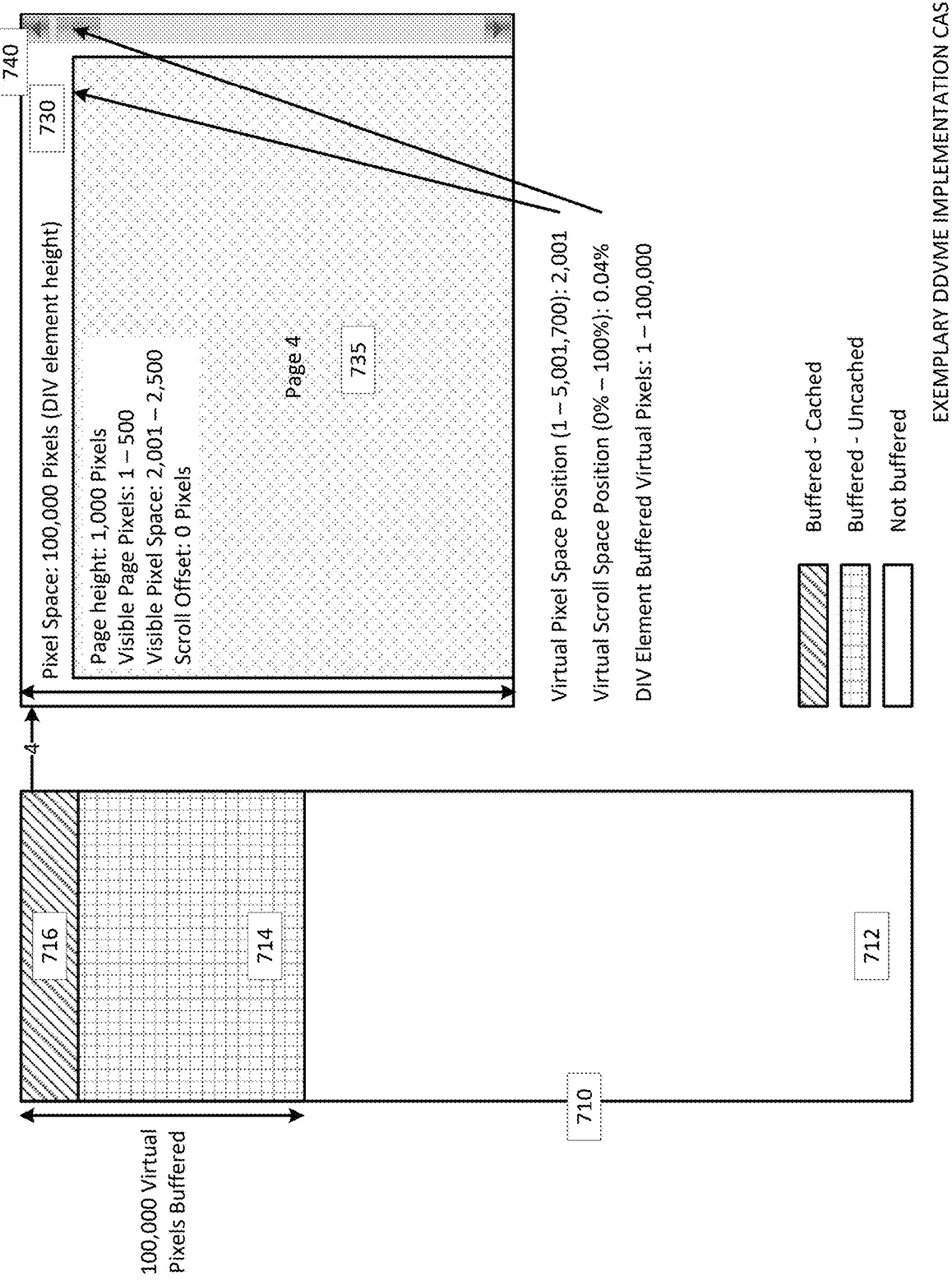
FIG. 7 shows implementation case(s) in one embodiment of the DDVME.

In FIG. 7, a subsequent state (e.g., after a scroll to page 4) is illustrated. The virtual pixel space defined by the virtual pixel space data structure is shown at 710. The virtual pixel space comprises a not buffered subset (e.g., pages 201 through 10,002) shown at 712, a buffered subset (e.g., pages 1 through 200) shown at 714, and a cached subset of the buffered subset (e.g., pages 1 through 20) shown at 716. The buffered subset is approximately 100,000 pixels (e.g., virtual pixel space pixels 1 through 100,000) and corresponds to the pixel space (e.g., scroll offset of 0 pixels) of the viewer interface element shown at 730. Page 4, corresponding to index 4 of the virtual pixel space data structure, is shown in the viewer interface element at 735. The custom scroll bar that may be utilized to scroll through the virtual pixel space is shown at 740. Pixel 2,001 of the pixel space, corresponding to virtual pixel space position 2,001 and virtual scroll space position of 0.04%, is shown as the top pixel of the viewer interface element visible to the user. The viewer interface element is sized to show 500 pixels (e.g., pixels 2,001 through 2,500 of the pixel space, corresponding to pixels 1 through 500 of page 4, are visible).

Figure 8:
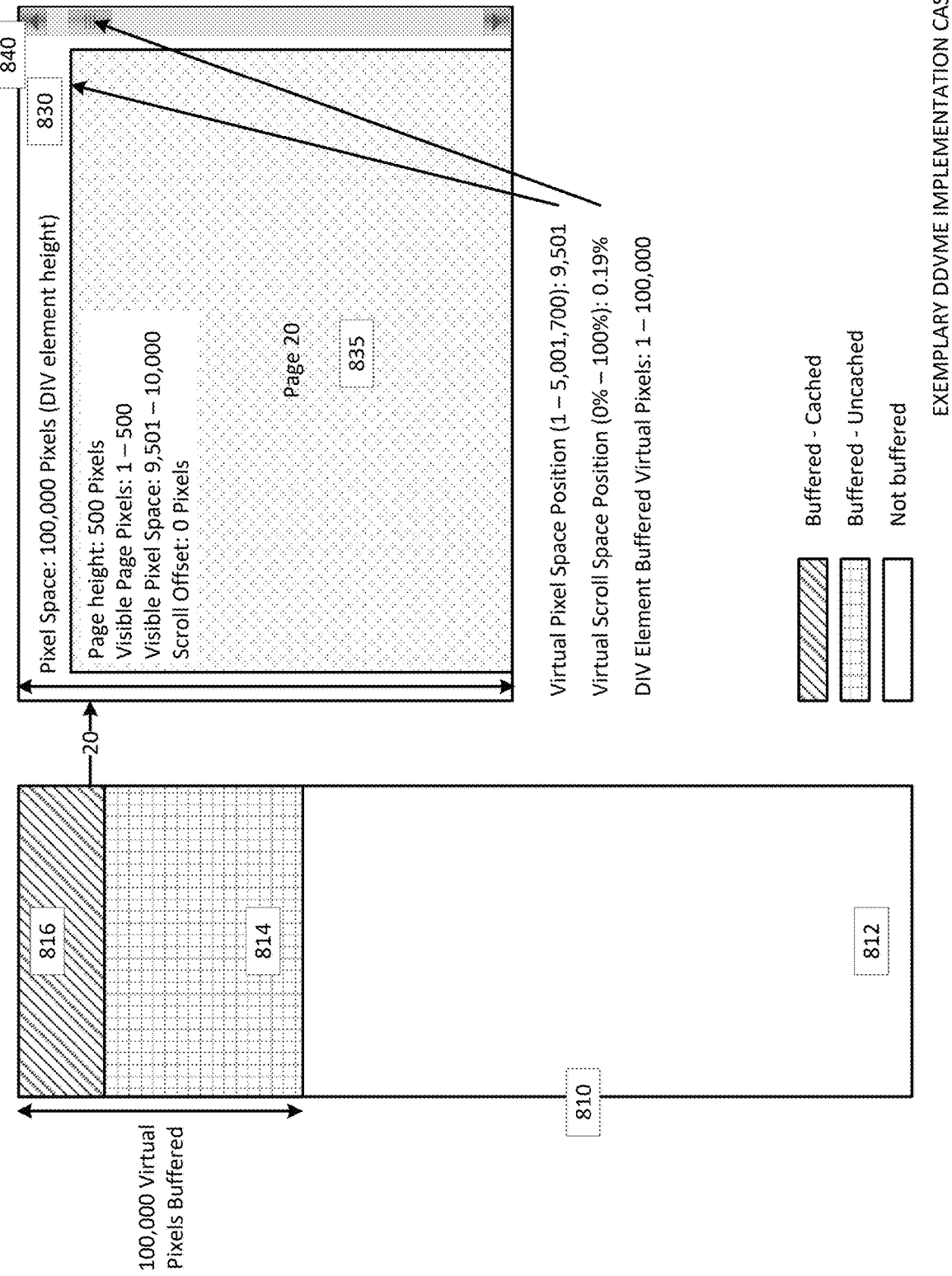
FIG. 8 shows implementation case(s) in one embodiment of the DDVME.

In FIG. 8, a subsequent state (e.g., after a scroll to page 20) is illustrated. The virtual pixel space defined by the virtual pixel space data structure is shown at 810. The virtual pixel space comprises a not buffered subset (e.g., pages 201 through 10,002) shown at 812, a buffered subset (e.g., pages 1 through 200) shown at 814, and a cached subset of the buffered subset (e.g., pages 1 through 30 (e.g., a currently cached subset of the cached subset that includes pages 11 through 30, and a previously cached subset of the cached subset that includes pages 1 through 10)) shown at 816. The buffered subset is approximately 100,000 pixels (e.g., virtual pixel space pixels 1 through 100,000) and corresponds to the pixel space (e.g., scroll offset of 0 pixels) of the viewer interface element shown at 830. Page 20, corresponding to index 20 of the virtual pixel space data structure, is shown in the viewer interface element at 835. The custom scroll bar that may be utilized to scroll through the virtual pixel space is shown at 840. Pixel 9,501 of the pixel space, corresponding to virtual pixel space position 9,501 and virtual scroll space position of 0.19%, is shown as the top pixel of the viewer interface element visible to the user. The viewer interface element is sized to show 500 pixels (e.g., pixels 9,501 through 10,000 of the pixel space, corresponding to pixels 1 through 500 of page 20, are visible).

Figure 9:
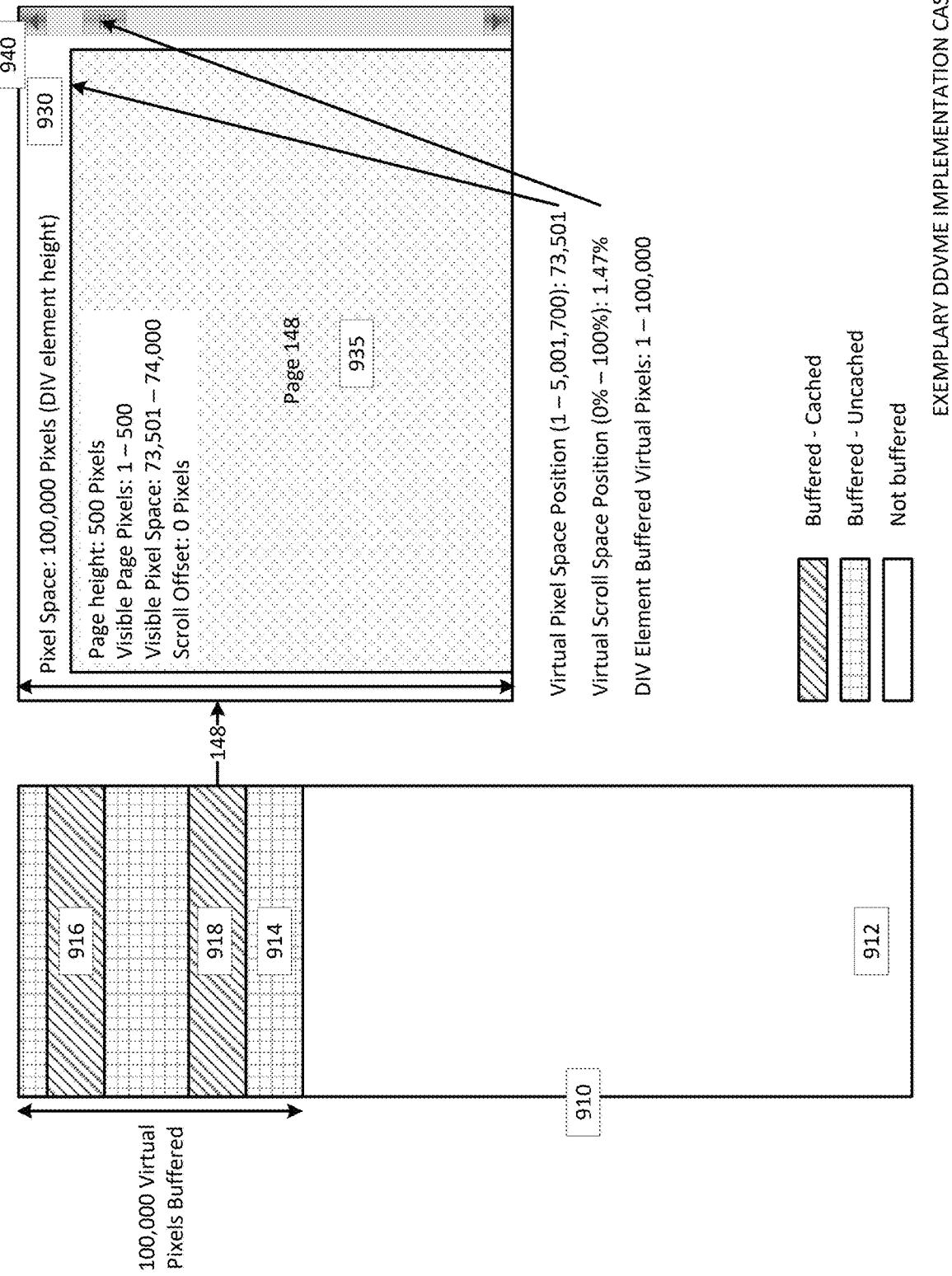
FIG. 9 shows implementation case(s) in one embodiment of the DDVME.

In FIG. 9, a subsequent state (e.g., after a scroll to page 148) is illustrated. The virtual pixel space defined by the virtual pixel space data structure is shown at 910. The virtual pixel space comprises a not buffered subset (e.g., pages 201 through 10,002) shown at 912, a buffered subset (e.g., pages 1 through 200) shown at 914, and a cached subset of the buffered subset (e.g., a currently cached subset of the cached subset that includes pages 139 through 158 shown at 918, and a previously cached subset of the cached subset that includes pages 11 through 30 shown at 916). The buffered subset is approximately 100,000 pixels (e.g., virtual pixel space pixels 1 through 100,000) and corresponds to the pixel space (e.g., scroll offset of 0 pixels) of the viewer interface element shown at 930. Page 148, corresponding to index 148 of the virtual pixel space data structure, is shown in the viewer interface element at 935. The custom scroll bar that may be utilized to scroll through the virtual pixel space is shown at 940. Pixel 73,501 of the pixel space, corresponding to virtual pixel space position 73,501 and virtual scroll space position of 1.47%, is shown as the top pixel of the viewer interface element visible to the user. The viewer interface element is sized to show 500 pixels (e.g., pixels 73,501 through 74,000 of the pixel space, corresponding to pixels 1 through 500 of page 148, are visible).

Figure 10:
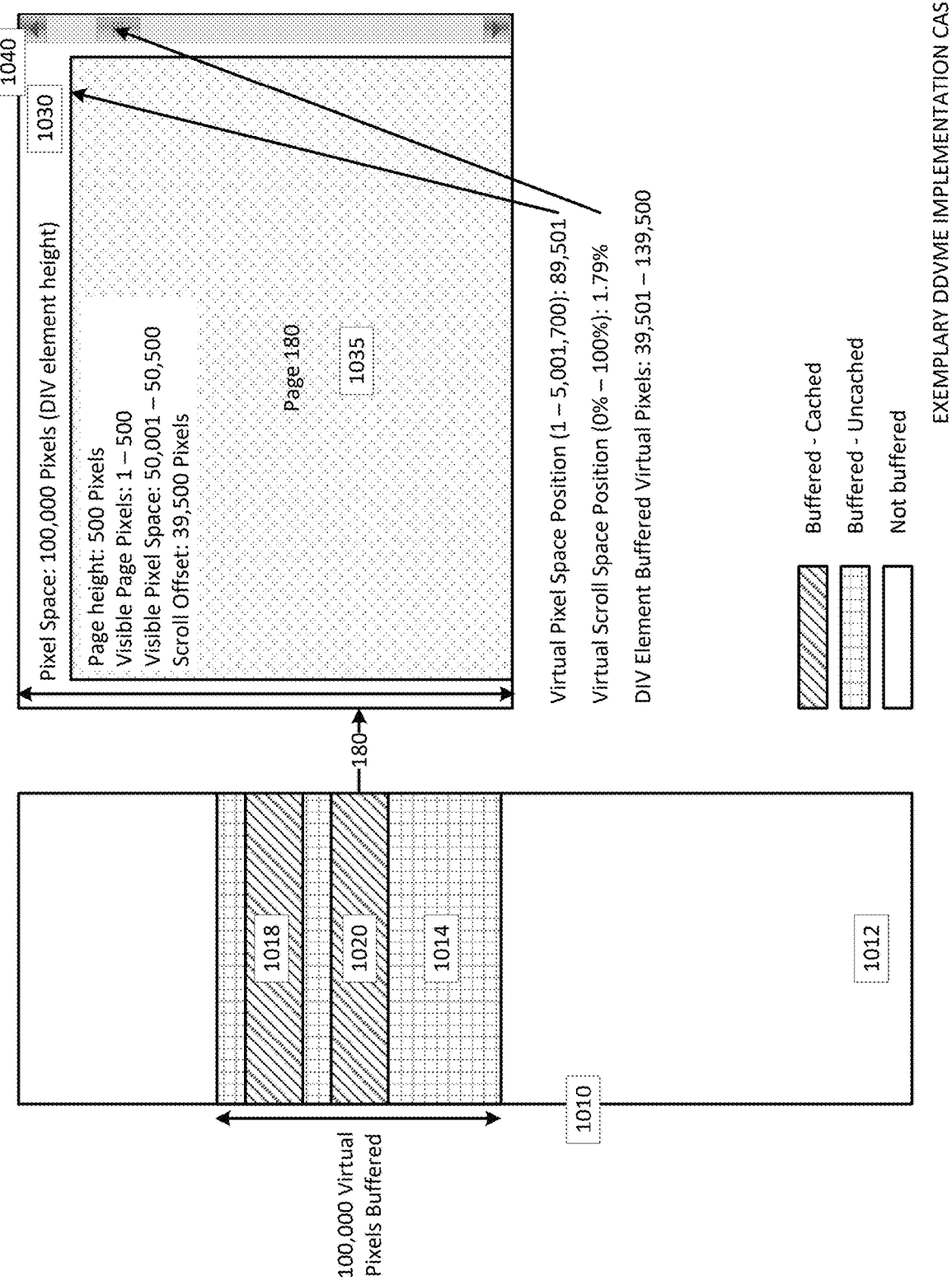
FIG. 10 shows implementation case(s) in one embodiment of the DDVME.

In FIG. 10, a subsequent state (e.g., after a scroll to page 180) is illustrated. The virtual pixel space defined by the virtual pixel space data structure is shown at 1010. The virtual pixel space comprises a not buffered subset (e.g., pages 1 through 79 and pages 280 through 10,002) shown at 1012, a buffered subset (e.g., pages 80 through 279) shown at 1014, and a cached subset of the buffered subset (e.g., a currently cached subset of the cached subset that includes pages 171 through 190 shown at 1020, and a previously cached subset of the cached subset that includes pages 139 through 158 shown at 1018). The buffered subset is approximately 100,000 pixels (e.g., virtual pixel space pixels 39,501 through 139,500) and corresponds to the pixel space (e.g., scroll offset of 39,500 pixels) of the viewer interface element shown at 1030. Page 180, corresponding to index 180 of the virtual pixel space data structure, is shown in the viewer interface element at 1035. The custom scroll bar that may be utilized to scroll through the virtual pixel space is shown at 1040. Pixel 50,001 of the pixel space, corresponding to virtual pixel space position 89,501 and virtual scroll space position of 1.79%, is shown as the top pixel of the viewer interface element visible to the user. The viewer interface element is sized to show 500 pixels (e.g., pixels 50,001 through 50,500 of the pixel space, corresponding to pixels 1 through 500 of page 180, are visible).

Figure 11:
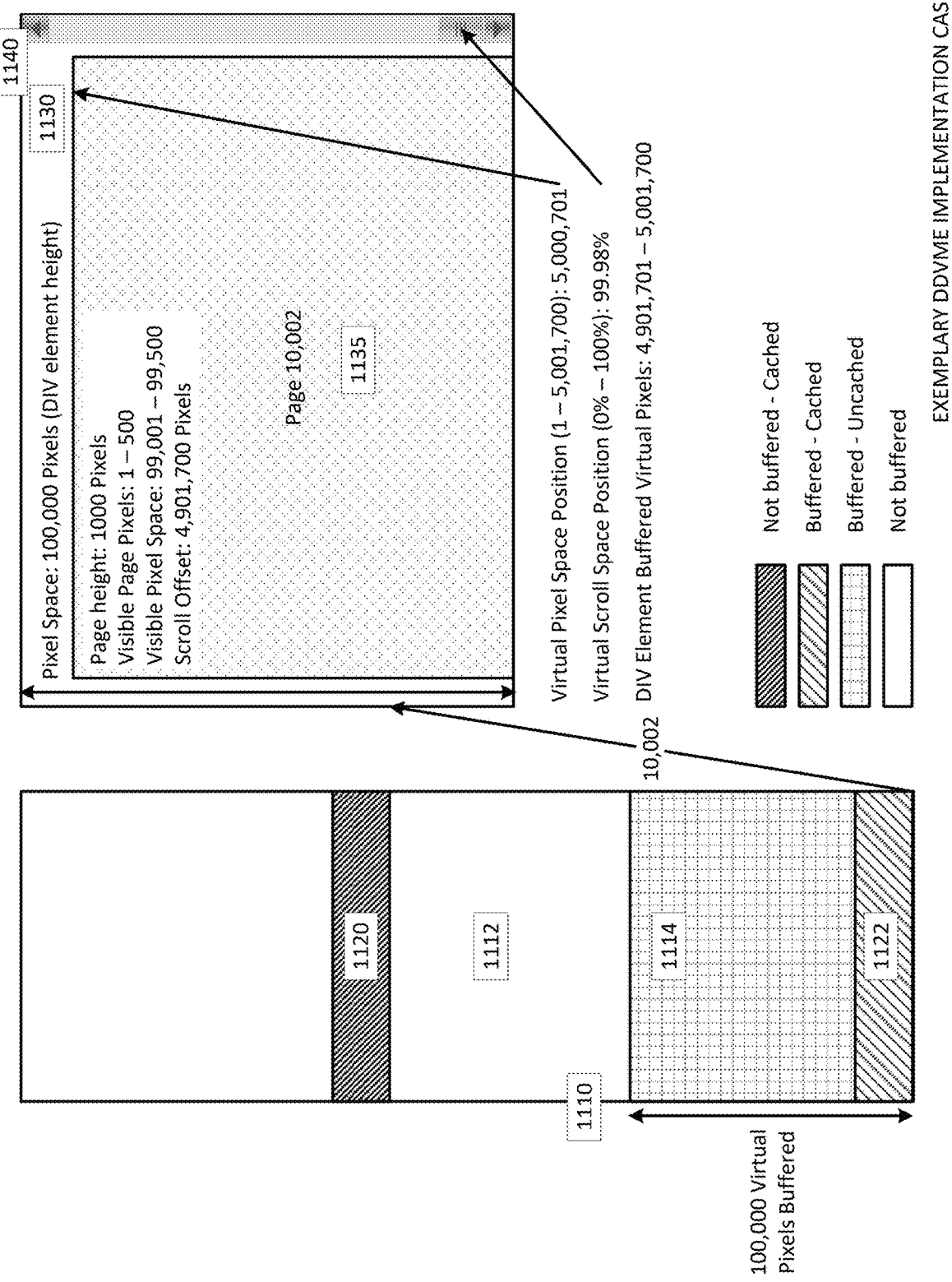
FIG. 11 shows implementation case(s) in one embodiment of the DDVME.

In FIG. 11, a subsequent state (e.g., after a scroll to page 10,002) is illustrated. The virtual pixel space defined by the virtual pixel space data structure is shown at 1110. The virtual pixel space comprises a not buffered subset (e.g., pages 1 through 9,802) shown at 1112, a buffered subset (e.g., pages 9,803 through 10,002) shown at 1114, and a cached subset (e.g., a currently cached subset of the buffered subset that includes pages 9,983 through 10,002 shown at 1122, and a previously cached subset of the not buffered subset that includes pages 171 through 190 shown at 1120 (e.g., in case the user is switching back and forth between pages 180 and 10,002)). The buffered subset is approximately 100,000 pixels (e.g., virtual pixel space pixels 4,901, 701 through 5,001,700) and corresponds to the pixel space (e.g., scroll offset of 4,901,700 pixels) of the viewer interface element shown at 1130. Page 10,002, corresponding to index 10,002 of the virtual pixel space data structure, is shown in the viewer interface element at 1135. The custom scroll bar that may be utilized to scroll through the virtual pixel space is shown at 1140. Pixel 99,001 of the pixel space, corresponding to virtual pixel space position 5,000,701 and virtual scroll space position of 99.98%, is shown as the top pixel of the viewer interface element visible to the user. The viewer interface element is sized to show 500 pixels (e.g., pixels 99,001 through 99,500 of the pixel space, corresponding to pixels 1 through 500 of page 10,002, are visible).

Figure 12:
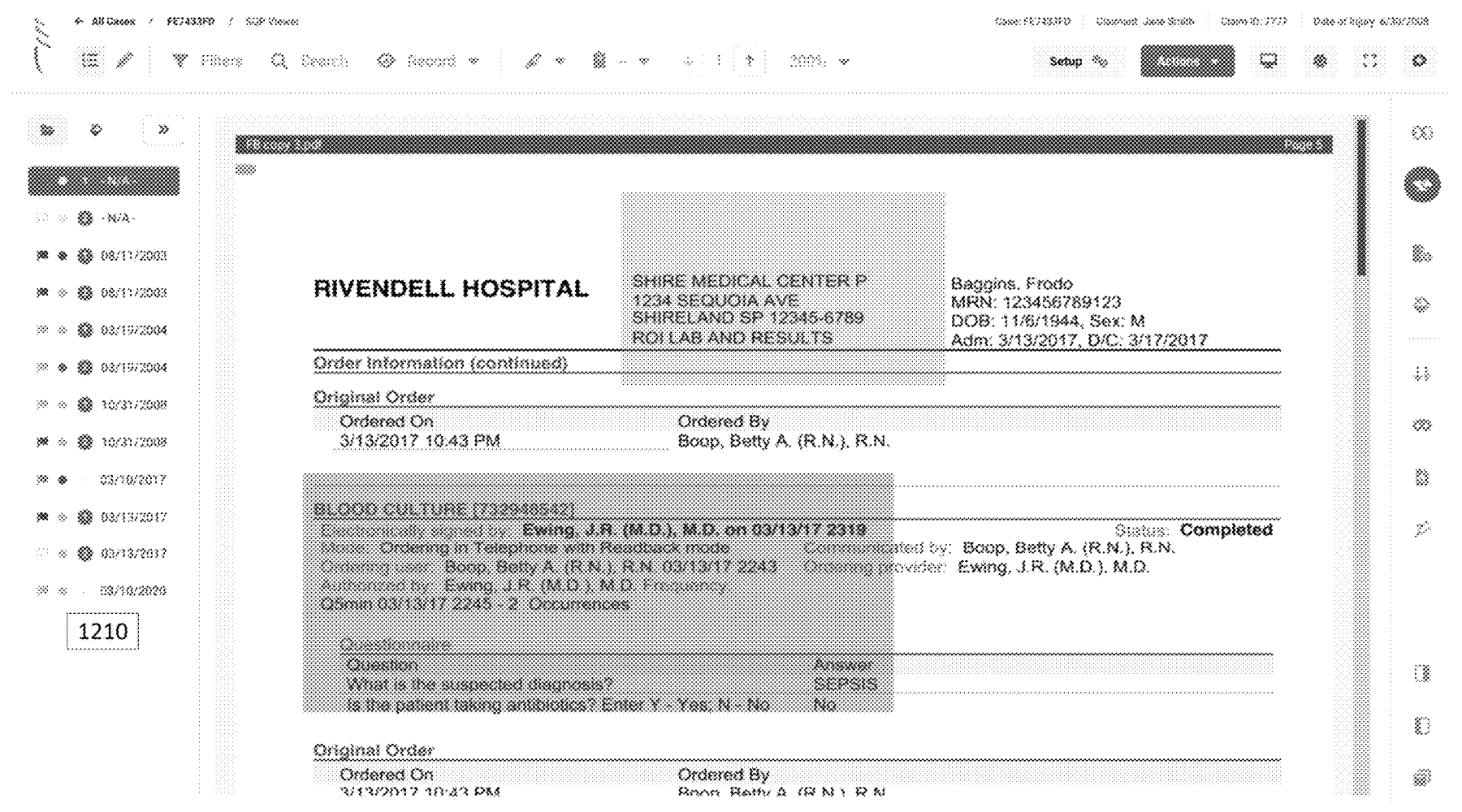

FIG. 12 shows screenshot diagram(s) in one embodiment of the DDVME. In FIG. 12, an exemplary user interface (e.g., for a mobile device, for a website) showing a record list 1210 open in mini view in light mode is illustrated.

Figure 13:
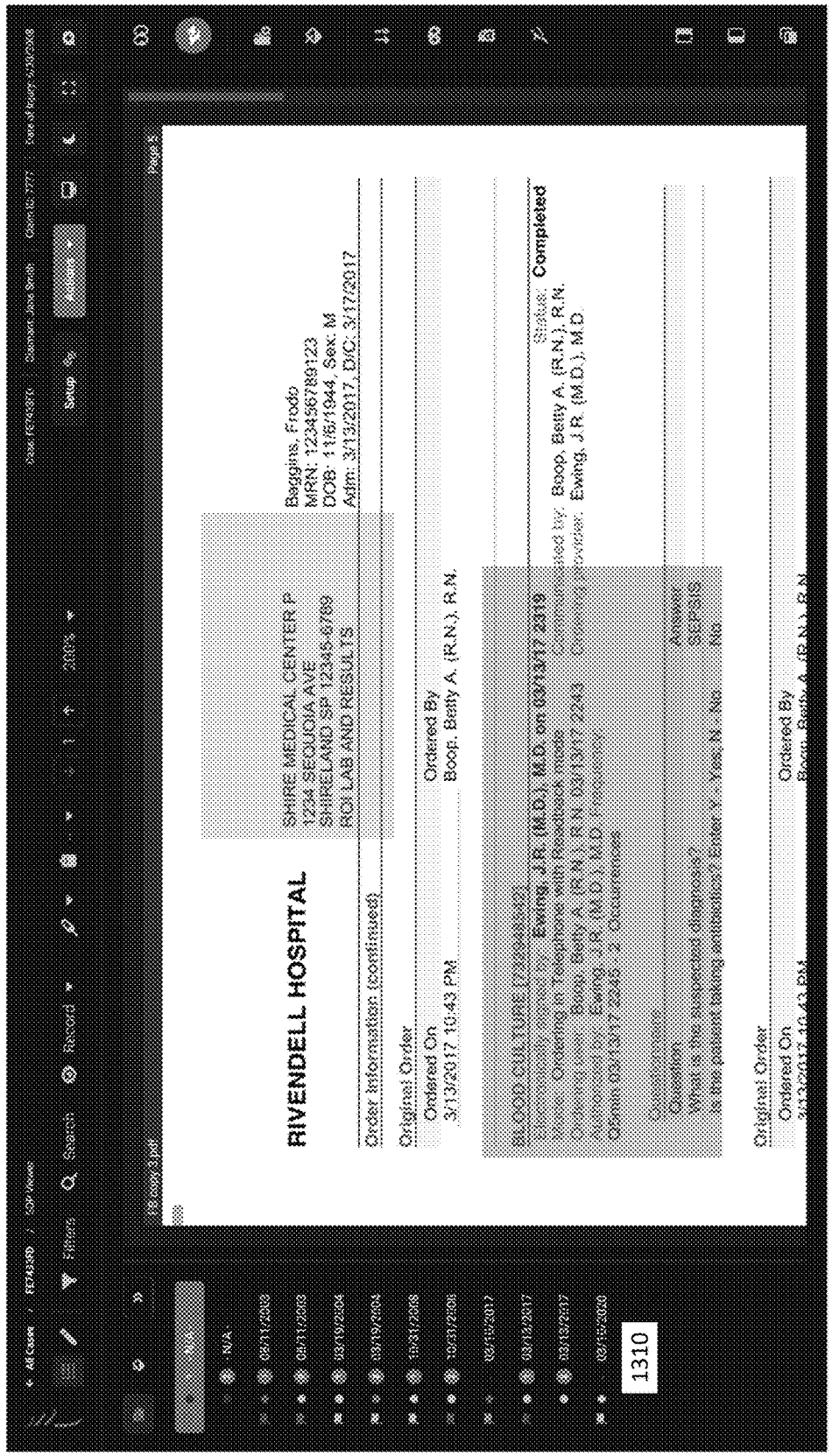
FIG. 13 shows screenshot diagram(s) in one embodiment of the DDVME.

FIG. 13 shows screenshot diagram(s) in one embodiment of the DDVME. In FIG. 13, an exemplary user interface (e.g., for a mobile device, for a website) showing a record list 1310 open in mini view in dark mode is illustrated.

Figure 14:
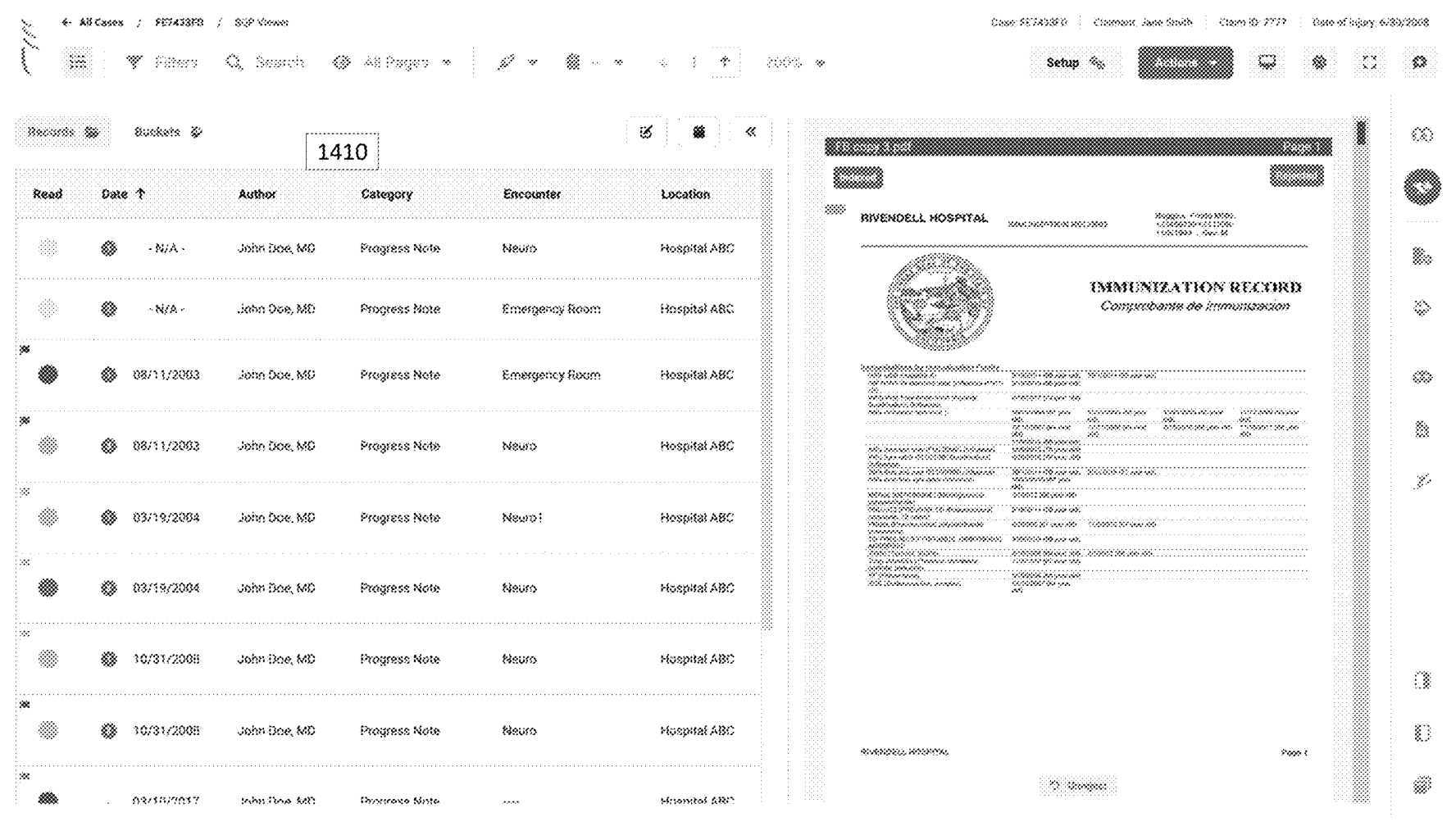

FIG. 14 shows screenshot diagram(s) in one embodiment of the DDVME. In FIG. 14, an exemplary user interface (e.g., for a mobile device, for a website) showing a record list 1410 open in table view in light mode is illustrated.

Figure 15:
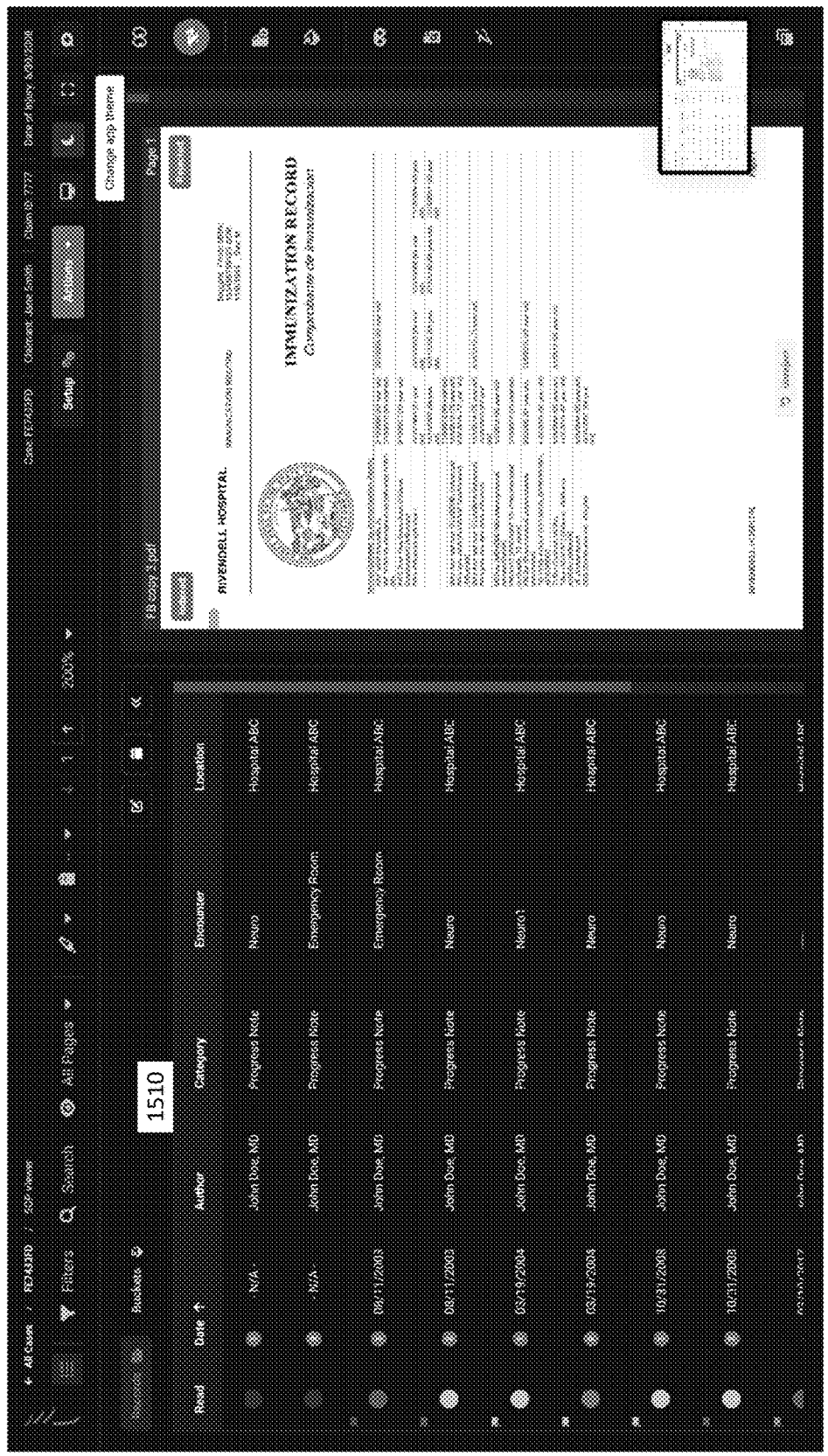
FIG. 15 shows screenshot diagram(s) in one embodiment of the DDVME.

FIG. 15 shows screenshot diagram(s) in one embodiment of the DDVME. In FIG. 15, an exemplary user interface (e.g., for a mobile device, for a website) showing a record list 1510 open in table view in dark mode is illustrated.

Figure 16:
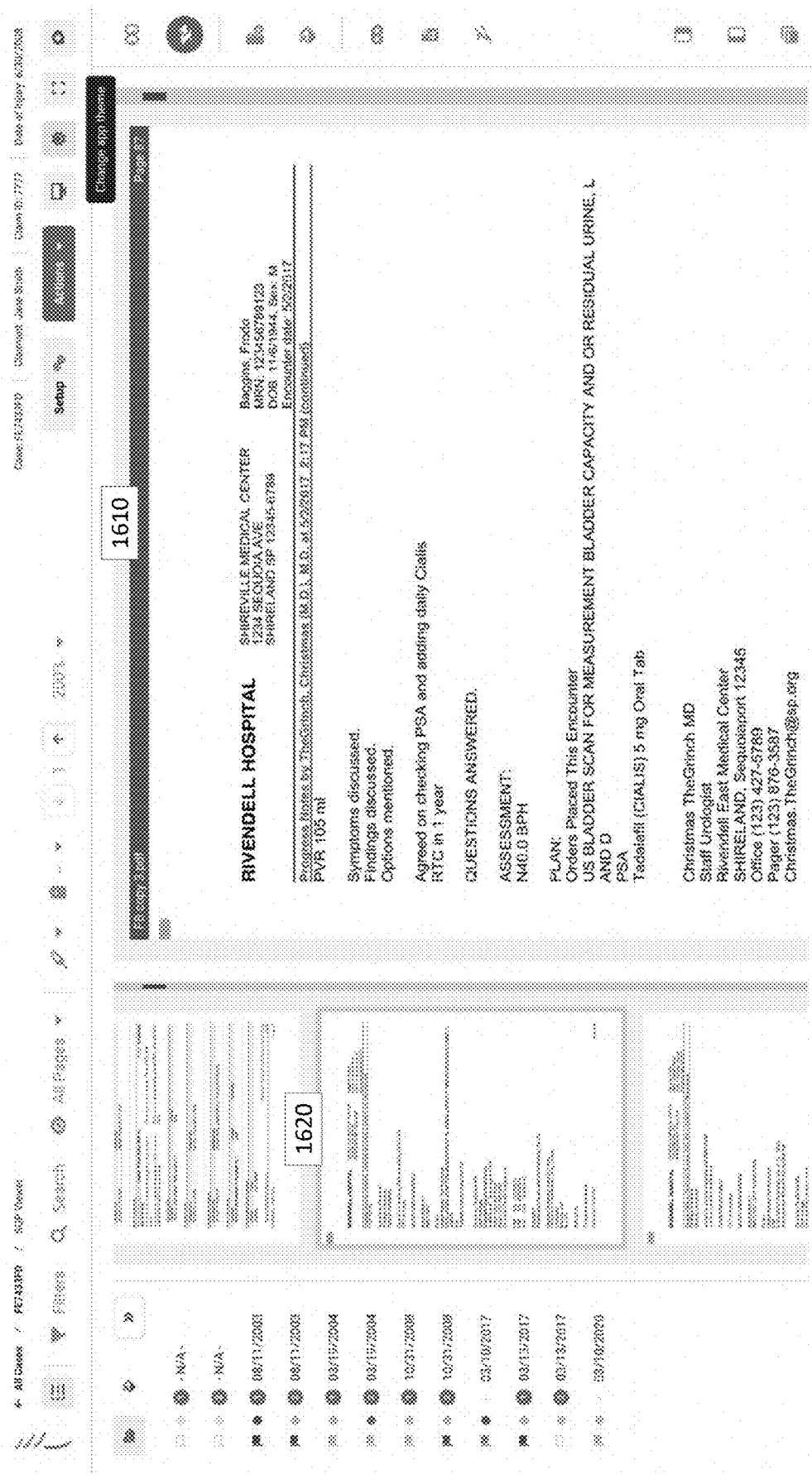
FIG. 16 shows screenshot diagram(s) in one embodiment of the DDVME.

FIG. 16 shows screenshot diagram(s) in one embodiment of the DDVME. In FIG. 16, an exemplary user interface (e.g., for a mobile device, for a website) showing a page viewer 1610 with mini map 1620 in light mode is illustrated.

Figure 17:
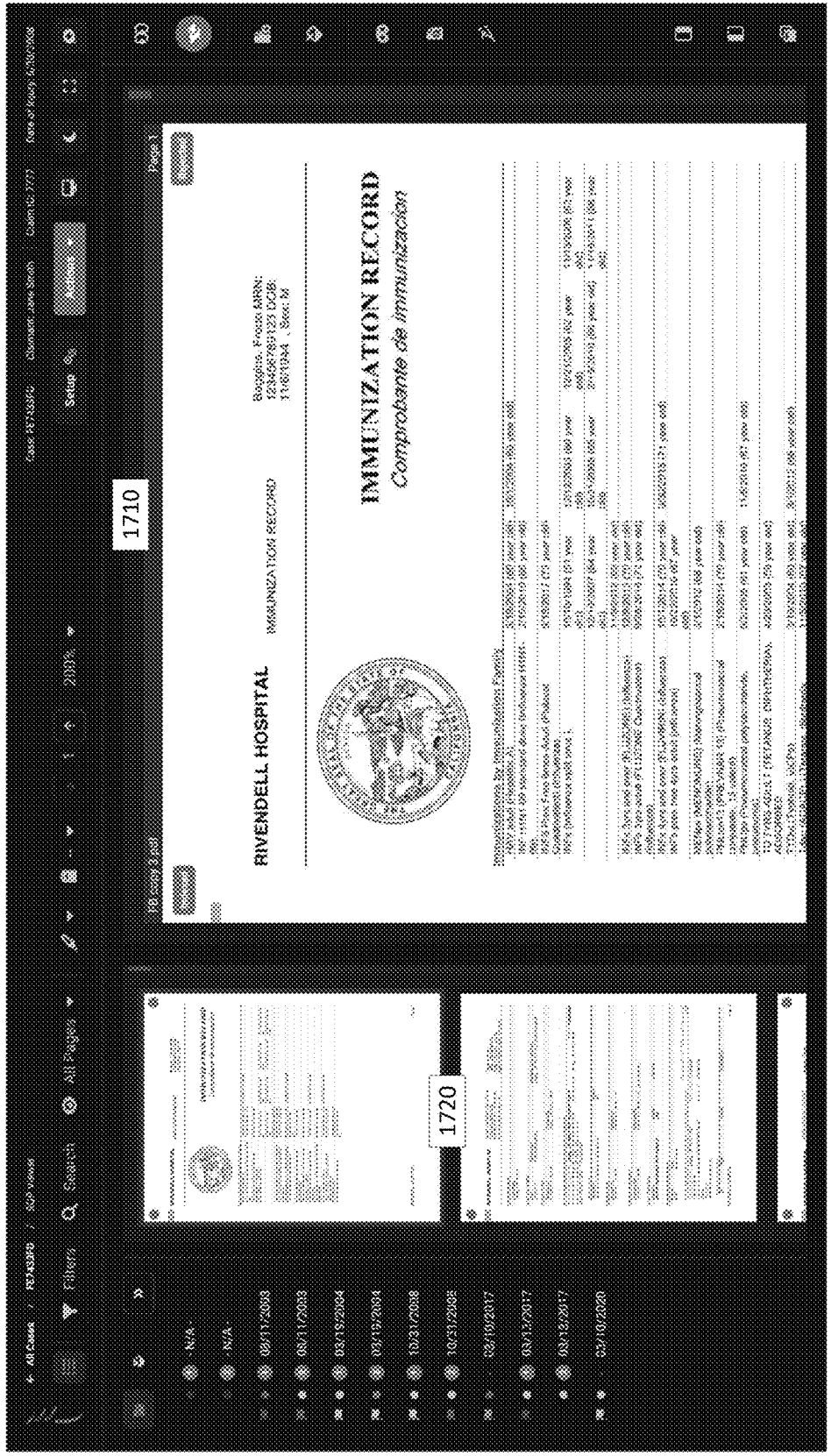
FIG. 17 shows screenshot diagram(s) in one embodiment of the DDVME.

FIG. 17 shows screenshot diagram(s) in one embodiment of the DDVME. In FIG. 17, an exemplary user interface (e.g., for a mobile device, for a website) showing a page viewer 1710 with mini map 1720 in dark mode is illustrated.

Figure 18:
FIG. 18 shows screenshot diagram(s) in one embodiment of the DDVME.

FIG. 18 shows screenshot diagram(s) in one embodiment of the DDVME. In FIG. 18, an exemplary user interface (e.g., for a mobile device, for a website) for bulk editing multiple records at once 1810 in light mode is illustrated.

Figure 19:
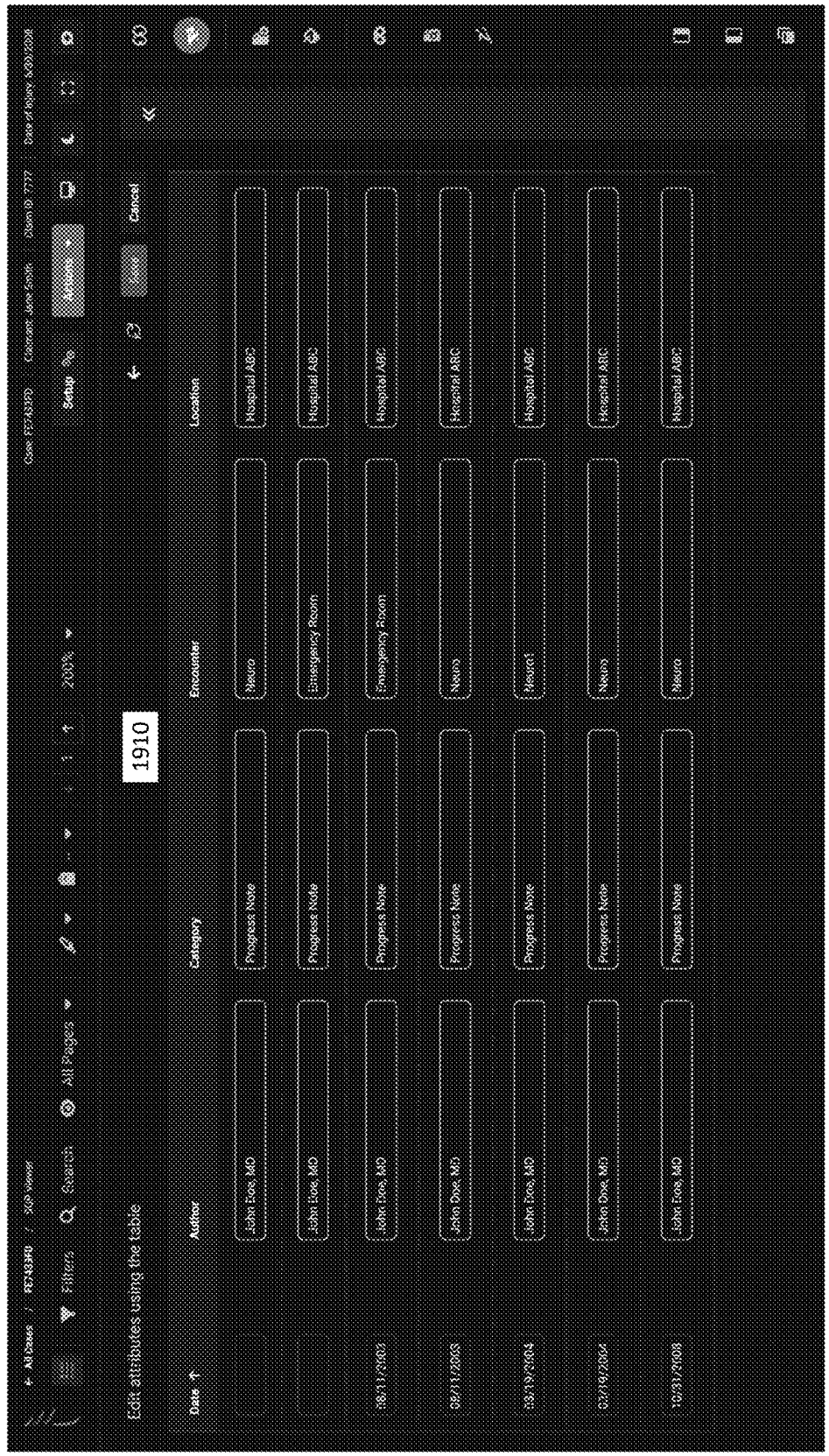
FIG. 19 shows screenshot diagram(s) in one embodiment of the DDVME.

FIG. 19 shows screenshot diagram(s) in one embodiment of the DDVME. In FIG. 19, an exemplary user interface (e.g., for a mobile device, for a website) for bulk editing multiple records at once 1910 in dark mode is illustrated.

Figure 20:
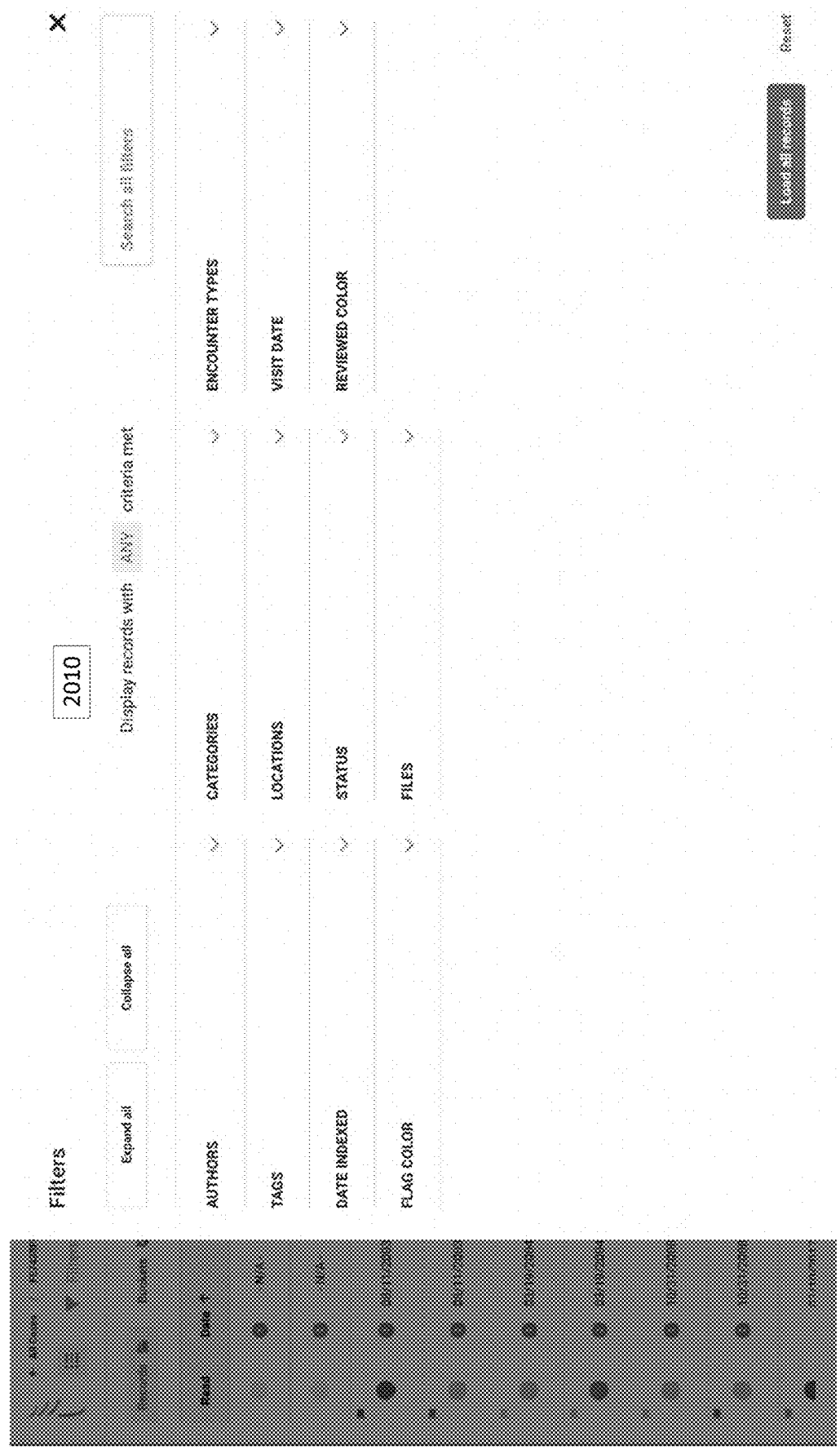
FIG. 20 shows screenshot diagram(s) in one embodiment of the DDVME.

FIG. 20 shows screenshot diagram(s) in one embodiment of the DDVME. In FIG. 20, an exemplary user interface (e.g., for a mobile device, for a website) for filtering records 2010 using a set of filters is illustrated. For example, records may be filtered based on authors, tags, date indexed, flag color, categories, locations, status, files, encounter types, visit date, reviewed color, and/or the like attributes. It is to be understood that records may be filtered based on a union (e.g., any) or intersection (e.g., all) of criteria.

Figure 21:
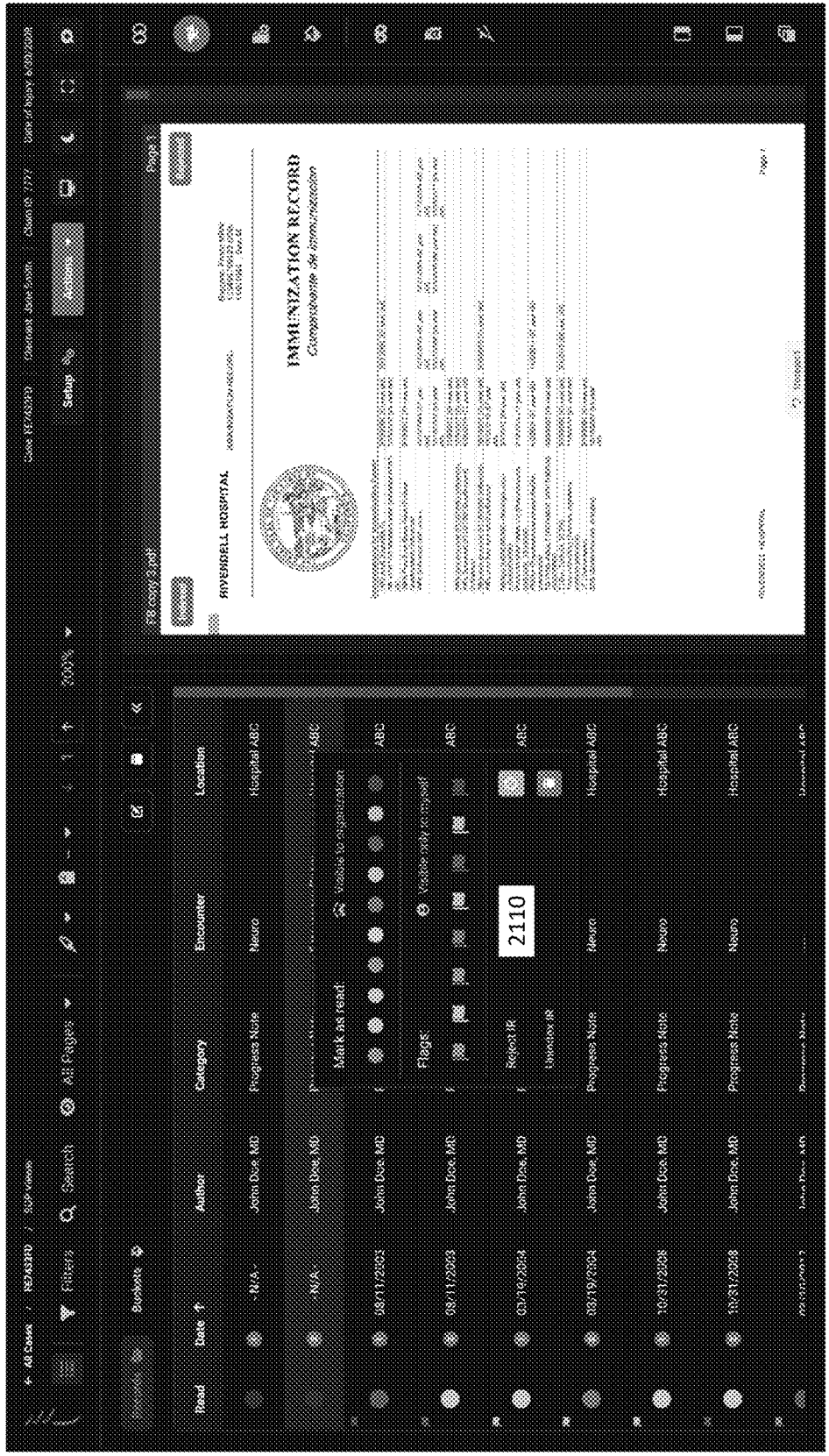
FIG. 21 shows screenshot diagram(s) in one embodiment of the DDVME.

FIG. 21 shows screenshot diagram(s) in one embodiment of the DDVME. In FIG. 21, an exemplary user interface (e.g., for a mobile device, for a website) for marking records as read and/or flagging records 2110 in dark mode is illustrated.

Figure 22:
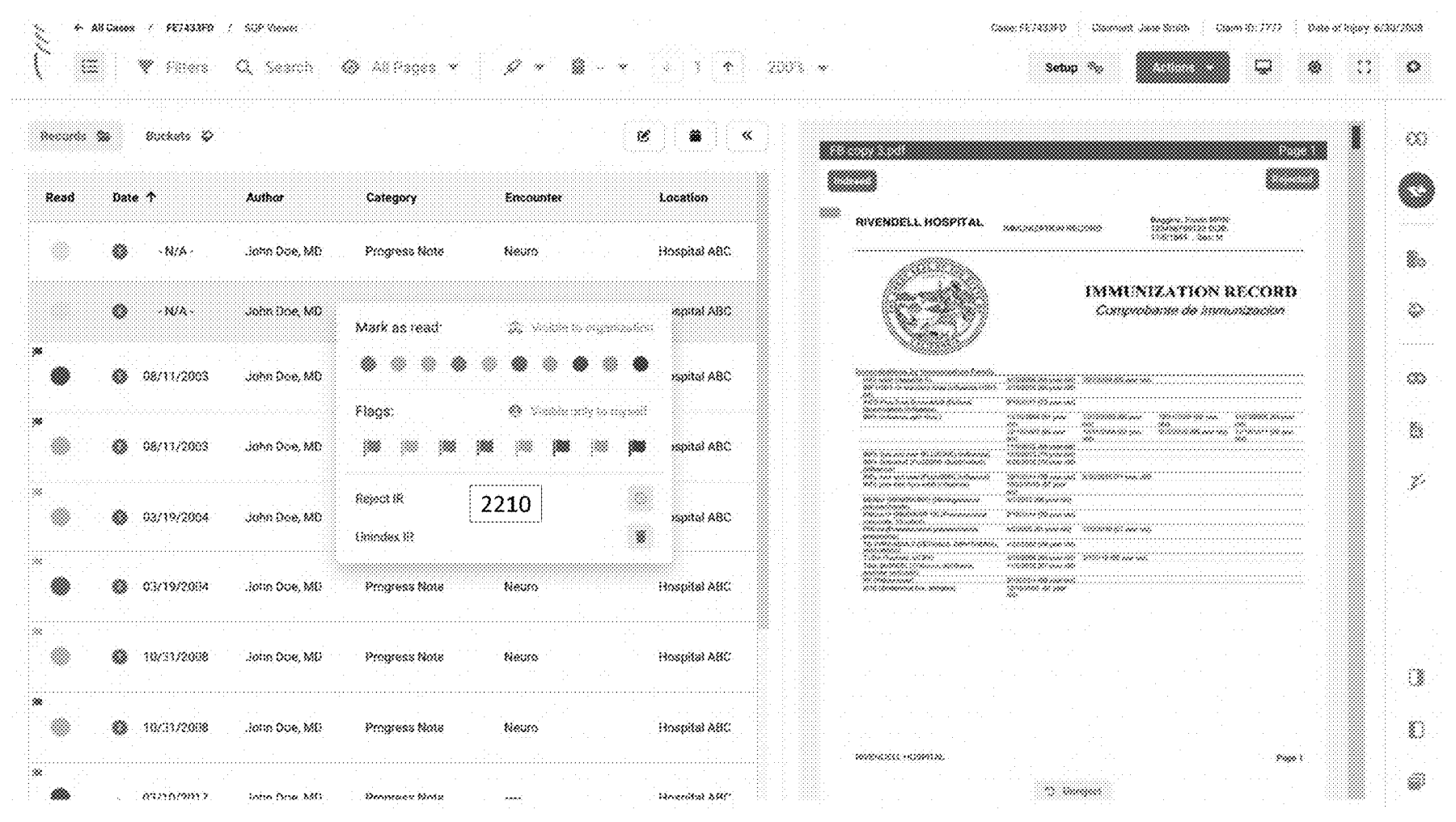

FIG. 22 shows screenshot diagram(s) in one embodiment of the DDVME. In FIG. 22, an exemplary user interface (e.g., for a mobile device, for a website) for marking records as read and/or flagging records 2210 in light mode is illustrated.

Figure 23:
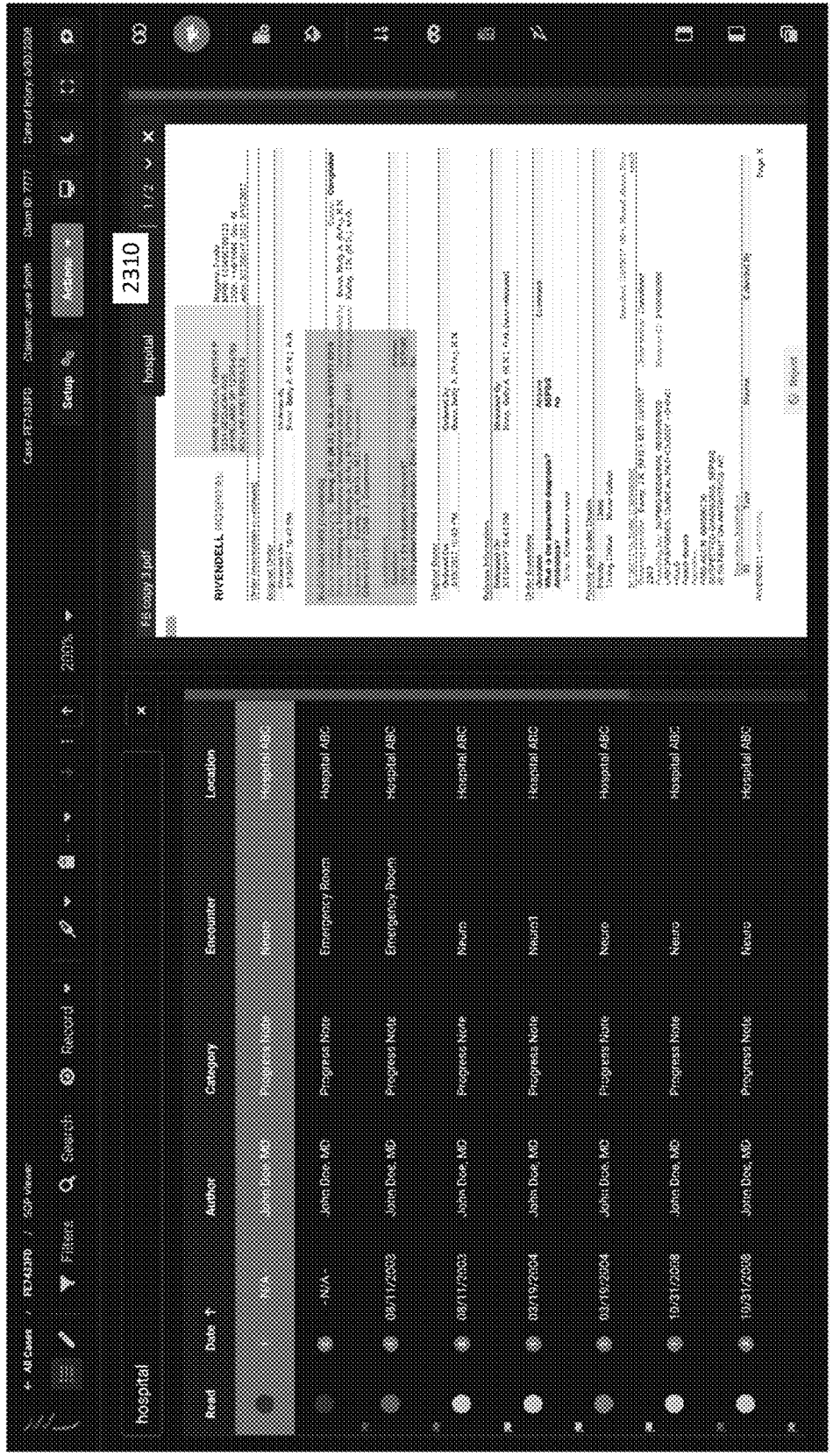
FIG. 23 shows screenshot diagram(s) in one embodiment of the DDVME.

FIG. 23 shows screenshot diagram(s) in one embodiment of the DDVME. In FIG. 23, an exemplary user interface (e.g., for a mobile device, for a website) for searching for text in records and/or on the displayed pages 2310 in dark mode is illustrated.

Figure 24:
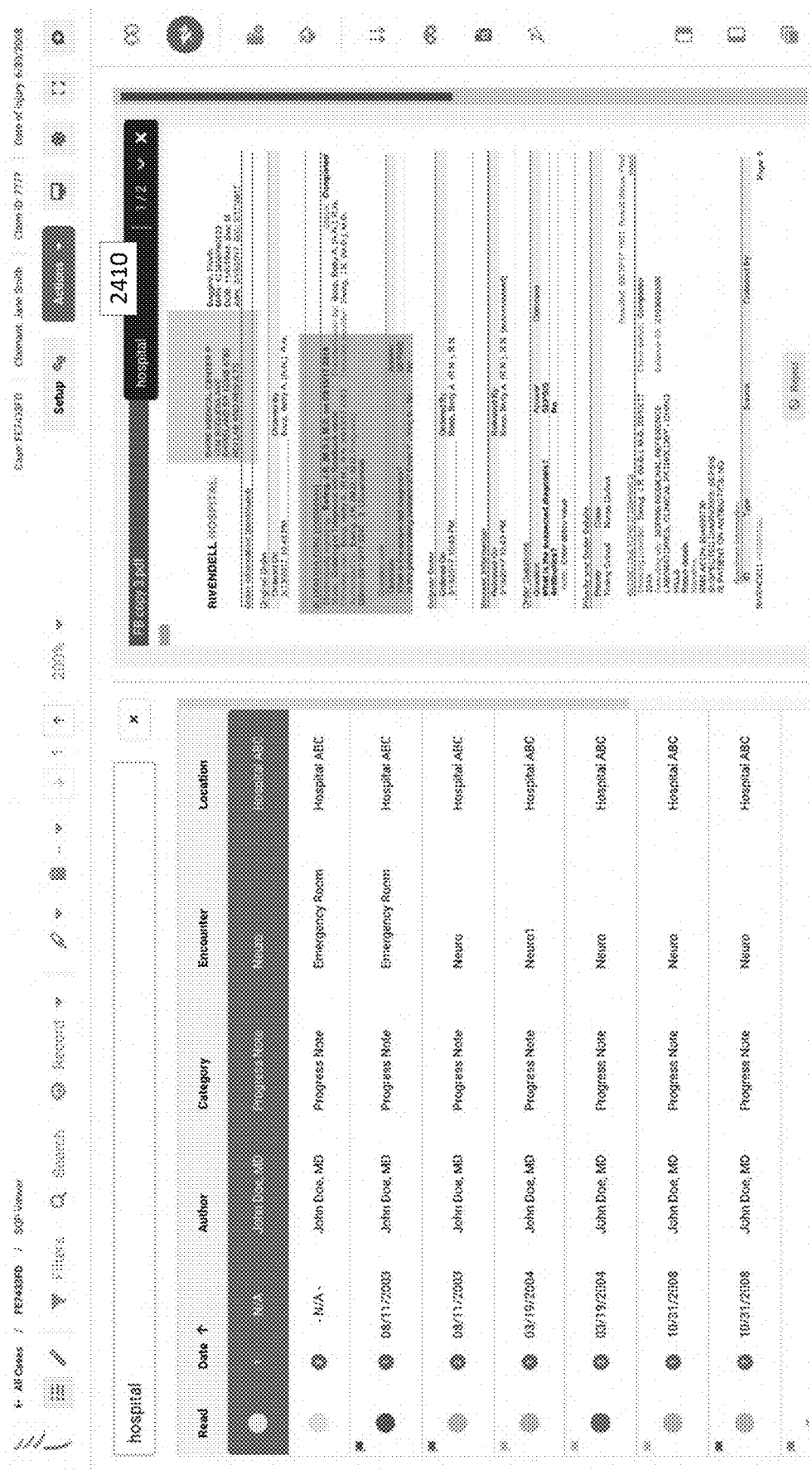
FIG. 24 shows screenshot diagram(s) in one embodiment of the DDVME.

FIG. 24 shows screenshot diagram(s) in one embodiment of the DDVME. In FIG. 24, an exemplary user interface (e.g., for a mobile device, for a website) for searching for text in records and/or on the displayed pages 2410 in light mode is illustrated.

Figure 25:
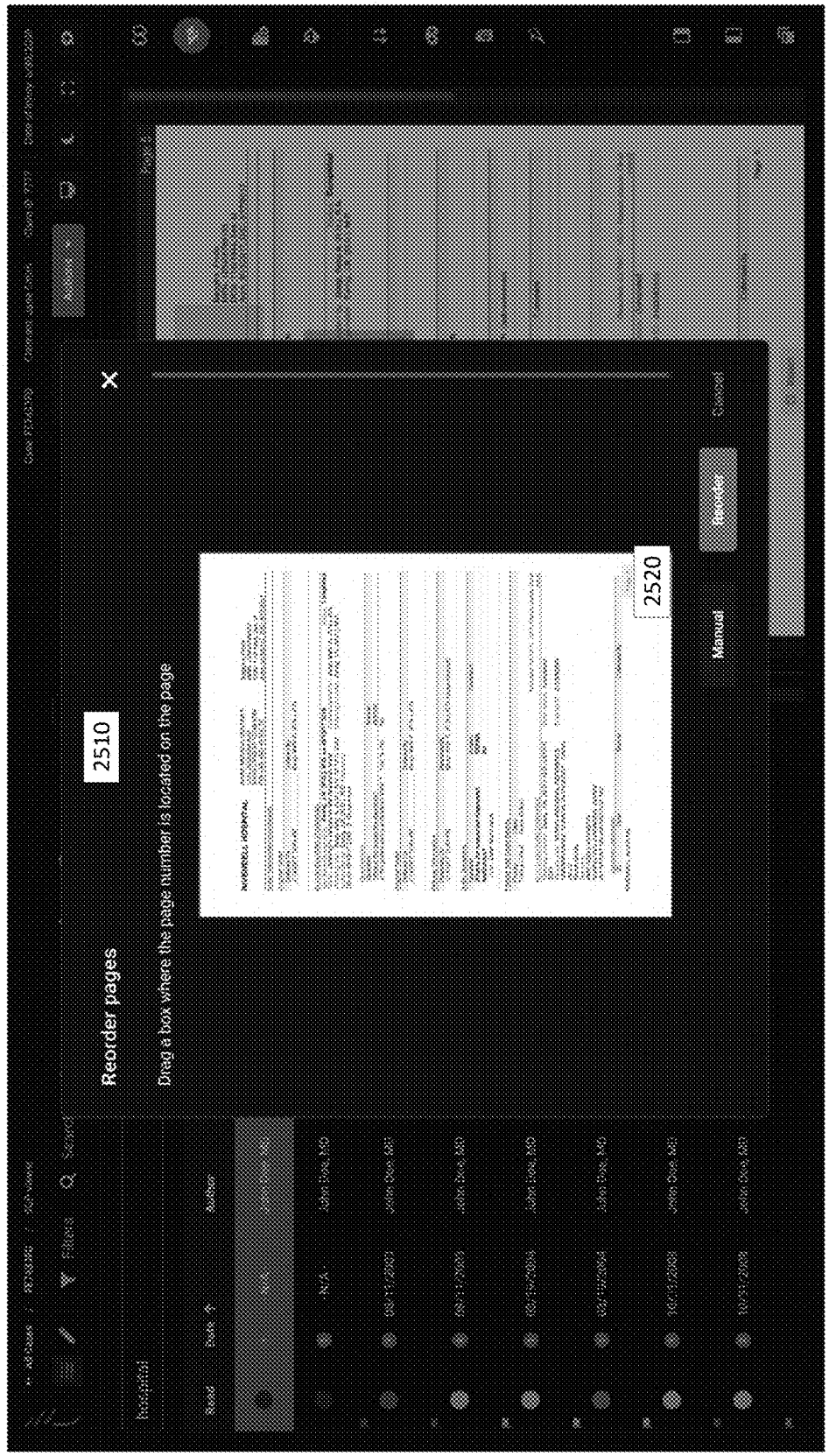
FIG. 25 shows screenshot diagram(s) in one embodiment of the DDVME.

FIG. 25 shows screenshot diagram(s) in one embodiment of the DDVME. In FIG. 25, an exemplary user interface (e.g., for a mobile device, for a website) showing a modal to reorder pages 2510 by marking where the page number is in a yellow box 2520 anywhere on the page and also having the ability to enter page numbers manually after the DDVME predicts the page order in dark mode is illustrated.

Figure 26:
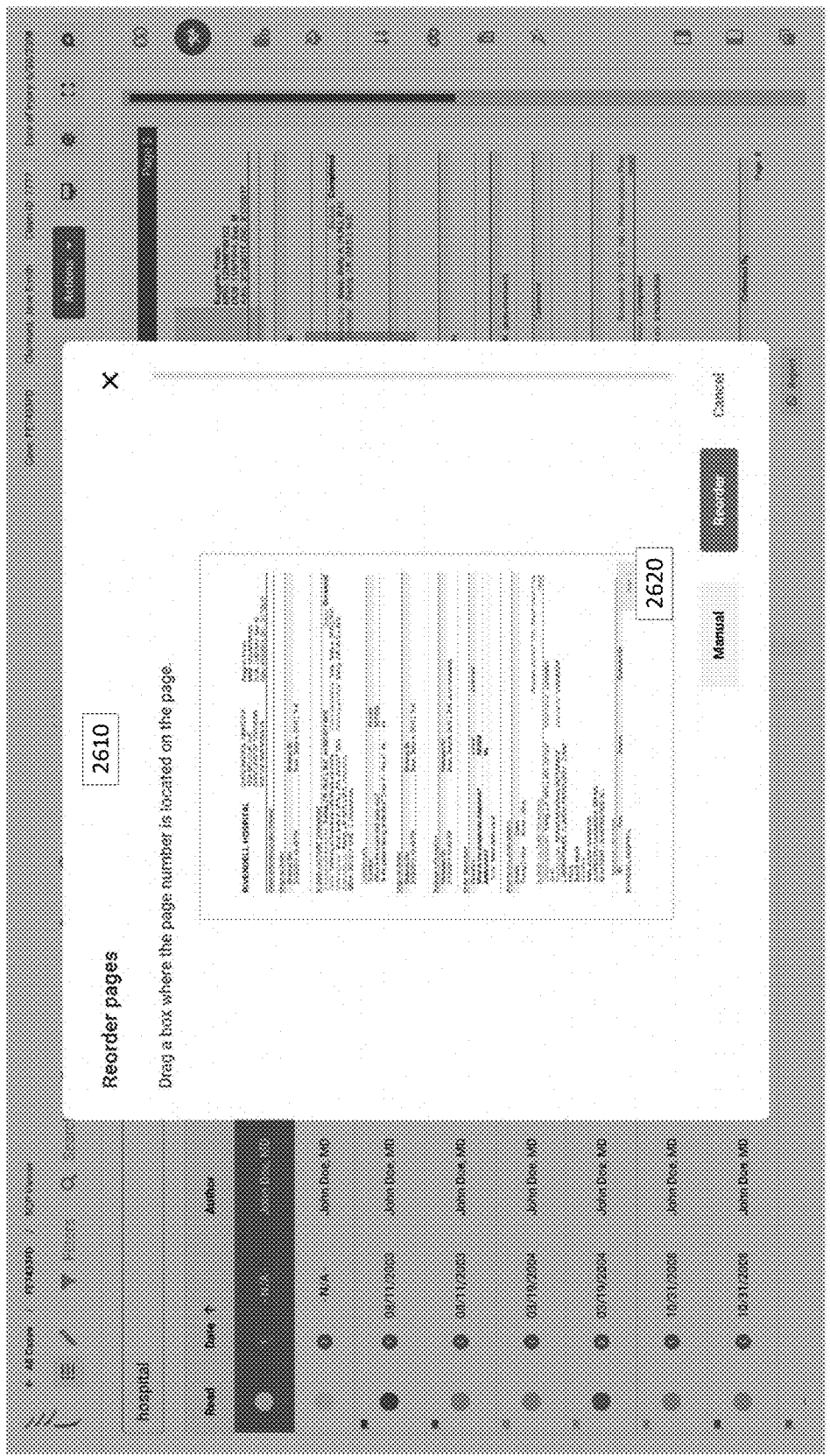
FIG. 26 shows screenshot diagram(s) in one embodiment of the DDVME.

FIG. 26 shows screenshot diagram(s) in one embodiment of the DDVME. In FIG. 26, an exemplary user interface (e.g., for a mobile device, for a website) showing a modal to reorder pages 2610 by marking where the page number is in a yellow box 2620 anywhere on the page and also having the ability to enter page numbers manually after the DDVME predicts the page order in light mode is illustrated.

Figure 27:
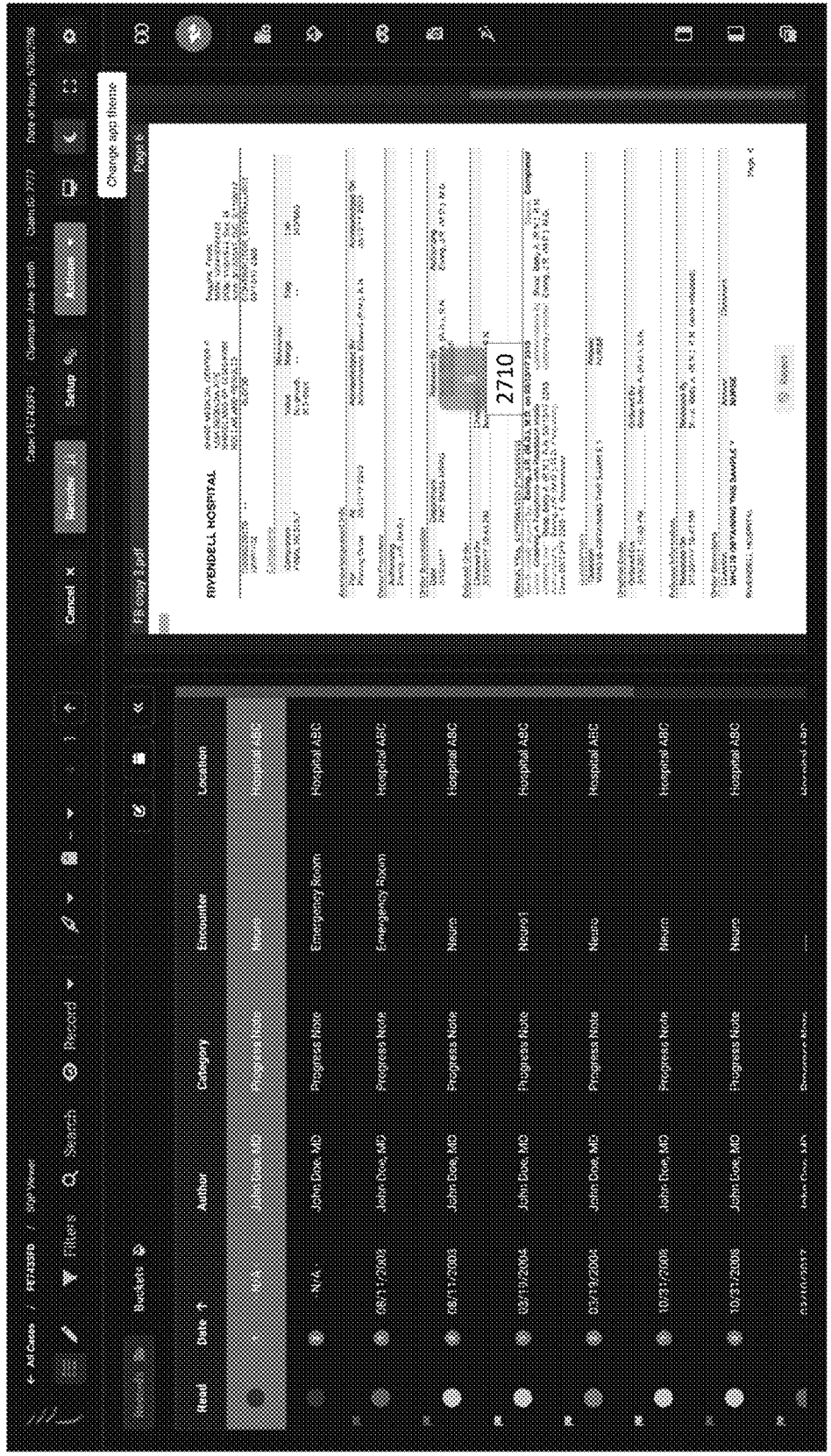
FIG. 27 shows screenshot diagram(s) in one embodiment of the DDVME.

FIG. 27 shows screenshot diagram(s) in one embodiment of the DDVME. In FIG. 27, an exemplary user interface (e.g., for a mobile device, for a website) showing a page number 2710 predicted by the DDVME for a page is illustrated.

Figure 28:
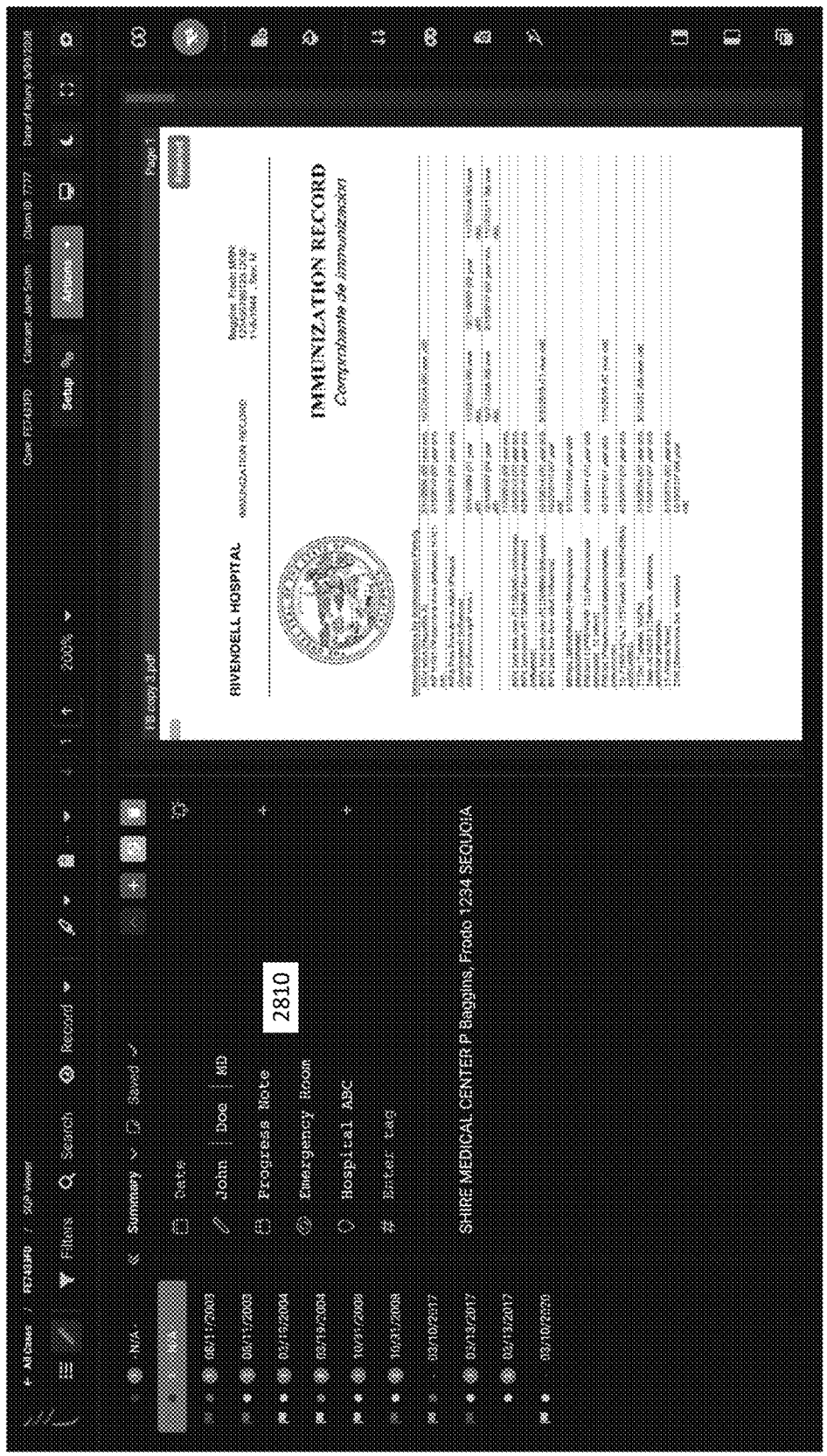
FIG. 28 shows screenshot diagram(s) in one embodiment of the DDVME.

FIG. 28 shows screenshot diagram(s) in one embodiment of the DDVME. In FIG. 28, an exemplary user interface (e.g., for a mobile device, for a website) for editing record identifiers (e.g., attributes) 2810 in dark mode is illustrated.

Figure 29:
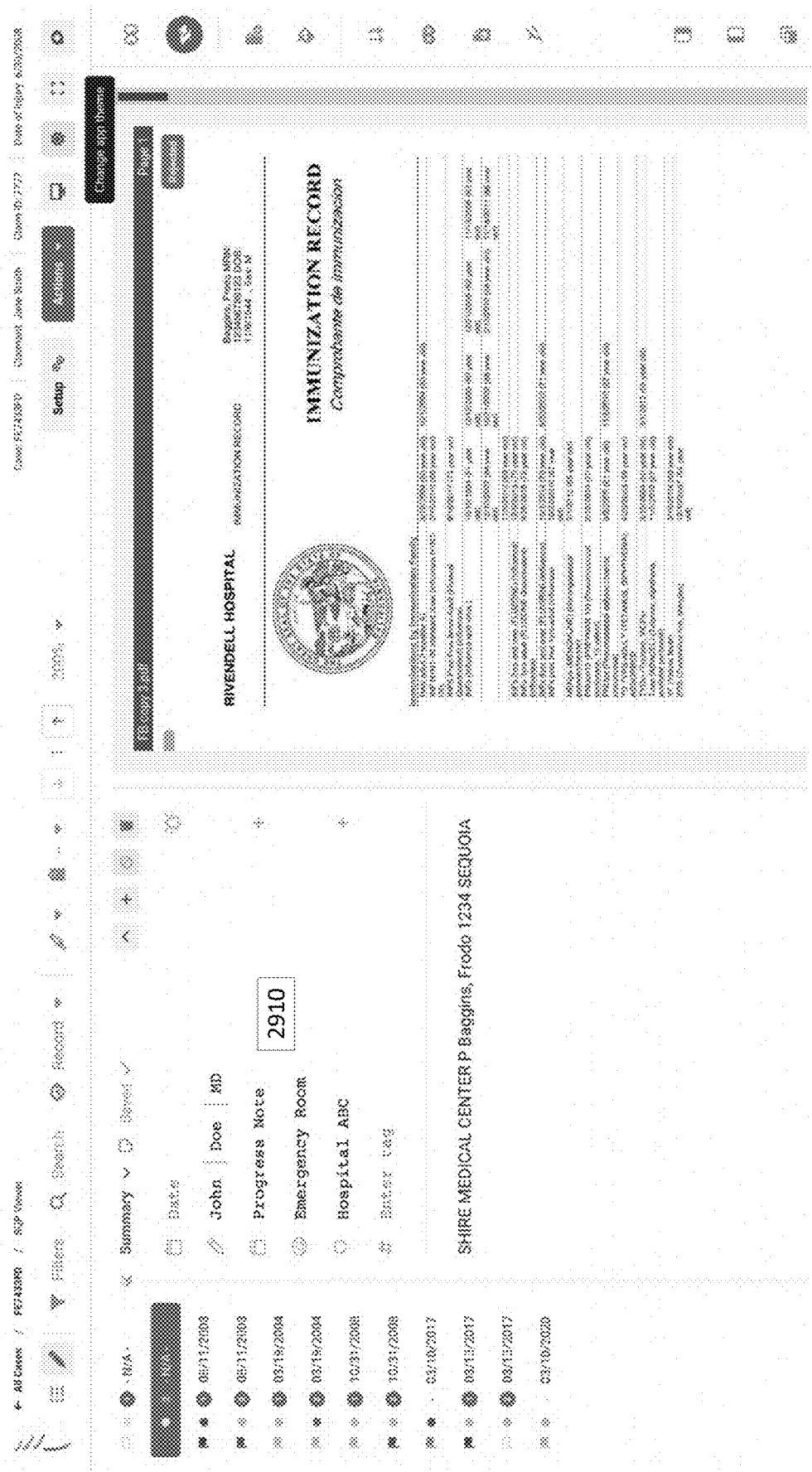
FIG. 29 shows screenshot diagram(s) in one embodiment of the DDVME.

FIG. 29 shows screenshot diagram(s) in one embodiment of the DDVME. In FIG. 29, an exemplary user interface (e.g., for a mobile device, for a website) for editing record identifiers (e.g., attributes) 2910 in light mode is illustrated.

Figure 30:
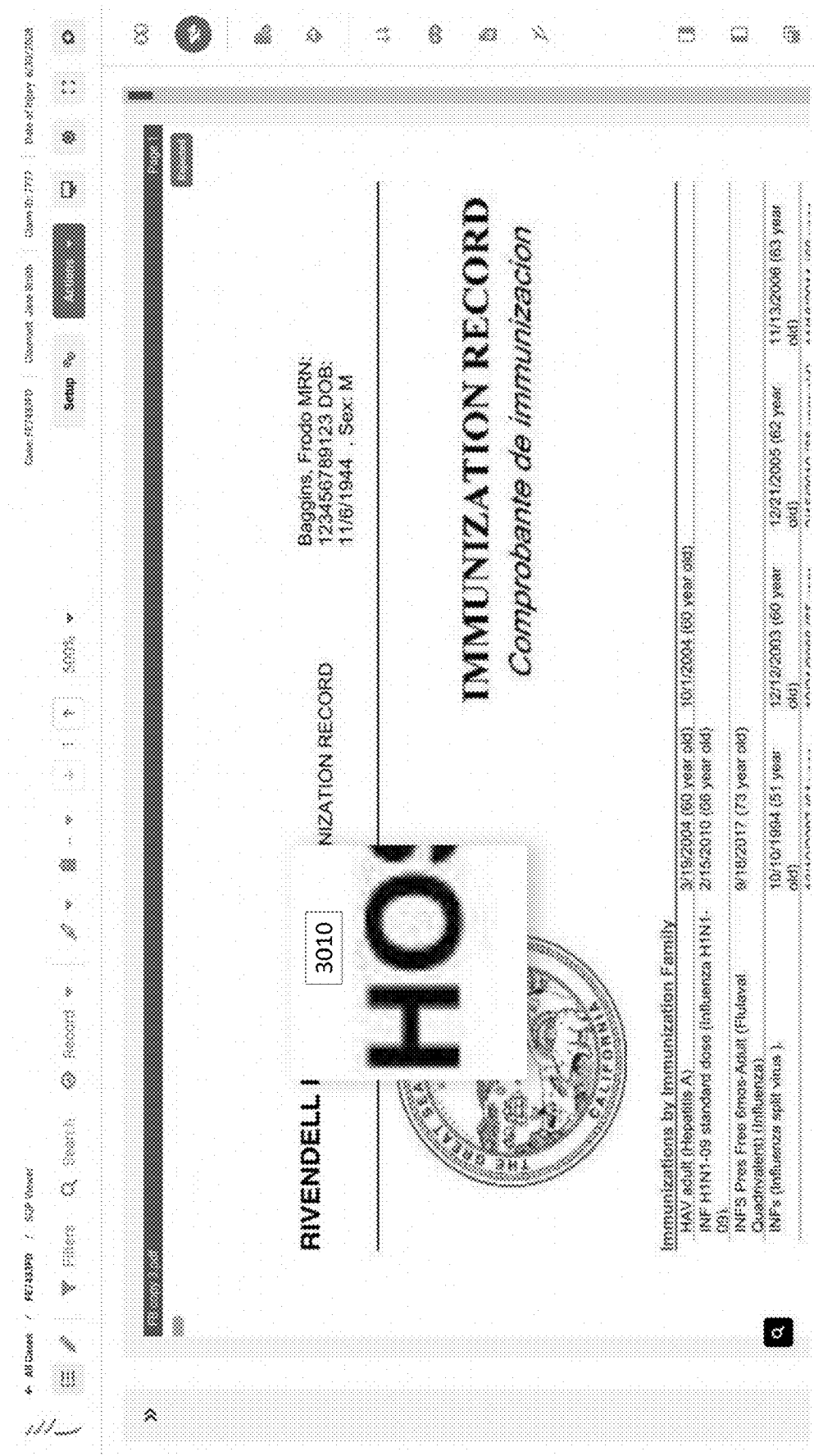
FIG. 30 shows screenshot diagram(s) in one embodiment of the DDVME.

FIG. 30 shows screenshot diagram(s) in one embodiment of the DDVME. In FIG. 30, an exemplary user interface (e.g., for a mobile device, for a website) for zooming into a page 3010 in light mode is illustrated.

Figure 31:
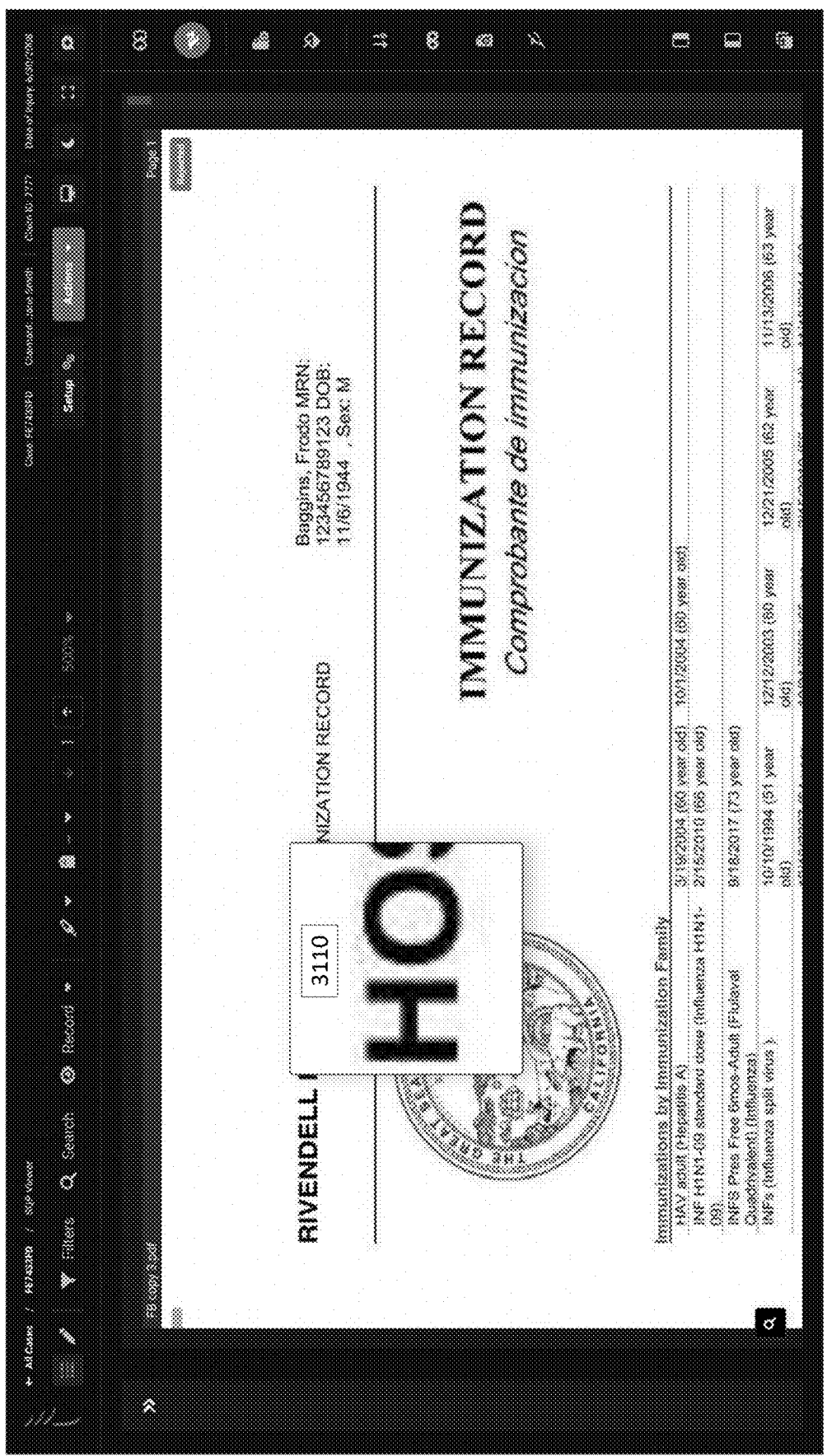
FIG. 31 shows screenshot diagram(s) in one embodiment of the DDVME.

FIG. 31 shows screenshot diagram(s) in one embodiment of the DDVME. In FIG. 31, an exemplary user interface (e.g., for a mobile device, for a website) for zooming into a page 3110 in dark mode is illustrated.

Figure 32:
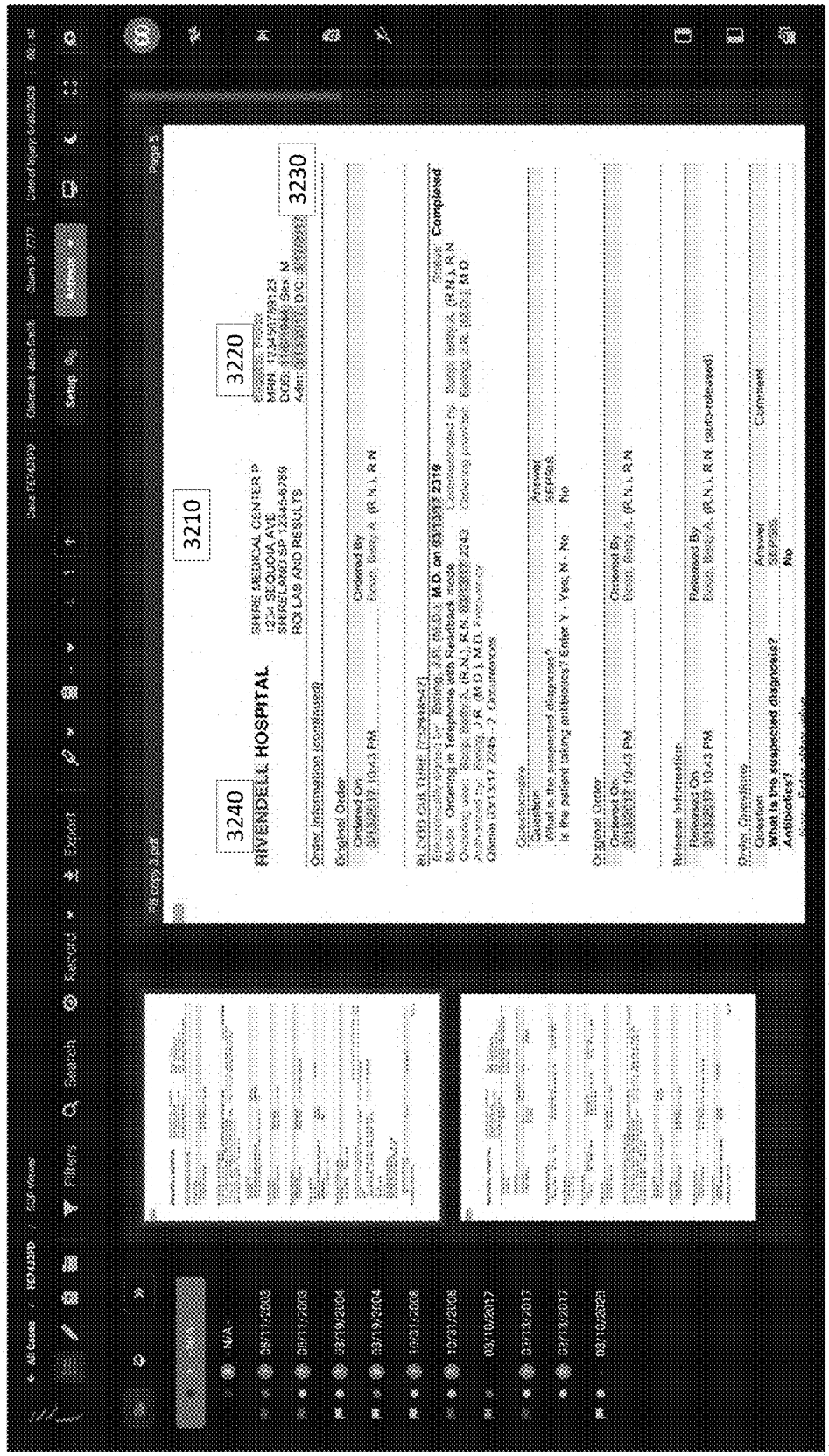
FIG. 32 shows screenshot diagram(s) in one embodiment of the DDVME.

FIG. 32 shows screenshot diagram(s) in one embodiment of the DDVME. In FIG. 32, an exemplary user interface (e.g., for a mobile device, for a website) showing page annotations displayed using different colors 3210 is illustrated. For example, names (e.g., 3220) may be shown in green, authors may be shown in red, dates (e.g., 3230) may be shown in blue, and locations (e.g., 3240) may be shown in orange.

Figure 33:
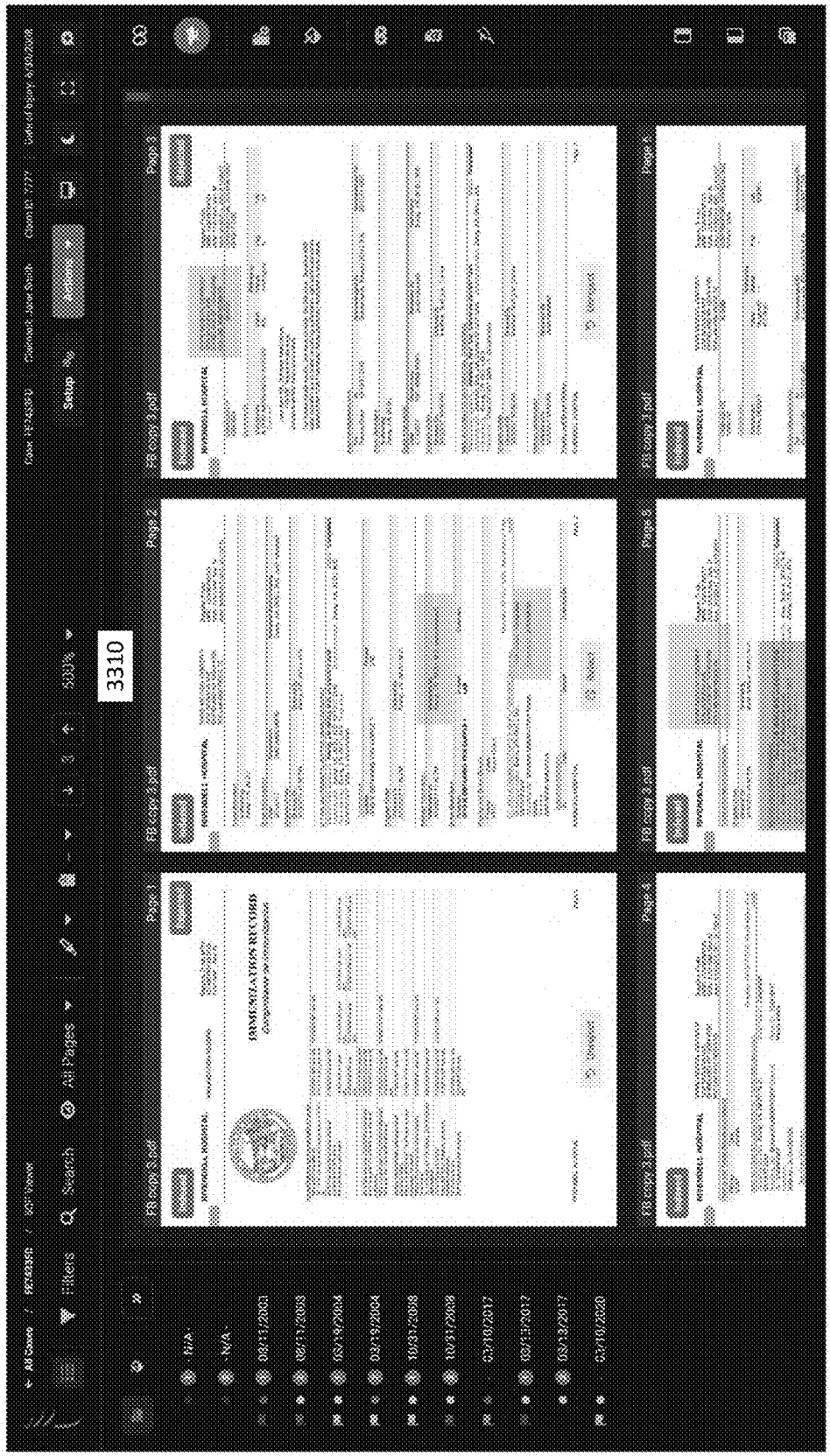
FIG. 33 shows screenshot diagram(s) in one embodiment of the DDVME.

FIG. 33 shows screenshot diagram(s) in one embodiment of the DDVME. In FIG. 33, an exemplary user interface (e.g., for a mobile device, for a website) showing multiple pages displayed per row 3310 in dark mode is illustrated.

Figure 34:
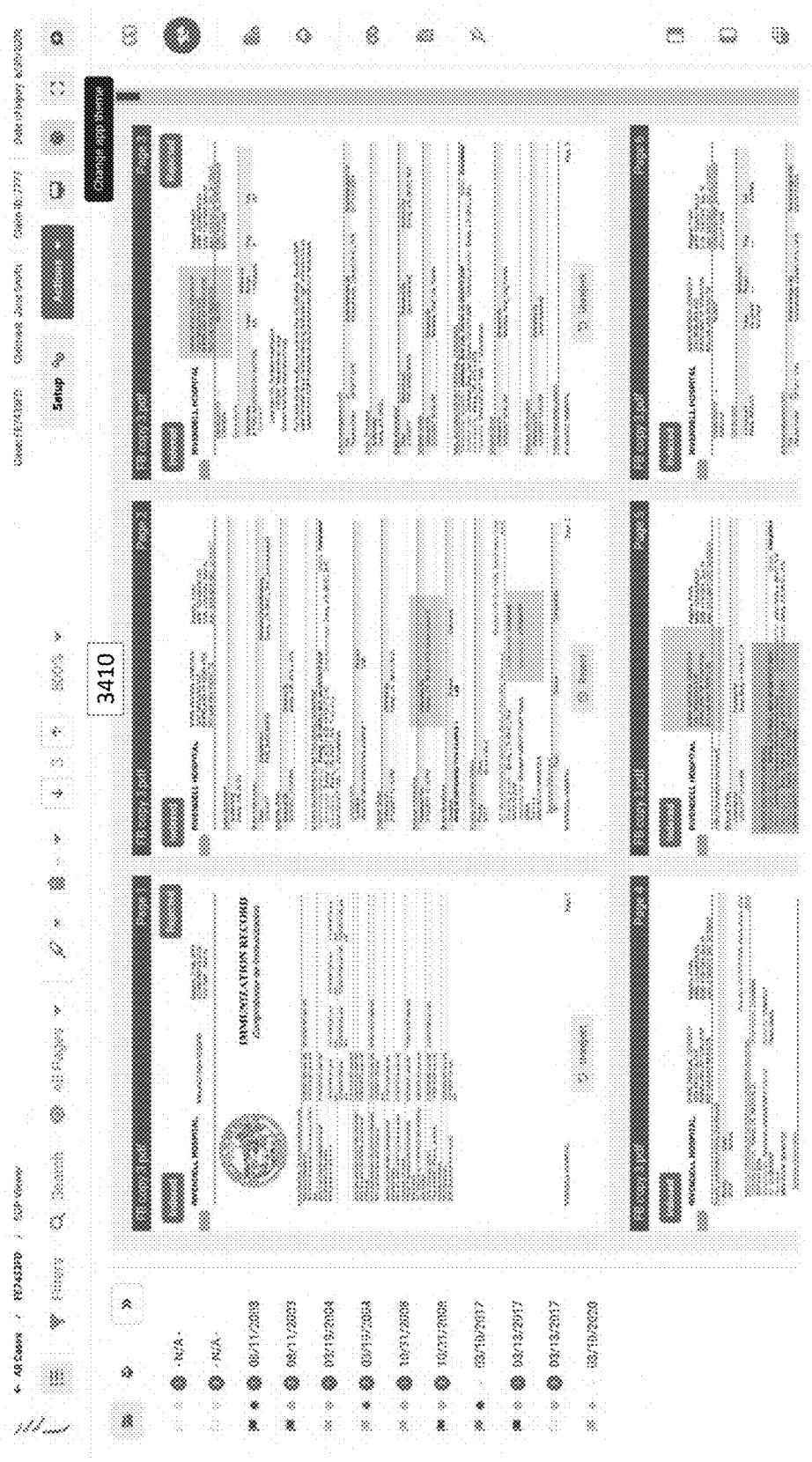
FIG. 34 shows screenshot diagram(s) in one embodiment of the DDVME.

FIG. 34 shows screenshot diagram(s) in one embodiment of the DDVME. In FIG. 34, an exemplary user interface (e.g., for a mobile device, for a website) showing multiple pages displayed per row 3410 in light mode is illustrated.

Figure 35:
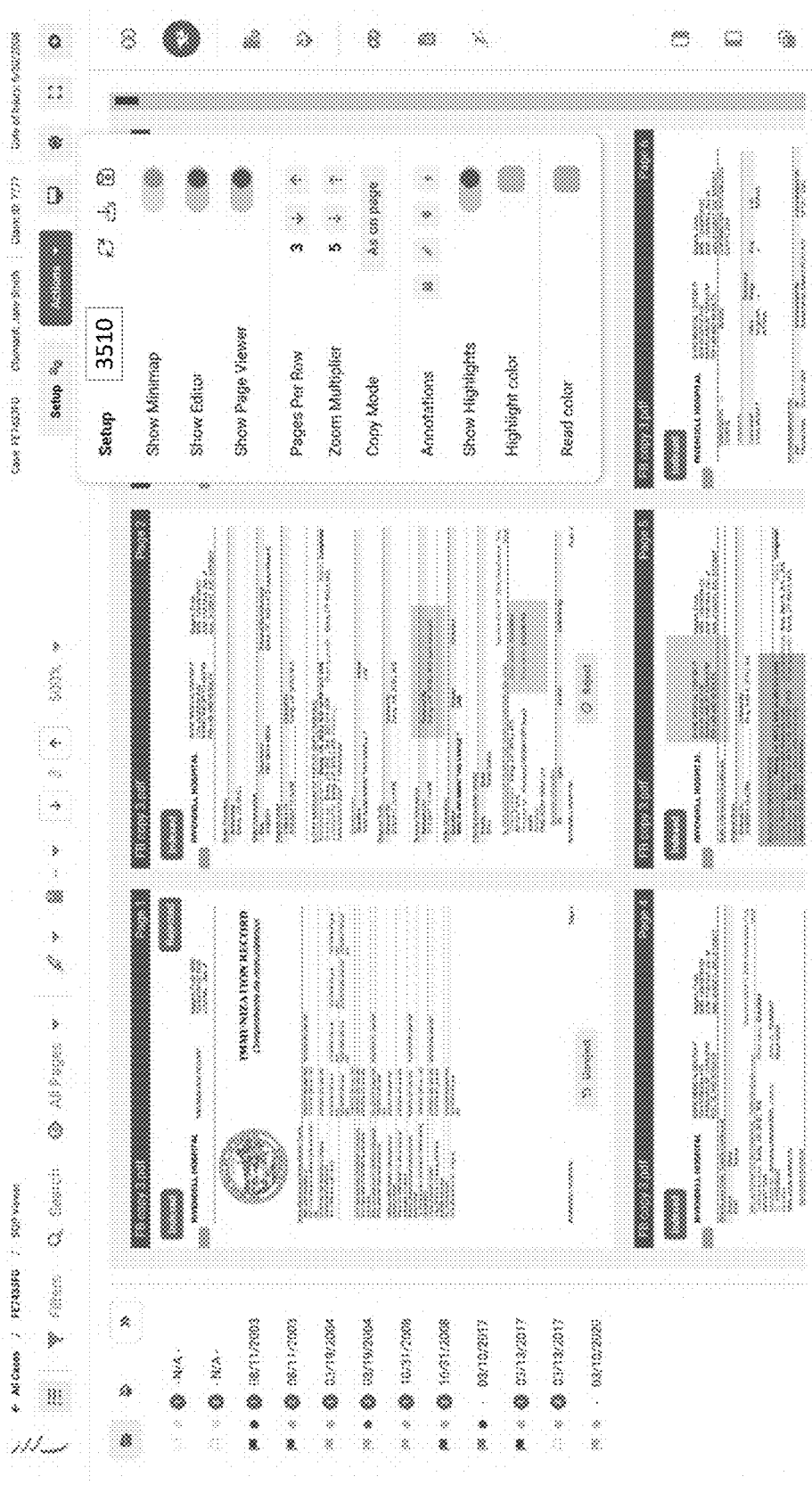
FIG. 35 shows screenshot diagram(s) in one embodiment of the DDVME.

FIG. 35 shows screenshot diagram(s) in one embodiment of the DDVME. In FIG. 35, an exemplary user interface (e.g., for a mobile device, for a website) for changing editor setup 3510 is illustrated.

Figure 36:
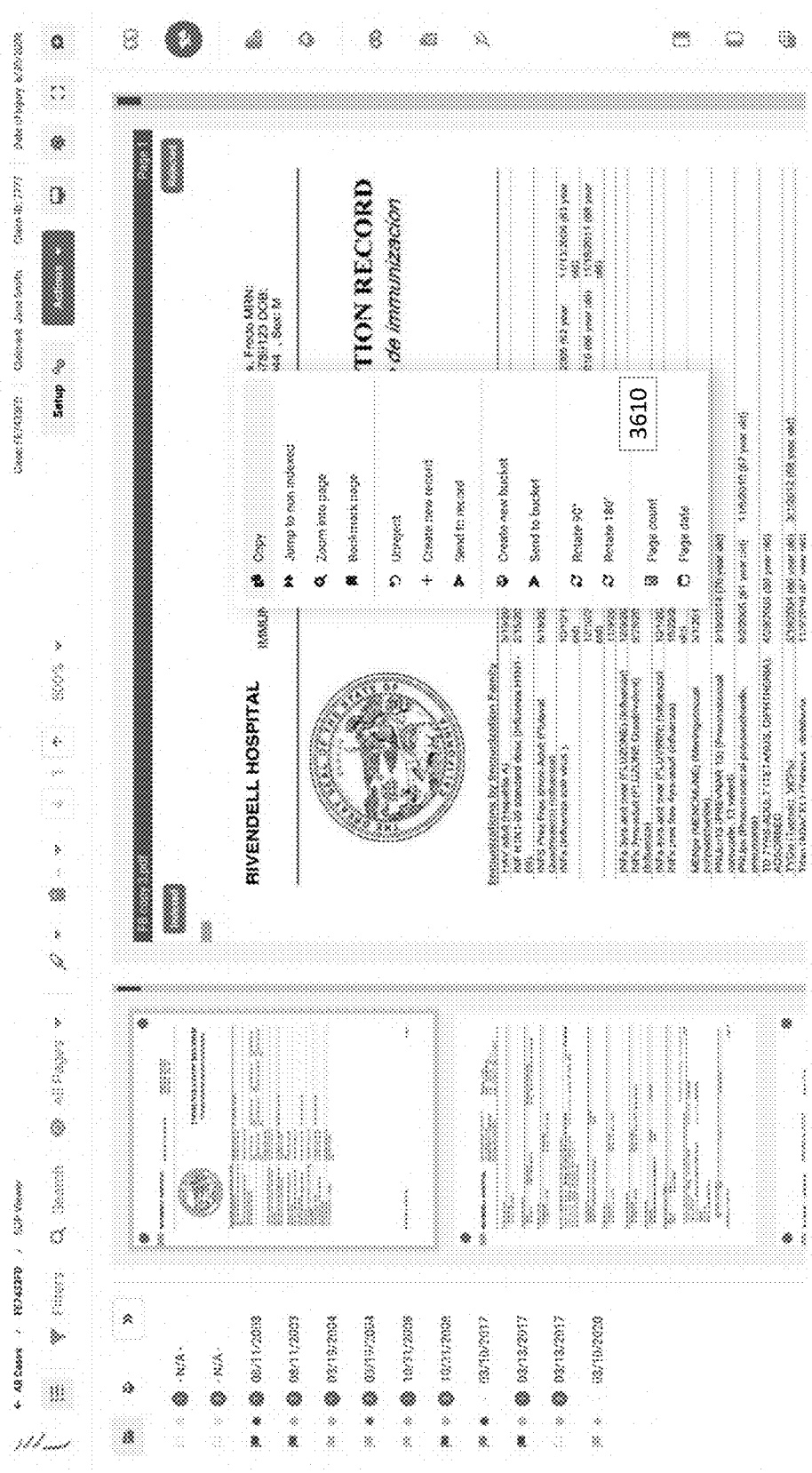
FIG. 36 shows screenshot diagram(s) in one embodiment of the DDVME.

FIG. 36 shows screenshot diagram(s) in one embodiment of the DDVME. In FIG. 36, an exemplary user interface (e.g., for a mobile device, for a website) showing page context actions 3610 in light mode is illustrated. In one embodiment, a user may manipulate a page and/or corresponding database records (e.g., case, page, layer, indexed record nodes).

Figure 37:
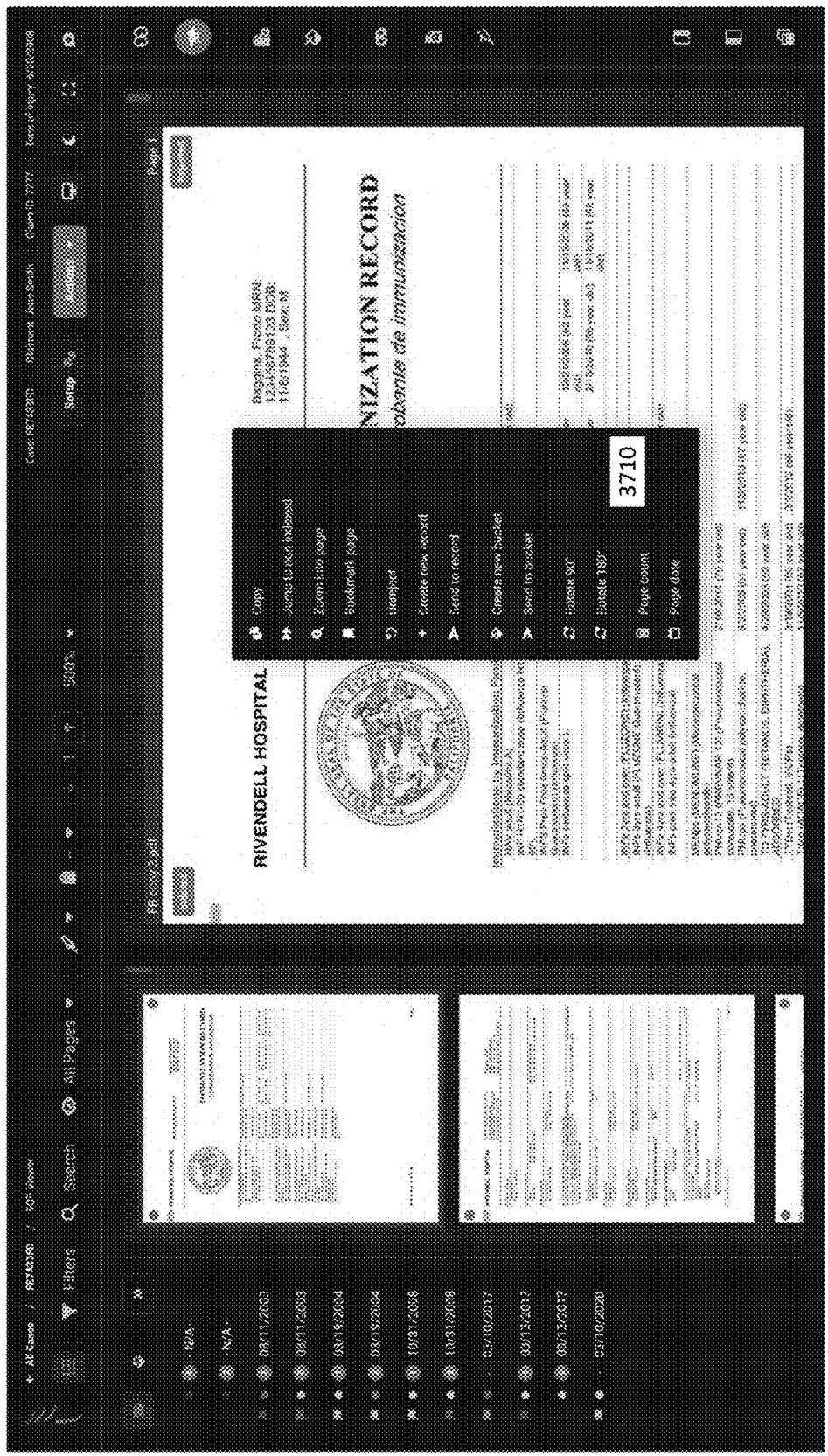
FIG. 37 shows screenshot diagram(s) in one embodiment of the DDVME.

FIG. 37 shows screenshot diagram(s) in one embodiment of the DDVME. In FIG. 37, an exemplary user interface (e.g., for a mobile device, for a website) showing page context actions 3710 in dark mode is illustrated. In one embodiment, a user may manipulate a page and/or corresponding database records (e.g., case, page, layer, indexed record nodes).

Figure 38:
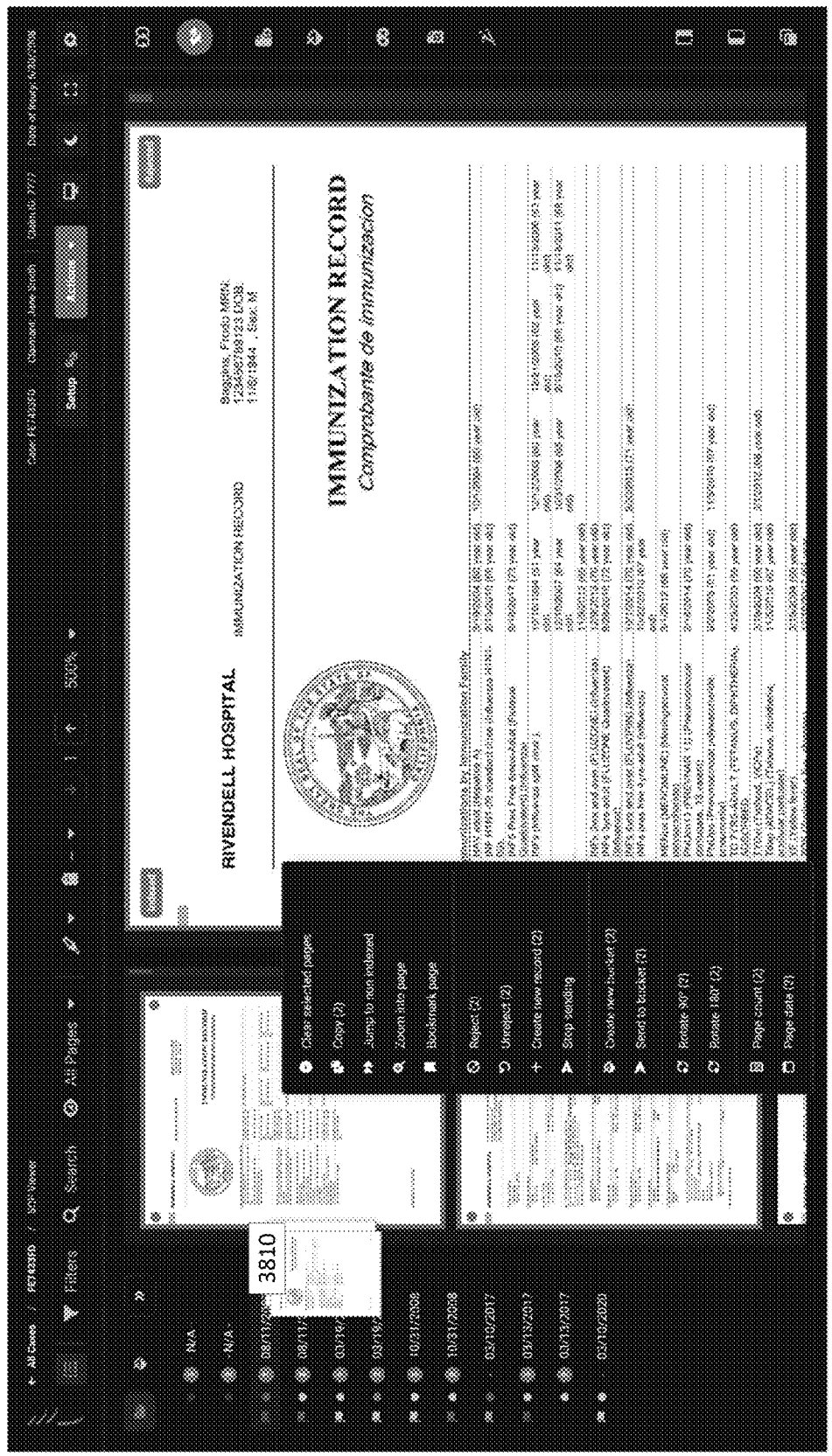
FIG. 38 shows screenshot diagram(s) in one embodiment of the DDVME.

FIG. 38 shows screenshot diagram(s) in one embodiment of the DDVME. In FIG. 38, an exemplary user interface (e.g., for a mobile device, for a website) for moving pages around records with drag and drop (e.g., send to record/send to bucket/transfer pages) 3810 in dark mode is illustrated. For example, two selected pages may be sent to an indexed record node corresponding to bucket 1 for 08/11/2003.

Figure 39:
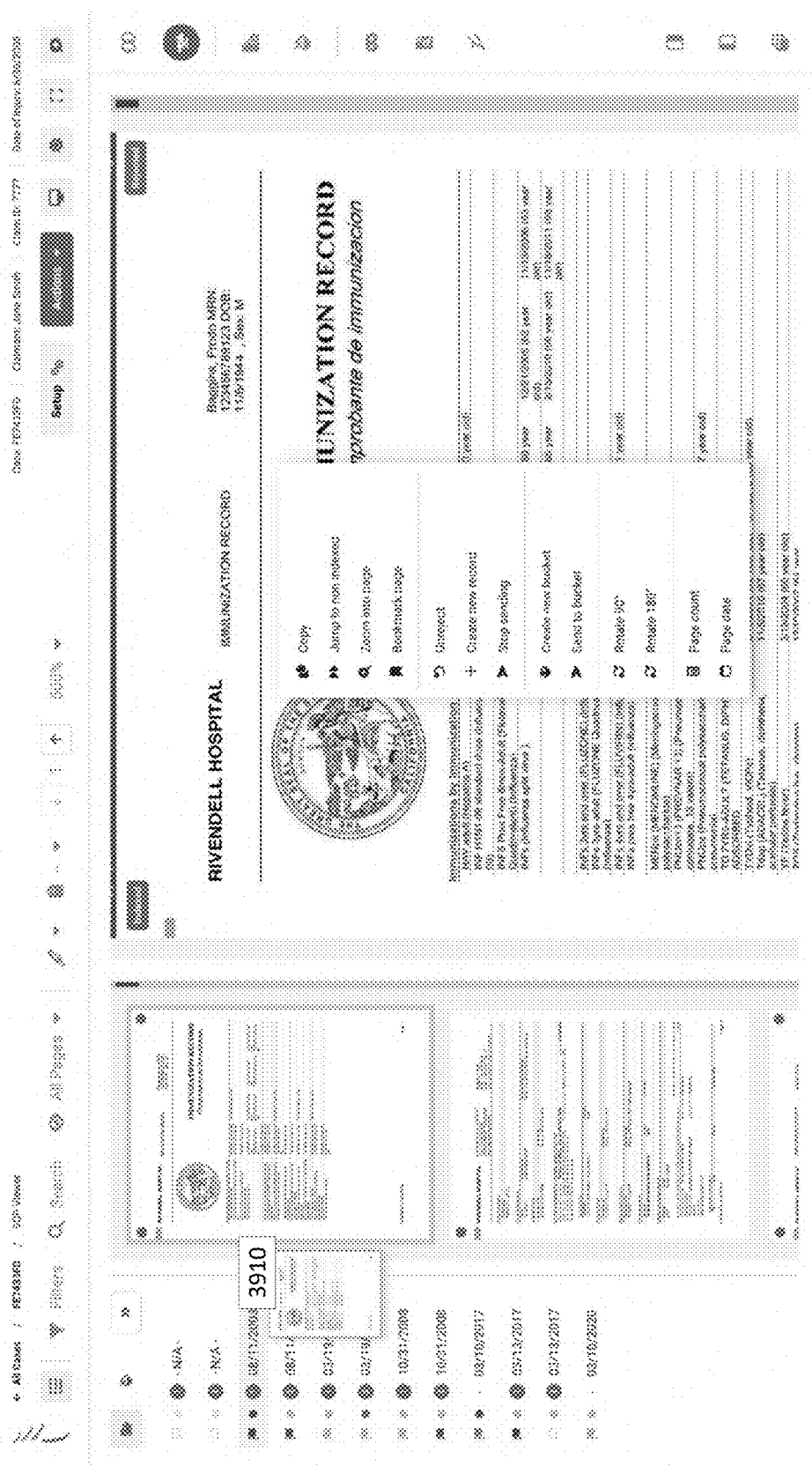
FIG. 39 shows screenshot diagram(s) in one embodiment of the DDVME.

FIG. 39 shows screenshot diagram(s) in one embodiment of the DDVME. In FIG. 39, an exemplary user interface (e.g., for a mobile device, for a website) for moving pages around records with drag and drop (e.g., send to record/send to bucket/transfer pages) 3910 in light mode is illustrated. For example, one selected page may be sent to an indexed record node corresponding to bucket 1 for 08/11/2003.

Figure 40:
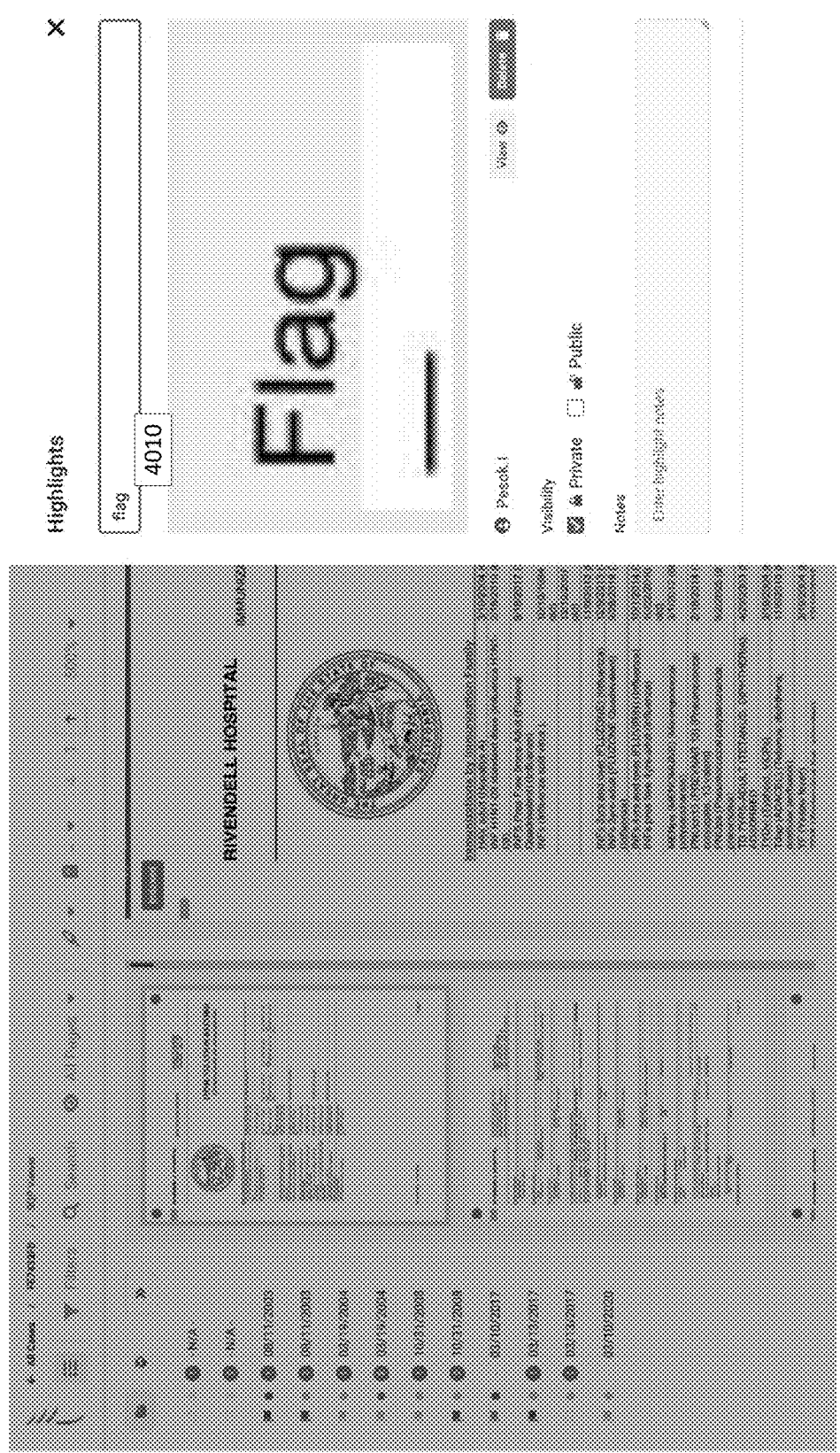
FIG. 40 shows screenshot diagram(s) in one embodiment of the DDVME.

FIG. 40 shows screenshot diagram(s) in one embodiment of the DDVME. In FIG. 40, an exemplary user interface (e.g., for a mobile device, for a website) for filtering through page highlights by text contained within the highlights 4010 in light mode is illustrated.

Figure 41:
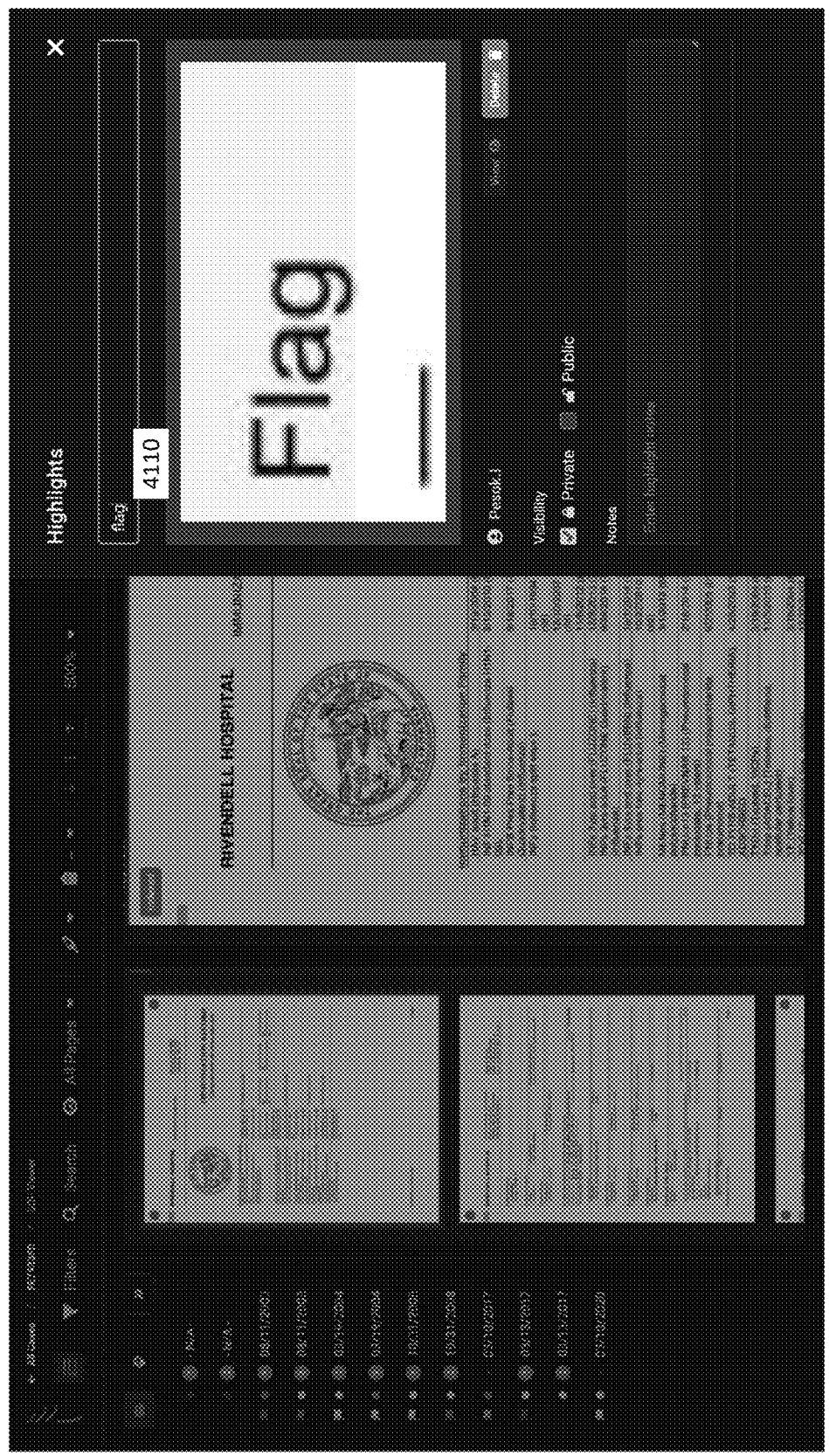
FIG. 41 shows screenshot diagram(s) in one embodiment of the DDVME.

FIG. 41 shows screenshot diagram(s) in one embodiment of the DDVME. In FIG. 41, an exemplary user interface (e.g., for a mobile device, for a website) for filtering through page highlights by text contained within the highlights 4110 in dark mode is illustrated.

Figure 42:
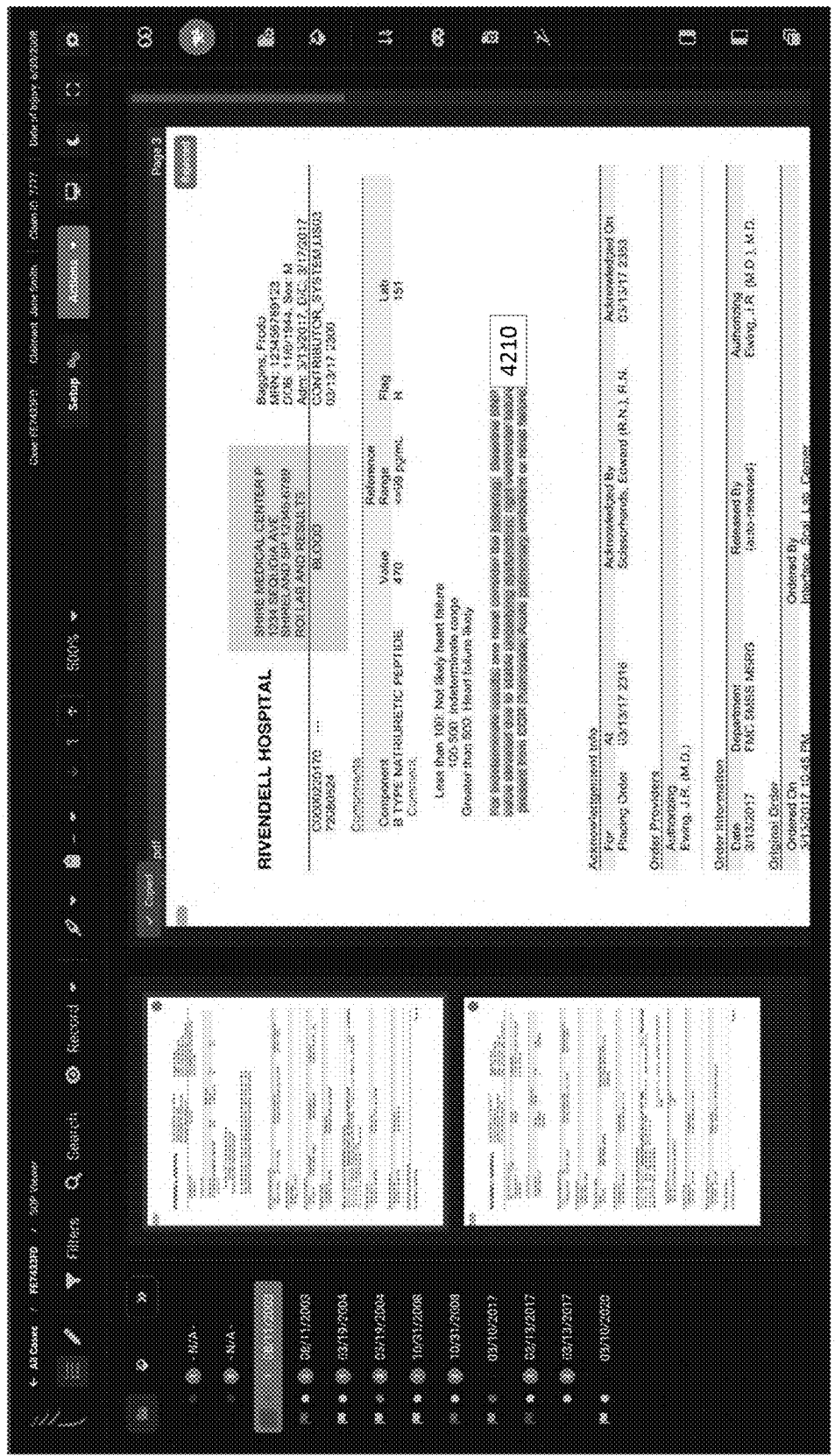
FIG. 42 shows screenshot diagram(s) in one embodiment of the DDVME.

FIG. 42 shows screenshot diagram(s) in one embodiment of the DDVME. In FIG. 42, an exemplary user interface (e.g., for a mobile device, for a website) for copying page text via an OCR layer node in dark mode is illustrated. In one embodiment, a user may drag an area 4210 over a page and corresponding text (e.g., based on pixel coordinates of the area) from the OCR layer node may be determined and copied (e.g., to the clipboard).

Figure 43:
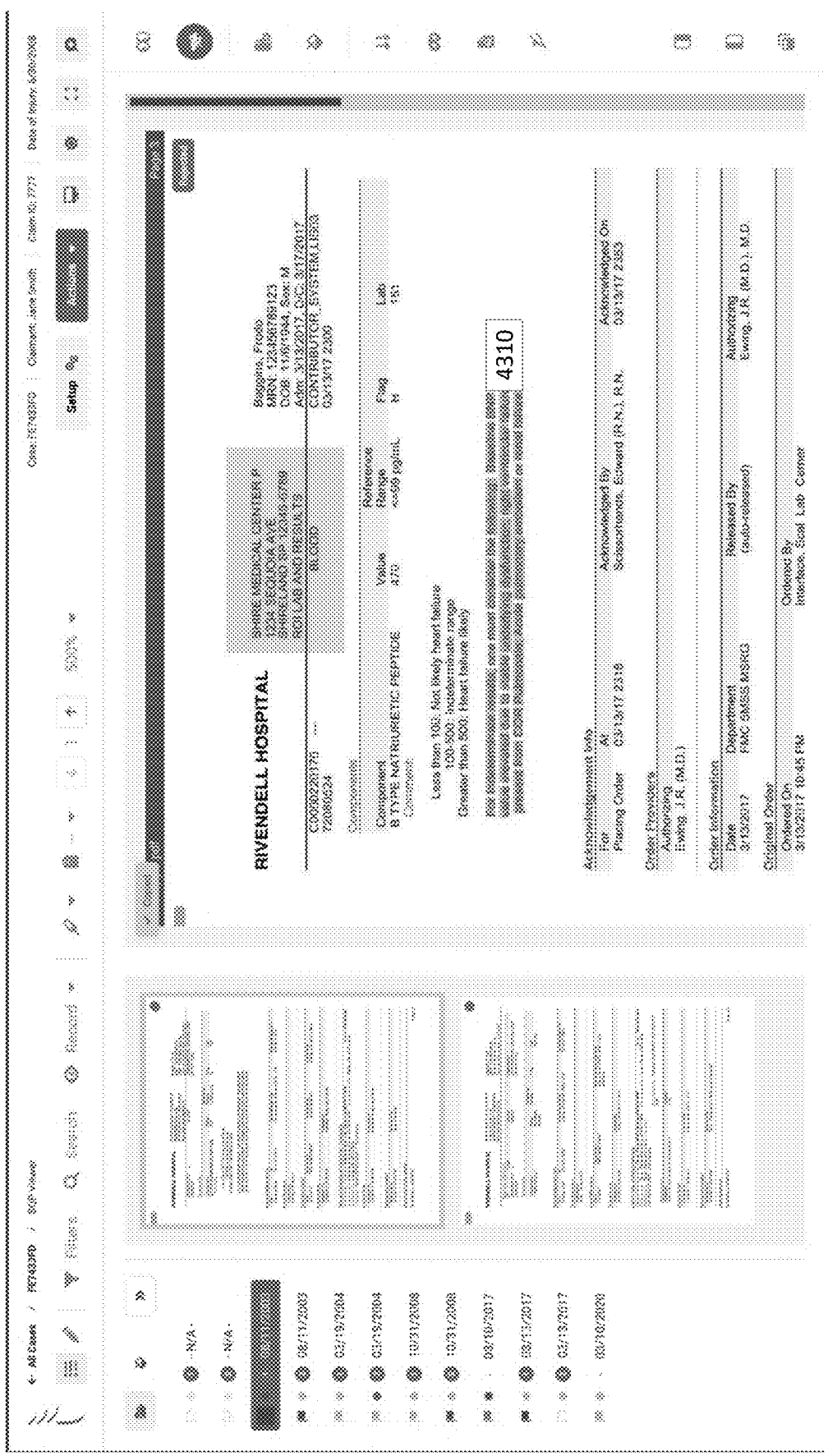
FIG. 43 shows screenshot diagram(s) in one embodiment of the DDVME.

FIG. 43 shows screenshot diagram(s) in one embodiment of the DDVME. In FIG. 43, an exemplary user interface (e.g., for a mobile device, for a website) for copying page text via an OCR layer node in light mode is illustrated. In one embodiment, a user may drag an area 4310 over a page and corresponding text (e.g., based on pixel coordinates of the area) from the OCR layer node may be determined and copied (e.g., to the clipboard).

DETAILED DESCRIPTION OF THE DDVME COORDINATOR

Figure 44:
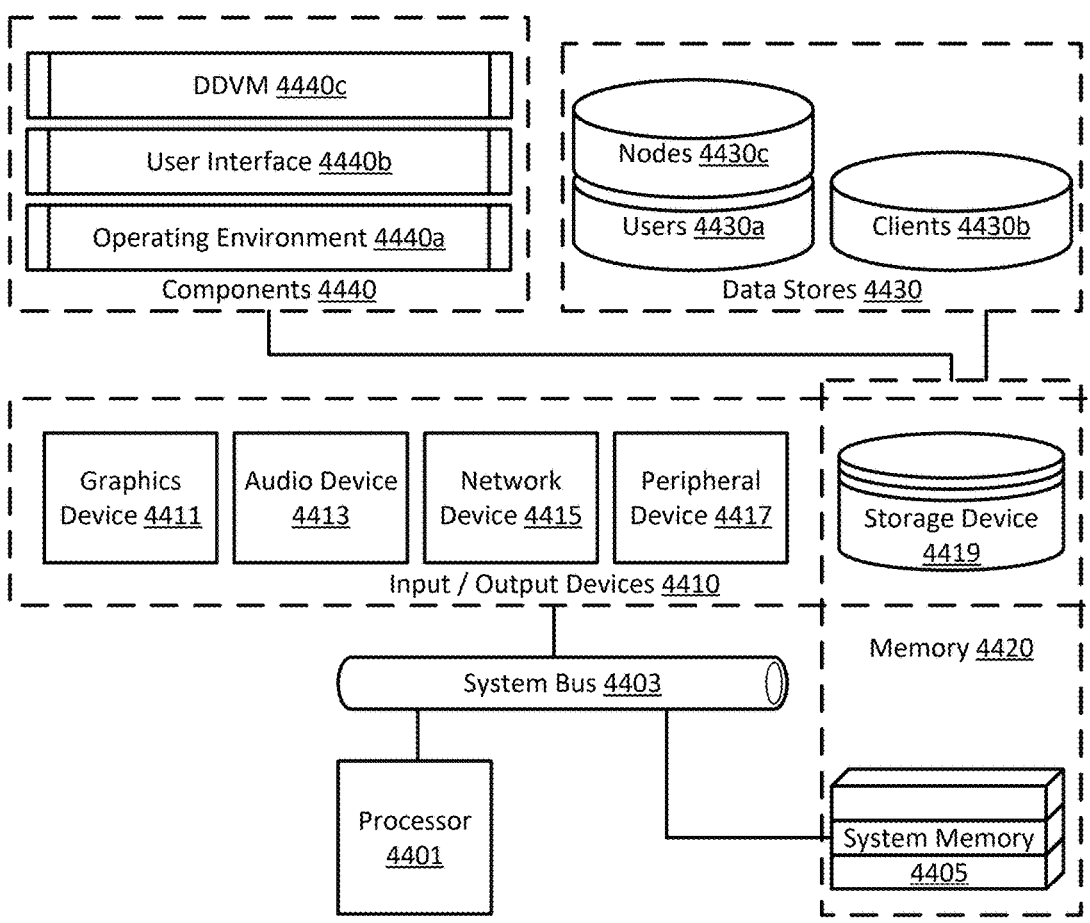
FIG. 44 shows a block diagram illustrating an exemplary DDVME coordinator in one embodiment of the DDVME.

FIG. 44 shows a block diagram illustrating an exemplary DDVME coordinator in one embodiment of the DDVME. The DDVME coordinator facilitates the operation of the DDVME via a computer system (e.g., one or more cloud computing systems (e.g., Microsoft Azure, Amazon Web Services, Google Cloud Platform), grid computing systems, virtualized computer systems, mainframe computers, servers, clients, nodes, desktops, mobile devices (e.g., such as smart phones, cellular phones, tablets, personal digital assistants (PDAs), smart watches, and/or the like), embedded computers, dedicated computers, system on a chip (SOC) devices, and/or the like). For example, the DDVME coordinator may receive, obtain, aggregate, process, generate, store, retrieve, send, delete, input, output, and/or the like data (including program data and program instructions); may execute program instructions; may communicate with computer systems, with nodes, with users, and/or the like. In various embodiments, the DDVME coordinator may comprise a standalone computer system, a distributed computer system, a node in a computer network (i.e., a network of computer systems organized in a topology), a network of DDVME coordinators, and/or the like. It is to be understood that the DDVME coordinator and/or the various DDVME coordinator elements (e.g., processor, system bus, memory, input/output devices) may be organized in any number of ways (i.e., using any number and configuration of computer systems, computer networks, nodes, DDVME coordinator elements, and/or the like) to facilitate DDVME operation. Furthermore, it is to be understood that the various DDVME coordinator computer systems, DDVME coordinator computer networks, DDVME coordinator nodes, DDVME coordinator elements, and/or the like may communicate among each other in any number of ways to facilitate DDVME operation. As used in this disclosure, the term "user" refers generally to people and/or computer systems that interact with the DDVME; the term "server" refers generally to a computer system, a program, and/or a combination thereof that handles requests and/or responds to requests from clients via a computer network; the term "client" refers generally to a computer system, a program, a user, and/or a combination thereof that generates requests and/or handles responses from servers via a computer network; the term "node" refers generally to a server, to a client, and/or to an intermediary computer system, program, and/or a combination thereof that facilitates transmission of and/or handling of requests and/or responses.

The DDVME coordinator includes a processor 4401 that executes program instructions (e.g., DDVME program instructions). In various embodiments, the processor may be a general purpose microprocessor (e.g., a central processing unit (CPU), an accelerated processing unit (APU)), a dedicated microprocessor (e.g., a graphics processing unit (GPU), a physics processing unit (PPU), a digital signal processor (DSP), a network processor, a tensor processing unit (TPU), a cryptographic processor, a biometrics processor, and/or the like), an external processor, a plurality of processors (e.g., working in parallel, distributed, and/or the like), a microcontroller (e.g., for an embedded system), and/or the like. The processor may be implemented using integrated circuits (ICs), application-specific integrated circuits (ASICs), field-programmable gate arrays (FPGAs), and/or the like. In various implementations, the processor may comprise one or more cores, may include embedded elements (e.g., a coprocessor such as a math coprocessor, an embedded dedicated microprocessor utilized as a coprocessor, registers, cache memory, software), may be synchronous (e.g., using a clock signal) or asynchronous (e.g., without a central clock), and/or the like. For example, the processor may be an AMD Ryzen processor, an AMD Epyc processor, an Intel Core processor, an Intel Xeon processor, an ARM Cortex processor, an Apple A processor, an Apple S processor, a Qualcomm Snapdragon processor, an IBM PowerPC processor, and/or the like.

The processor may be connected to system memory 4405 via a system bus 4403. The system bus may interconnect these and/or other elements of the DDVME coordinator via electrical, electronic, optical, wireless, and/or the like communication links (e.g., the system bus may be integrated into a motherboard that interconnects DDVME coordinator elements and provides power from a power supply). In various embodiments, the system bus may comprise one or more control buses, address buses, data buses, memory buses, peripheral buses, and/or the like. In various implementations, the system bus may be a parallel bus, a serial bus, a daisy chain design, a hub design, and/or the like. For example, the system bus may comprise a front-side bus, a back-side bus, AMD's Infinity Fabric, Intel's QuickPath Interconnect (QPI), a peripheral component interconnect (PCI) bus, a PCI Express bus, a low pin count (LPC) bus, a universal serial bus (USB), and/or the like. The system memory, in various embodiments, may comprise registers, cache memory (e.g., level one, level two, level three), volatile memory (e.g., random access memory (RAM) (e.g., static RAM (SRAM), dynamic RAM (DRAM)), non-volatile memory (e.g., read only memory (ROM), non-volatile random-access memory (NVRAM) (e.g., resistive random access memory (ReRAM), magnetoresistive random access memory (MRAM)), flash memory (e.g., NAND-type)), and/or the like. The system memory may utilize error-correcting code (ECC) technology to detect and/or correct internal data corruption. The system memory may be discreet, external, embedded, integrated into a CPU, and/or the like. The processor may access, read from, write to, store in, erase, modify, and/or the like, the system memory in accordance with program instructions (e.g., DDVME program instructions) executed by the processor. The system memory may facilitate accessing, storing, retrieving, modifying, deleting, and/or the like data (e.g., DDVME data) by the processor.

In various embodiments, input/output devices 4410 may be connected to the processor and/or to the system memory, and/or to one another via the system bus.

In some embodiments, the input/output devices may include one or more graphics devices 4411. The processor may make use of the one or more graphic devices in accordance with program instructions (e.g., DDVME program instructions) executed by the processor. In one implementation, a graphics device may be a video card that may obtain (e.g., via a connected video camera), process (e.g., render a frame), output (e.g., via a connected monitor, television, and/or the like), and/or the like graphical (e.g., multimedia, video, image, text) data (e.g., DDVME data). A video card may be connected to the system bus via an interface such as PCI, PCI Express, USB, PC Card, ExpressCard, Thunderbolt, NVLink, and/or the like. A video card may use one or more graphics processing units (GPUs), for example, by utilizing AMD's CrossFireX and/or NVIDIA's SLI technologies. A video card may be connected via an interface (e.g., video graphics array (VGA), digital video interface (DVI), Mini-DVI, Micro-DVI, high-definition multimedia interface (HDMI), DisplayPort, Thunderbolt, composite video, S-Video, component video, and/or the like) to one or more displays (e.g., cathode ray tube (CRT), liquid crystal display (LCD), touchscreen, video projector, and/or the like) that display graphics. For example, a video card may be an AMD Radeon, an NVIDIA GeForce RTX, an Intel UHD Graphics, and/or the like. In another implementation, a graphics device may be a video capture board that may obtain (e.g., via coaxial cable), process (e.g., overlay with other graphical data), capture, convert (e.g., between different formats, such as MPEG2 to H.264), and/or the like graphical data. A video capture board may be and/or include a TV tuner, may be compatible with a variety of broadcast signals (e.g., NTSC, PAL, ATSC, QAM) may be a part of a video card, and/or the like. For example, a video capture board may be a Hauppauge ImpactVCB, a Hauppauge WinTV-HVR, a Hauppauge Colossus, and/or the like. A graphics device may be discreet, external, embedded, integrated into a CPU, and/or the like. A graphics device may operate in combination with other graphics devices (e.g., in parallel) to provide improved capabilities, data throughput, color depth, and/or the like.

In some embodiments, the input/output devices may include one or more audio devices 4413. The processor may make use of the one or more audio devices in accordance with program instructions (e.g., DDVME program instructions) executed by the processor. In one implementation, an audio device may be a sound card that may obtain (e.g., via a connected microphone), process, output (e.g., via connected speakers), and/or the like audio data (e.g., DDVME data). A sound card may be connected to the system bus via an interface such as PCI, PCI Express, USB, PC Card, ExpressCard, Thunderbolt, and/or the like. A sound card may be connected via an interface (e.g., tip sleeve (TS), tip ring sleeve (TRS), RCA, TOSLINK, optical) to one or more amplifiers, speakers (e.g., mono, stereo, surround sound), subwoofers, digital musical instruments, and/or the like. For example, a sound card may be an Intel AC'97 integrated codec chip, an Intel HD Audio integrated codec chip, a Creative Sound Blaster, and/or the like. An audio device may be discreet, external, embedded, integrated into a motherboard (e.g., via a chipset), and/or the like. An audio device may operate in combination with other audio devices (e.g., in parallel) to provide improved capabilities, data throughput, audio quality, and/or the like.

In some embodiments, the input/output devices may include one or more network devices 4415. The processor may make use of the one or more network devices in accordance with program instructions (e.g., DDVME program instructions) executed by the processor. In one implementation, a network device may be a network card that may obtain (e.g., via a Category 6 Ethernet cable), process, output (e.g., via a wireless antenna), and/or the like network data (e.g., DDVME data). A network card may be connected to the system bus via an interface such as PCI, PCI Express, USB, FireWire, PC Card, ExpressCard, Thunderbolt, and/or the like. A network card may be a wired network card (e.g., 10/100/1000BASE-T, optical fiber), a wireless network card (e.g., Wi-Fi 802.11ac/ad/ax/ay, Bluetooth, Near Field Communication (NFC), TransferJet), a modem (e.g., dialup telephone-based, asymmetric digital subscriber line (ADSL), cable modem, power line modem, wireless modem based on cellular protocols such as high speed packet access (HSPA), evolution-data optimized (EV-DO), global system for mobile communications (GSM), worldwide interoperability for microwave access (WiMax), long term evolution (LTE), 5G, and/or the like, satellite modem, FM radio modem, radio-frequency identification (RFID) modem, infrared (IR) modem), and/or the like. For example, a network card may be an Intel Gigabit Adapter, a LINKSYS USB Ethernet Adapter, an ASUS wireless Bluetooth and Gigagbit WiFi adapter, a Motorola SURFboard Cable Modem, a U.S. Robotics Faxmodem, a Zoom ADSL Modem/Router, a TRENDnet Powerline Ethernet Adapter, a StarTech Gigabit Ethernet Multi Mode Fiber Media Converter, a Broadcom NFC controller, a Qualcomm Snapdragon 4G LTE and 5G modem, a Toshiba Transferiet device, and/or the like. A network device may be discreet, external, embedded, integrated into a motherboard, and/or the like. A network device may operate in combination with other network devices (e.g., in parallel) to provide improved data throughput, redundancy, and/or the like. For example, protocols such as link aggregation control protocol (LACP) (e.g., based on IEEE 802.3AD or IEEE 802.1AX standards) may be used. A network device may be used to connect to a local area network (LAN), a wide area network (WAN), a metropolitan area network (MAN), a personal area network, the Internet, an intranet, a Bluetooth network, an NFC network, a Wi-Fi network, a cellular network, and/or the like.

In some embodiments, the input/output devices may include one or more peripheral devices 4417. The processor may make use of the one or more peripheral devices in accordance with program instructions (e.g., DDVME program instructions) executed by the processor. In various implementations, a peripheral device may be a digital camera, a video camera, a webcam, an electronically moveable pan tilt zoom (PTZ) camera, a monitor, a touchscreen display, active shutter 3D glasses, head-tracking 3D glasses, a virtual reality (VR) headset, an augmented reality (AR) headset, a remote control, an audio line-in, an audio line-out, a microphone, headphones, speakers, a subwoofer, an amplifier, a router, a hub, a switch, a firewall, an antenna, a keyboard, a mouse, a trackpad, a trackball, a digitizing tablet, a stylus, a joystick, a gamepad, a game controller, a force-feedback device, a laser, sensors (e.g., proximity sensor, rangefinder, ambient temperature sensor, ambient light sensor, humidity sensor, an accelerometer, a gyroscope, a motion sensor, an olfaction sensor, a biosensor, a biometric sensor, a chemical sensor, a magnetometer, a radar, a sonar, a location sensor such as global positioning system (GPS), Galileo, GLONASS, and/or the like), a printer, a fax, a scanner, a copier, a card reader, a fingerprint reader, a pin entry device (PED), a Trusted Platform Module (TPM), a hardware security module (HSM), and/or the like. A peripheral device may be connected to the system bus via an interface such as PCI, PCI Express, USB, FireWire, VGA, DVI, Mini-DVI, Micro-DVI, HDMI, DisplayPort, Thunderbolt, composite video, S-Video, component video, PC Card, ExpressCard, serial port, parallel port, PS/2, TS, TRS, RCA, TOSLINK, network connection (e.g., wired such as Ethernet, optical fiber, and/or the like; wireless such as Wi-Fi, Bluetooth, NFC, cellular, 5G, and/or the like), a connector of another input/output device, and/or the like. A peripheral device may be discreet, external, embedded, integrated (e.g., into a processor, into a motherboard), and/or the like. A peripheral device may operate in combination with other peripheral devices (e.g., in parallel) to provide the DDVME coordinator with a variety of input, output and processing capabilities.

In some embodiments, the input/output devices may include one or more storage devices 4419. The processor may access, read from, write to, store in, erase, modify, and/or the like a storage device in accordance with program instructions (e.g., DDVME program instructions) executed by the processor. A storage device may facilitate accessing, storing, retrieving, modifying, deleting, and/or the like data (e.g., DDVME data) by the processor. In one implementation, the processor may access data from the storage device directly via the system bus. In another implementation, the processor may access data from the storage device by instructing the storage device to transfer the data to the system memory and accessing the data from the system memory. In various embodiments, a storage device may be a hard disk drive (HDD), a solid-state drive (SSD), an optical disk drive (e.g., compact disk (CD-ROM) drive, CD-Recordable (CD-R) drive, CD-Rewriteable (CD-RW) drive, digital versatile disc (DVD-ROM) drive, DVD-R drive, DVD-RW drive, Blu-ray disk (BD) drive) using an optical medium, a magnetic tape drive using a magnetic tape, a memory card (e.g., a USB flash drive, a compact flash (CF) card, a secure digital extended capacity (SDXC) card), a network attached storage (NAS), a direct-attached storage (DAS), a storage area network (SAN), other processor-readable physical mediums, and/or the like. A storage device may be connected to the system bus via an interface such as PCI, PCI Express, USB, FireWire, PC Card, ExpressCard, Thunderbolt, integrated drive electronics (IDE), serial advanced technology attachment (SATA), non-volatile memory express (NVMe), external SATA (eSATA), small computer system interface (SCSI), serial attached SCSI (SAS), fibre channel (FC), network connection (e.g., wired such as Ethernet, optical fiber, and/or the like; wireless such as Wi-Fi, Bluetooth, NFC, cellular, 5G, and/or the like), and/or the like. A storage device may be discreet, external, embedded, integrated (e.g., into a motherboard, into another storage device), and/or the like. A storage device may operate in combination with other storage devices to provide improved capacity, data throughput, data redundancy, and/or the like. For example, protocols such as redundant array of independent disks (RAID) (e.g., RAID 0 (striping), RAID 1 (mirroring), RAID 5 (striping with distributed parity), hybrid RAID), just a bunch of drives (JBOD), and/or the like may be used. In another example, virtual and/or physical drives may be pooled to create a storage pool (e.g., for virtual storage, cloud storage, and/or the like). In yet another example, an SSD cache may be used with an HDD to improve speed.

Together and/or separately the system memory 4405 and the one or more storage devices 4419 may be referred to as memory 4420 (i.e., physical memory).

DDVME memory 4420 contains processor-operable (e.g., accessible) DDVME data stores 4430. Data stores 4430 comprise data that may be used (e.g., by the DDVME) via the DDVME coordinator. Such data may be organized using one or more data formats such as a database (e.g., a relational database with database tables, an object-oriented database, a graph database, a hierarchical database, a key-value NoSQL database), a flat file (e.g., organized into a tabular format), a binary file (e.g., a GIF file, an MPEG-4 file), a structured file (e.g., an HTML file, an XML file), a text file, and/or the like. Furthermore, data may be organized using one or more data structures such as an array, a queue, a stack, a set, a linked list, a map, a tree, a hash table, a record, an object, a directed graph, and/or the like. In various embodiments, data stores may be organized in any number of ways (i.e., using any number and configuration of data formats, data structures, DDVME coordinator elements, and/or the like) to facilitate DDVME operation. For example, DDVME data stores may comprise data stores 4430*a-c* implemented as one or more databases. A users data store 4430*a* may be a collection of database tables that include fields such as UserID, UserName, UserPreferences, and/or the like. A clients data store 4430*b* may be a collection of database tables that include fields such as ClientID, ClientName, ClientDeviceType, ClientScreenResolution, and/or the like. A nodes data store 4430*c* may be a collection of database tables that include fields such as NodeID, NodeType, OrganizationID, OrganizationData, OrganizationAssociatedUserIDs, OrganizationAssociatedCaseNodeIDs, CaseData, CaseAssociatedPageNodeIDs, CaseAssociatedIndexedRecordNodeIDs, PageData, PageAssociatedLayerNodeIDs, LayerType, LayerData, IndexedRecordData, IndexedRecordAssociatedPageNodeIDs, and/or the like. The DDVME coordinator may use data stores 4430 to keep track of inputs, parameters, settings, variables, records, outputs, and/or the like.

DDVME memory 4420 contains processor-operable (e.g., executable) DDVME components 4440. Components 4440 comprise program components (including program instructions and any associated data stores) that are executed (e.g., by the DDVME) via the DDVME coordinator (i.e., via the processor) to transform DDVME inputs into DDVME outputs. It is to be understood that the various components and their subcomponents, capabilities, applications, and/or the like may be organized in any number of ways (i.e., using any number and configuration of components, subcomponents, capabilities, applications, DDVME coordinator elements, and/or the like) to facilitate DDVME operation. Furthermore, it is to be understood that the various components and their subcomponents, capabilities, applications, and/or the like may communicate among each other in any number of ways to facilitate DDVME operation. For example, the various components and their subcomponents, capabilities, applications, and/or the like may be combined, integrated, consolidated, split up, distributed, and/or the like in any number of ways to facilitate DDVME operation. In another example, a single or multiple instances of the various components and their subcomponents, capabilities, applications, and/or the like may be instantiated on each of a single DDVME coordinator node, across multiple DDVME coordinator nodes, and/or the like.

In various embodiments, program components may be developed using one or more programming languages, techniques, tools, and/or the like such as an assembly language, Ada, BASIC, C, C++, C #, COBOL, Fortran, Java, LabVIEW, Lisp, Mathematica, MATLAB, OCaml, PL/1, Smalltalk, Visual Basic for Applications (VBA), HTML, XML, CSS, JavaScript, JavaScript Object Notation (JSON), PHP, Perl, Ruby, Python, Asynchronous JavaScript and XML (AJAX), WebSocket Protocol, Simple Object Access Protocol (SOAP), SSL, ColdFusion, Microsoft.NET, Apache modules, Adobe Flash, Adobe AIR, Microsoft Silverlight, Windows PowerShell, batch files, Tcl, graphical user interface (GUI) toolkits, SQL, database adapters, web application programming interfaces (APIs), web frameworks (e.g., Ruby on Rails, AngularJS), application server extensions, integrated development environments (IDEs), libraries (e.g., object libraries, class libraries, remote libraries), remote procedure calls (RPCs), Common Object Request Broker Architecture (CORBA), and/or the like.

In some embodiments, components 4440 may include an operating environment component 4440a. The operating environment component may facilitate operation of the DDVME via various subcomponents.

In some implementations, the operating environment component may include an operating system subcomponent. The operating system subcomponent may provide an abstraction layer that facilitates the use of, communication among, common services for, interaction with, security of, and/or the like of various DDVME coordinator elements, components, data stores, and/or the like.

In some embodiments, the operating system subcomponent may facilitate execution of program instructions (e.g., DDVME program instructions) by the processor by providing process management capabilities. For example, the operating system subcomponent may facilitate the use of multiple processors, the execution of multiple processes, the execution of multiple threads, multitasking, and/or the like.

In some embodiments, the operating system subcomponent may facilitate the use of memory by the DDVME. For example, the operating system subcomponent may allocate and/or free memory, facilitate memory addressing, provide memory segmentation and/or protection, provide virtual memory capability, facilitate caching, and/or the like. In another example, the operating system subcomponent may include a file system (e.g., File Allocation Table (FAT), New Technology File System (NTFS), Hierarchical File System Plus (HFS+), Apple File System (APFS), Universal Disk Format (UDF), Linear Tape File System (LTFS)) to facilitate storage, retrieval, deletion, aggregation, processing, generation, and/or the like of data.

In some embodiments, the operating system subcomponent may facilitate operation of and/or processing of data for and/or from input/output devices. For example, the operating system subcomponent may include one or more device drivers, interrupt handlers, file systems, and/or the like that allow interaction with input/output devices.

In some embodiments, the operating system subcomponent may facilitate operation of the DDVME coordinator as a node in a computer network by providing support for one or more communications protocols. For example, the operating system subcomponent may include support for the internet protocol suite (i.e., Transmission Control Protocol/Internet Protocol (TCP/IP)) of network protocols such as IP, IPsec, Mobile IP, TCP, User Datagram Protocol (UDP), and/or the like. In another example, the operating system subcomponent may include support for security protocols (e.g., Wired Equivalent Privacy (WEP), Wi-Fi Protected Access (WPA), WPA2, WPA3) for wireless computer networks. In yet another example, the operating system subcomponent may include support for virtual private networks (VPNs).

In some embodiments, the operating system subcomponent may facilitate security of the DDVME coordinator. For example, the operating system subcomponent may provide services such as authentication, authorization, audit, network intrusion-detection capabilities, firewall capabilities, antivirus capabilities, and/or the like.

In some embodiments, the operating system subcomponent may facilitate user interaction with the DDVME by providing user interface elements that may be used by the DDVME to generate a user interface. In one implementation, such user interface elements may include widgets (e.g., windows, dialog boxes, scroll bars, menu bars, tabs, ribbons, menus, buttons, text boxes, checkboxes, combo boxes, drop-down lists, list boxes, radio buttons, sliders, spinners, grids, labels, progress indicators, icons, tooltips, and/or the like) that may be used to obtain input from and/or provide output to the user. For example, such widgets may be used via a widget toolkit such as Microsoft Foundation Classes (MFC), Apple Cocoa Touch, Java Swing, JavaFX, jQuery UI, GTK, Qt, and/or the like. In another implementation, such user interface elements may include sounds (e.g., event notification sounds stored in MP3 file format), animations, vibrations, and/or the like that may be used to inform the user regarding occurrence of various events. For example, the operating system subcomponent may include a user interface such as Windows Aero, Windows Metro, macOS X Aqua, macOS X Flat, GNOME Shell, KDE Plasma Workspaces (e.g., Plasma Desktop, Plasma Netbook, Plasma Contour, Plasma Mobile), and/or the like.

In various embodiments the operating system subcomponent may comprise a single-user operating system, a multi-user operating system, a single-tasking operating system, a multitasking operating system, a single-processor operating system, a multiprocessor operating system, a distributed operating system, an embedded operating system, a real-time operating system, and/or the like. For example, the operating system subcomponent may comprise an operating system such as UNIX, LINUX, IBM i, Sun Solaris, Microsoft Windows Server, Microsoft DOS, Microsoft Windows 10, Apple Mac OS X, Apple iOS, Google Android, and/or the like.

In some implementations, the operating environment component may include a database subcomponent. The database subcomponent may facilitate DDVME capabilities such as storage, analysis, retrieval, access, modification, deletion, aggregation, generation, and/or the like of data (e.g., the use of data stores 4430). The database subcomponent may make use of database languages (e.g., Structured Query Language (SQL), XQuery, Cassandra Query Language (CQL)), stored procedures, triggers, APIs, and/or the like to provide these capabilities. In various embodiments the database subcomponent may comprise a cloud database, a data warehouse, a distributed database, an embedded database, a parallel database, a real-time database, and/or the like. For example, the database subcomponent may comprise a database such as Microsoft SQL Server, Microsoft Access, MySQL, IBM DB2, Oracle Database, Apache Cassandra database, MongoDB, and/or the like.

In some implementations, the operating environment component may include an information handling subcomponent. The information handling subcomponent may provide the DDVME with capabilities to serve, deliver, upload, obtain, present, download, and/or the like a variety of information. The information handling subcomponent may use protocols such as Hypertext Transfer Protocol (HTTP), Hypertext Transfer Protocol Secure (HTTPS), File Transfer Protocol (FTP), Telnet, Secure Shell (SSH), Transport Layer Security (TLS), Secure Sockets Layer (SSL), peer-to-peer (P2P) protocols (e.g., BitTorrent, Bitcoin), and/or the like to handle communication of information such as web pages, files, multimedia content (e.g., streaming media), applications, transactions, and/or the like.

In some embodiments, the information handling subcomponent may facilitate the serving of information to users, DDVME components, nodes in a computer network, web browsers, and/or the like. For example, the information handling subcomponent may comprise a web server such as Apache HTTP Server, Microsoft Internet Information Services (IIS), Oracle WebLogic Server, Adobe Flash Media Server, Adobe Content Server, and/or the like. Furthermore, a web server may include extensions, plug-ins, add-ons, servlets, and/or the like. For example, these may include Apache modules, IIS extensions, Java servlets, and/or the like. In some implementations, the information handling subcomponent may communicate with the database subcomponent via standards such as Open Database Connectivity (ODBC), Java Database Connectivity (JDBC), ActiveX Data Objects for .NET (ADO.NET), and/or the like. For example, the information handling subcomponent may use such standards to store, analyze, retrieve, access, modify, delete, aggregate, generate, and/or the like data (e.g., data from data stores 4430) via the database subcomponent.

In some embodiments, the information handling subcomponent may facilitate presentation of information obtained from users, DDVME components, nodes in a computer network, web servers, and/or the like. For example, the information handling subcomponent may comprise a web browser such as Microsoft Internet Explorer, Microsoft Edge, Mozilla Firefox, Apple Safari, Google Chrome, Opera Mobile, Amazon Silk, Nintendo 3DS Internet Browser, and/or the like. Furthermore, a web browser may include extensions, plug-ins, add-ons, applets, and/or the like. For example, these may include Adobe Flash Player, Adobe Acrobat plug-in, Microsoft Silverlight plug-in, Microsoft Office plug-in, Java plug-in, and/or the like.

In some implementations, the operating environment component may include a messaging subcomponent. The messaging subcomponent may facilitate DDVME message communications capabilities. The messaging subcomponent may use protocols such as Simple Mail Transfer Protocol (SMTP), Internet Message Access Protocol (IMAP), Post Office Protocol (POP), Extensible Messaging and Presence Protocol (XMPP), Real-time Transport Protocol (RTP), Internet Relay Chat (IRC), Skype protocol, Messaging Application Programming Interface (MAPI), Facebook API, a custom protocol, and/or the like to facilitate DDVME message communications. The messaging subcomponent may facilitate message communications such as email, instant messaging, Voice over IP (VoIP), video conferencing, Short Message Service (SMS), web chat, in-app messaging (e.g., alerts, notifications), and/or the like. For example, the messaging subcomponent may comprise Microsoft Exchange Server, Microsoft Outlook, Sendmail, IBM Domino, IBM Notes, Gmail, ICQ, Trillian, Skype, Google Hangouts, Apple FaceTime, Apple iChat, Facebook Chat, and/or the like.

In some implementations, the operating environment component may include a security subcomponent that facilitates DDVME security. In some embodiments, the security subcomponent may restrict access to the DDVME, to one or more services provided by the DDVME, to data associated with the DDVME (e.g., stored in data stores 4430), to communication messages associated with the DDVME, and/or the like to authorized users. Access may be granted via a login screen, via an API that obtains authentication information, via an authentication token, via a cryptographic key (e.g., stored in an HSM), and/or the like. For example, the user may obtain access by providing a username and/or a password (e.g., a string of characters, a picture password), a personal identification number (PIN), an identification card, a magnetic stripe card, a smart card, a biometric identifier (e.g., a finger print, a voice print, a retina scan, a face scan), a gesture (e.g., a swipe), a media access control (MAC) address, an IP address, and/or the like. Various security models such as access-control lists (ACLs), capability-based security, hierarchical protection domains, multi-factor authentication, and/or the like may be used to control access. For example, the security subcomponent may facilitate digital rights management (DRM), network intrusion detection, firewall capabilities, cryptographic wallet access (e.g., for cryptocurrencies such as Bitcoin, Ethereum, and/or the like), and/or the like.

In some embodiments, the security subcomponent may use cryptographic techniques to secure information (e.g., by storing encrypted data), verify message authentication (e.g., via a digital signature), provide integrity checking (e.g., a checksum), authorize transactions (e.g., using a private key), and/or the like by facilitating encryption and/or decryption of data. Furthermore, steganographic techniques may be used instead of or in combination with cryptographic techniques. Cryptographic techniques used by the DDVME may include symmetric key cryptography using shared keys (e.g., using one or more block ciphers such as triple Data Encryption Standard (DES), Advanced Encryption Standard (AES); stream ciphers such as Rivest Cipher 4 (RC4), Rabbit), asymmetric key cryptography using a public key/private key pair (e.g., using algorithms such as Rivest-Shamir-Adleman (RSA), Elliptic Curve Digital Signature Algorithm (ECDSA)), cryptographic hash functions (e.g., using algorithms such as Message-Digest 5 (MD5), Secure Hash Algorithm 3 (SHA-3)), and/or the like. For example, the security subcomponent may comprise a cryptographic system such as Pretty Good Privacy (PGP).

In some implementations, the operating environment component may include a virtualization subcomponent that facilitates DDVME virtualization capabilities. The virtualization subcomponent may include hypervisors (e.g., Type-1 native hypervisors, Type-2 hosted hypervisors), virtual machines (VMs), and/or the like. In some embodiments, the virtualization subcomponent may provide support for platform virtualization (e.g., via a virtual machine). Platform virtualization types may include full virtualization, partial virtualization, paravirtualization, and/or the like. In some implementations, platform virtualization may be hardware-assisted (e.g., via support from the processor using technologies such as AMD-V, Intel VT-x, and/or the like). In some embodiments, the virtualization subcomponent may provide support for various other virtualized environments such as via operating-system level virtualization, desktop virtualization, workspace virtualization, mobile virtualization, application virtualization, database virtualization, and/or the like. In some embodiments, the virtualization subcomponent may provide support for various virtualized resources such as via processing resources virtualization, memory virtualization, storage virtualization, data virtualization, network virtualization, and/or the like. For example, the virtualization subcomponent may comprise VMware software suite (e.g., VMware Workstation, VMware Player, VMware ESXi, VMware ThinApp, VMware Infrastructure), Parallels software suite (e.g., Parallels Server, Parallels Desktop), Virtuozzo software suite (e.g., Virtuozzo Infrastructure Platform, Virtuozzo), Oracle software suite (e.g., Oracle VM Server for SPARC, Oracle VM Server for x86, Oracle VM VirtualBox, Oracle Solaris 11), Wine, and/or the like.

In some embodiments, components 4440 may include a user interface component 4440*b*. The user interface component may facilitate user interaction with the DDVME by providing a user interface. In various implementations, the user interface component may include programmatic instructions to obtain input from and/or provide output to the user via physical controls (e.g., physical buttons, switches, knobs, wheels, dials), textual user interface, audio user interface, GUI, voice recognition, gesture recognition, touch and/or multi-touch user interface, messages, APIs, and/or the like. In some implementations, the user interface component may make use of the user interface elements provided by the operating system subcomponent of the operating environment component. For example, the user interface component may make use of the operating system subcomponent's user interface elements via a widget toolkit. In some implementations, the user interface component may make use of information presentation capabilities provided by the information handling subcomponent of the operating environment component. For example, the user interface component may make use of a web browser to provide a user interface via HTML5, Adobe Flash, Microsoft Silverlight, and/or the like.

In some embodiments, components 4440 may include any of the components DDVM 4440*c*, etc. described in more detail in preceding figures and/or in appendices.

THE EMBODIMENTS OF THE DDVME

The entirety of this disclosure (including the written description, figures, claims, abstract, appendices, and/or the like) for DATABASE DOCUMENT VISUALIZATION AND MANIPULATION ENGINE APPARATUSES, METHODS, SYSTEMS AND MEDIA shows various embodiments via which the claimed innovations may be practiced. It is to be understood that these embodiments and the features they describe are a representative sample presented to assist in understanding the claimed innovations, and are not exhaustive and/or exclusive. As such, the various embodiments, implementations, examples, and/or the like are deemed non-limiting throughout this disclosure. Furthermore, alternate undescribed embodiments may be available (e.g., equivalent embodiments). Such alternate embodiments have not been discussed in detail to preserve space and/or reduce repetition. That alternate embodiments have not been discussed in detail is not to be considered a disclaimer of such alternate undescribed embodiments, and no inference should be drawn regarding such alternate undescribed embodiments relative to those discussed in detail in this disclosure. It is to be understood that such alternate undescribed embodiments may be utilized without departing from the spirit and/or scope of the disclosure. For example, the organizational, logical, physical, functional, topological, and/or the like structures of various embodiments may differ. In another example, the organizational, logical, physical, functional, topological, and/or the like structures of the DDVME coordinator, DDVME coordinator elements, DDVME data stores, DDVME components and their subcomponents, capabilities, applications, and/or the like described in various embodiments throughout this disclosure are not limited to a fixed operating order and/or arrangement, instead, all equivalent operating orders and/or arrangements are contemplated by this disclosure. In yet another example, the DDVME coordinator, DDVME coordinator elements, DDVME data stores, DDVME components and their subcomponents, capabilities, applications, and/or the like described in various embodiments throughout this disclosure are not limited to serial execution, instead, any number and/or configuration of threads, processes, instances, services, servers, clients, nodes, and/or the like that execute in parallel, concurrently, simultaneously, synchronously, asynchronously, and/or the like is contemplated by this disclosure. Furthermore, it is to be understood that some of the features described in this disclosure may be mutually contradictory, incompatible, inapplicable, and/or the like, and are not present simultaneously in the same embodiment. Accordingly, the various embodiments, implementations, examples, and/or the like are not to be considered limitations on the disclosure as defined by the claims or limitations on equivalents to the claims.

This disclosure includes innovations not currently claimed. Applicant reserves all rights in such currently unclaimed innovations including the rights to claim such innovations and to file additional provisional applications, nonprovisional applications, continuation applications, continuation-in-part applications, divisional applications, and/or the like. It is to be understood that while some embodiments of the DDVME discussed in this disclosure have been directed to visualizing and/or manipulating medical case documents, the innovations described in this disclosure may be readily applied to a wide variety of other fields and/or applications.

The following is claimed:

1. A database document visualization and manipulation apparatus, comprising:
    at least one memory;
    at least one processor in communication with the at least one memory, the at least one processor configured to execute processing instructions stored in the at least one memory, in which the at least one processor executes processor-executable instructions to:
        obtain, via the at least one processor, a user interaction command via an interface interaction mechanism associated with a viewer interface element having a set height bound, in which the viewer interface element is structured to display page data associated with a buffered subset of page nodes that fit within the set height bound from a virtual pixel space comprising the buffered subset of page nodes and a not buffered subset of page nodes, in which the virtual pixel space is defined by a virtual pixel space data structure comprising pixel range data for a set of page nodes that satisfy filter parameters of a view;

determine, via the at least one processor, a virtual scroll space position associated with the interface interaction mechanism resulting from the user interaction command;

query, via the at least one processor, the virtual pixel space data structure to determine a virtual pixel space position corresponding to the virtual scroll space position, in which the virtual pixel space data structure specifies a pixel range associated with each page node in the set of page nodes;

determine, via the at least one processor, that the virtual pixel space position indicates that a buffer update threshold associated with the viewer interface element has been exceeded;

query, via the at least one processor, the virtual pixel space data structure to determine a subset from the set of page nodes to utilize as the buffered subset of page nodes based on a combination of: the virtual pixel space position, pixel ranges associated with page nodes in the set of page nodes, and the set height bound associated with the viewer interface element; and load, via the at least one processor, page data corresponding to the buffered subset of page nodes into the viewer interface element.

2. The apparatus of claim 1, in which the user interaction command is one of: a scroll command, a drag command, a swipe command, a resize command.

3. The apparatus of claim 1, in which the interface interaction mechanism is one of: a custom scroll bar, a resize widget.

4. The apparatus of claim 1, in which the viewer interface element is an HTML DIV element and the set height bound associated with the viewer interface element depends on a browser of a user's client, in which the set height bound is significantly lower than the browser's height limit for the HTML DIV element.

5. The apparatus of claim 1, in which the view is one of: all page nodes, indexed record nodes, blank and illegible page nodes, duplicate page nodes, similar page nodes.

6. The apparatus of claim 1, in which the filter parameters comprise a set of attributes for at least one of: authors, tags, date indexed, flag color, categories, locations, status, files, encounter types, visit date, reviewed color.

7. The apparatus of claim 1, in which the virtual scroll space position is a scroll position of a custom scroll bar that corresponds to the virtual pixel space.

8. The apparatus of claim 1, in which the buffer update threshold is one of: an upper pixel position corresponding to a specified portion of the set height bound associated with the viewer interface element, a lower pixel position corresponding to a specified portion of the set height bound associated with the viewer interface element.

9. The apparatus of claim 1, in which the virtual pixel space data structure comprises a pixel range vector of page data structures, in which a page data structure corresponding to a page node specifies a pixel range associated with the page node, in which the pixel range comprises at least one of: a first pixel position associated with the page node in the virtual pixel space, a last pixel position associated with the page node in the virtual pixel space.

10. The apparatus of claim 1, in which the instructions to load the page data corresponding to the buffered subset of page nodes further comprise instructions to lazy load the page data, in which the buffered subset of page nodes comprises a cached subset of page nodes and uncached page nodes, in which an uncached page node is represented in the viewer interface element as a blank space placeholder with dimensions that correspond to the dimensions of the uncached page.

11. The apparatus of claim 10, in which the instructions to lazy load the page data further comprise instructions to:
determine, via the at least one processor, the cached subset of page nodes from the buffered subset of page nodes; and
load, via the at least one processor, page data corresponding to currently uncached page nodes from the cached subset of page nodes.

12. The apparatus of claim 11, in which the at least one processor further executes instructions to:
expunge from cache, via the at least one processor, page data corresponding to at least some previously cached page nodes from the buffered subset of page nodes that are no longer in the cached subset of page nodes.

13. The apparatus of claim 1, in which the instructions to load page data corresponding to a page node in the buffered subset of page nodes further comprise instructions to:
determine, via the at least one processor, a set of layer nodes associated with the page node; and
retrieve, via the at least one processor, layer data stored via at least one layer node from the set of layer nodes from a database.

14. The apparatus of claim 1, in which the at least one processor further executes instructions to:
recalculate, via the at least one processor, a pixel range associated with each page node in the set of page nodes in response to the user interaction command; and
update, via the at least one processor, the virtual pixel space data structure with the recalculated pixel ranges.

15. The apparatus of claim 1, in which the at least one processor further executes instructions to:
obtain, via the at least one processor, a user page interaction command associated with a target page node via the viewer interface element, in which the viewer interface element comprises layer data corresponding to a first layer node associated with the target page node; and
retrieve, via the at least one processor, layer data corresponding to a second layer node associated with the target page node in response to the user page interaction command.

16. The apparatus of claim 15, in which the user page interaction command is one of: an area selection command, a search command, a highlight command.

17. The apparatus of claim 15, in which the first layer node is an image layer type node and the second layer node is an OCR layer type node.

18. The apparatus of claim 15, in which the at least one processor further executes instructions to:
update, via the at least one processor, the viewer interface element to emphasize a portion of the layer data corresponding to the first layer node based on the retrieved layer data corresponding to the second layer node.

19. A database document visualization and manipulation processor-readable non-transitory physical medium storing processor-executable instructions to:
- obtain, via at least one processor, a user interaction command via an interface interaction mechanism associated with a viewer interface element having a set height bound, in which the viewer interface element is structured to display page data associated with a buffered subset of page nodes that fit within the set height bound from a virtual pixel space comprising the buffered subset of page nodes and a not buffered subset of page nodes, in which the virtual pixel space is defined by a virtual pixel space data structure comprising pixel range data for a set of page nodes that satisfy filter parameters of a view;
- determine, via the at least one processor, a virtual scroll space position associated with the interface interaction mechanism resulting from the user interaction command;
- query, via the at least one processor, the virtual pixel space data structure to determine a virtual pixel space position corresponding to the virtual scroll space position, in which the virtual pixel space data structure specifies a pixel range associated with each page node in the set of page nodes;
- determine, via the at least one processor, that the virtual pixel space position indicates that a buffer update threshold associated with the viewer interface element has been exceeded;
- query, via the at least one processor, the virtual pixel space data structure to determine a subset from the set of page nodes to utilize as the buffered subset of page nodes based on a combination of: the virtual pixel space position, pixel ranges associated with page nodes in the set of page nodes, and the set height bound associated with the viewer interface element; and
- load, via the at least one processor, page data corresponding to the buffered subset of page nodes into the viewer interface element.

20. A processor-implemented database document visualization and manipulation method comprising executing processor-executable instructions to:
- obtain, via at least one processor, a user interaction command via an interface interaction mechanism associated with a viewer interface element having a set height bound, in which the viewer interface element is structured to display page data associated with a buffered subset of page nodes that fit within the set height bound from a virtual pixel space comprising the buffered subset of page nodes and a not buffered subset of page nodes, in which the virtual pixel space is defined by a virtual pixel space data structure comprising pixel range data for a set of page nodes that satisfy filter parameters of a view;
- determine, via the at least one processor, a virtual scroll space position associated with the interface interaction mechanism resulting from the user interaction command;
- query, via the at least one processor, the virtual pixel space data structure to determine a virtual pixel space position corresponding to the virtual scroll space position, in which the virtual pixel space data structure specifies a pixel range associated with each page node in the set of page nodes;
- determine, via the at least one processor, that the virtual pixel space position indicates that a buffer update threshold associated with the viewer interface element has been exceeded;
- query, via the at least one processor, the virtual pixel space data structure to determine a subset from the set of page nodes to utilize as the buffered subset of page nodes based on a combination of: the virtual pixel space position, pixel ranges associated with page nodes in the set of page nodes, and the set height bound associated with the viewer interface element; and
- load, via the at least one processor, page data corresponding to the buffered subset of page nodes into the viewer interface element.

* * * * *